(12) United States Patent
Freel et al.

(10) Patent No.: US 9,102,888 B2
(45) Date of Patent: Aug. 11, 2015

(54) METHODS FOR RENEWABLE FUELS WITH REDUCED WASTE STREAMS

(71) Applicant: Ensyn Renewables, Inc., Wilmington, DE (US)

(72) Inventors: Barry A. Freel, Ottawa (CA); Robert G. Graham, Ottawa (CA)

(73) Assignee: Ensyn Renewables, Inc., Wilmington, DE (US)

( * ) Notice: Subject to any disclaimer, the term of this patent is extended or adjusted under 35 U.S.C. 154(b) by 0 days.

(21) Appl. No.: 14/484,874

(22) Filed: Sep. 12, 2014

(65) Prior Publication Data

US 2015/0059235 A1    Mar. 5, 2015

Related U.S. Application Data

(63) Continuation of application No. 13/709,822, filed on Dec. 10, 2012.

(60) Provisional application No. 61/569,712, filed on Dec. 12, 2011, provisional application No. 61/646,152, filed on May 11, 2012, provisional application No. 61/673,683, filed on Jul. 19, 2012.

(51) Int. Cl.
*C10L 1/18* (2006.01)
*C10L 1/16* (2006.01)
(Continued)

(52) U.S. Cl.
CPC ................. *C10L 1/1817* (2013.01); *B01J 8/24* (2013.01); *B01J 19/0013* (2013.01); *C10G 1/00* (2013.01); *C10G 1/002* (2013.01); *C10G 3/42* (2013.01); *C10G 3/57* (2013.01); *C10G 11/00* (2013.01); *C10G 11/18* (2013.01); *C10L 1/04* (2013.01); *C10L 1/1616* (2013.01); *C10L 1/1802* (2013.01); *G06Q 40/04* (2013.01); *G06Q 50/06* (2013.01); *C10G 2300/1011* (2013.01); *C10L 2200/0453* (2013.01); *C10L 2200/0469* (2013.01); *C10L 2270/02* (2013.01); *C10L 2270/023* (2013.01);
(Continued)

(58) Field of Classification Search
CPC ........................................................ C10L 1/18
USPC ............................................................ 44/307
See application file for complete search history.

(56) References Cited

U.S. PATENT DOCUMENTS 1,252,072 A    1/1918  Abbot
2,205,757 A    6/1940  Wheat
(Continued)

FOREIGN PATENT DOCUMENTS

BR    8304158    7/1984
BR    8304794    4/1985
(Continued)

OTHER PUBLICATIONS

AccessScience Dictionary, "ebullating-bed reactor," http://www.accessscience.com, last visited Jul. 15, 2014.
(Continued)

*Primary Examiner* — Prem C Singh
*Assistant Examiner* — Chantel Graham
(74) *Attorney, Agent, or Firm* — Jones Day

(57) ABSTRACT

The present application generally relates to the introduction of a reduced volatility renewable fuel oil as a feedstock and processing it with a petroleum stream in the presence of a catalyst to reduce the generation of waste streams in refinery systems or field upgrading equipment.

17 Claims, 20 Drawing Sheets

Figure 1:
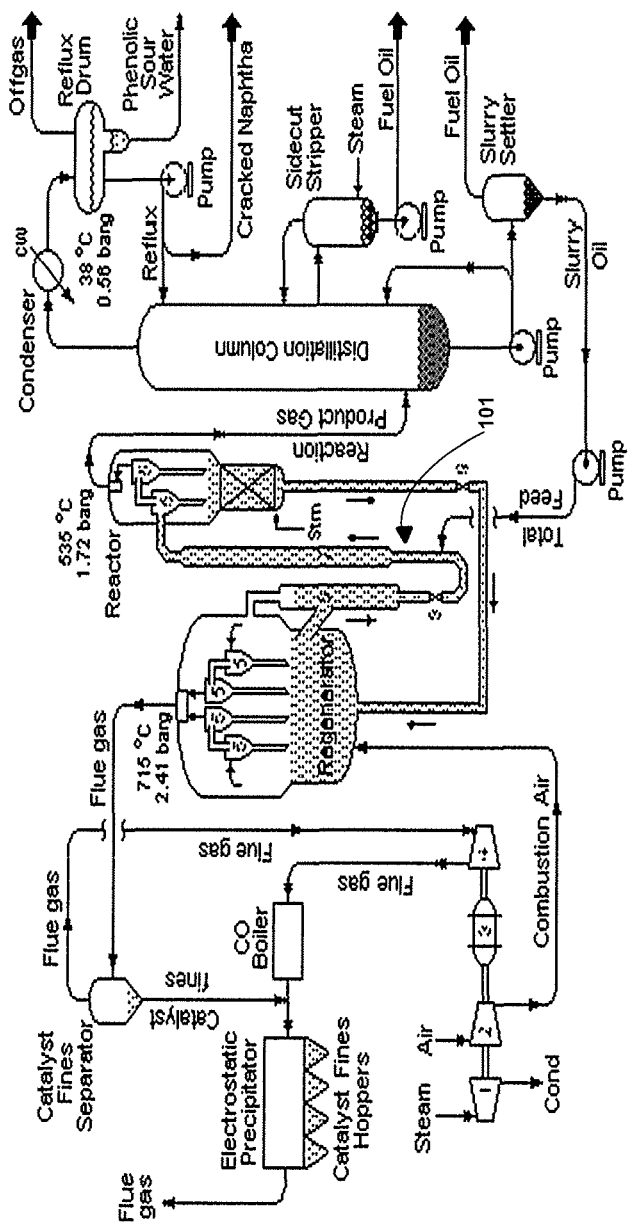

(51) Int. Cl.

| | |
|---|---|
| *C10G 3/00* | (2006.01) |
| *C10G 11/18* | (2006.01) |
| *B01J 8/24* | (2006.01) |
| *C10G 1/00* | (2006.01) |
| *C10L 1/04* | (2006.01) |
| *C10G 11/00* | (2006.01) |
| *B01J 19/00* | (2006.01) |
| *G06Q 40/04* | (2012.01) |
| *G06Q 50/06* | (2012.01) |

(52) U.S. Cl.
CPC ........ *C10L 2270/026* (2013.01); *C10L 2270/04* (2013.01); *C10L 2290/143* (2013.01); *C10L 2290/24* (2013.01); *Y02E 50/14* (2013.01)

(56) References Cited

U.S. PATENT DOCUMENTS

| | | | |
|---|---|---|---|
| 2,326,525 A | 8/1943 | Diwoky | |
| 2,328,202 A | 8/1943 | Doerner | |
| 2,380,098 A | 7/1945 | Doerner | |
| 2,566,353 A | 9/1951 | Mills | |
| 2,884,303 A | 4/1959 | William | |
| 3,130,007 A | 4/1964 | Breck | |
| 3,309,356 A | 3/1967 | Esterer | |
| 3,313,726 A | 4/1967 | Campbell et al. | |
| 3,445,549 A | 5/1969 | Kristian | |
| 3,467,502 A | 9/1969 | Davis | |
| 3,694,346 A | 9/1972 | Blaser et al. | |
| 3,696,022 A | 10/1972 | Hutchings | |
| 3,776,533 A | 12/1973 | Vlnaty | |
| 3,814,176 A | 6/1974 | Seth | |
| 3,853,498 A | 12/1974 | Bailie | |
| 3,876,533 A | 4/1975 | Myers | |
| 3,890,111 A | 6/1975 | Knudsen | |
| 3,907,661 A | 9/1975 | Gwyn et al. | |
| 3,925,024 A | 12/1975 | Hollingsworth et al. | |
| 3,927,996 A | 12/1975 | Knudsen et al. | |
| 3,959,420 A | 5/1976 | Geddes et al. | |
| 4,003,829 A | 1/1977 | Burger et al. | |
| 4,039,290 A | 8/1977 | Inada et al. | |
| 4,052,265 A | 10/1977 | Kemp | |
| 4,064,018 A | 12/1977 | Choi | |
| 4,064,043 A | 12/1977 | Kollman | |
| 4,085,030 A | 4/1978 | Green et al. | |
| 4,101,414 A | 7/1978 | Kim et al. | |
| 4,102,773 A | 7/1978 | Green et al. | |
| 4,103,902 A | 8/1978 | Steiner et al. | |
| 4,138,020 A | 2/1979 | Steiner et al. | |
| 4,145,274 A | 3/1979 | Green et al. | |
| 4,153,514 A | 5/1979 | Garrett et al. | |
| 4,157,245 A | 6/1979 | Mitchell et al. | |
| 4,204,915 A | 5/1980 | Kurata et al. | |
| 4,219,537 A | 8/1980 | Steiner | |
| 4,225,415 A | 9/1980 | Mirza et al. | |
| 4,233,119 A | 11/1980 | Meyers et al. | |
| 4,245,693 A | 1/1981 | Cheng | |
| 4,272,402 A | 6/1981 | Mayes | |
| 4,284,616 A | 8/1981 | Solbakken et al. | |
| 4,298,453 A | 11/1981 | Schoennagel et al. | |
| 4,300,009 A | 11/1981 | Haag et al. | |
| 4,301,771 A | 11/1981 | Jukkola et al. | |
| 4,306,619 A | 12/1981 | Trojani | |
| 4,308,411 A | 12/1981 | Frankiewicz | |
| 4,311,670 A | 1/1982 | Nieminen et al. | |
| 4,321,096 A | 3/1982 | Dobbin | |
| 4,324,637 A | 4/1982 | Durai-swamy | |
| 4,324,641 A | 4/1982 | Durai-Swamy | |
| 4,324,642 A | 4/1982 | Durai-swamy | |
| 4,324,644 A | 4/1982 | Durai-swamy | |
| 4,325,327 A | 4/1982 | Kantesaria et al. | |
| 4,334,893 A | 6/1982 | Lang | |
| 4,336,128 A | 6/1982 | Tamm | |
| 4,341,598 A | 7/1982 | Green | |
| 4,344,770 A | 8/1982 | Capener et al. | |
| 4,364,796 A | 12/1982 | Ishii et al. | |
| 4,373,994 A | 2/1983 | Lee | |
| 4,415,434 A | 11/1983 | Hargreaves et al. | |
| 4,422,927 A | 12/1983 | Kowalczyk et al. | |
| 4,434,726 A | 3/1984 | Jones | |
| 4,443,229 A | 4/1984 | Sageman et al. | |
| 4,456,504 A | 6/1984 | Spars et al. | |
| 4,495,056 A | 1/1985 | Venardos et al. | |
| 4,504,379 A | 3/1985 | Stuntz et al. | |
| 4,548,615 A | 10/1985 | Lonchamp et al. | |
| 4,552,203 A | 11/1985 | Chrysostome et al. | |
| 4,574,743 A | 3/1986 | Claus | |
| 4,584,947 A | 4/1986 | Chittick | |
| 4,595,567 A | 6/1986 | Hedrick | |
| 4,615,870 A | 10/1986 | Armstrong et al. | |
| 4,617,693 A | 10/1986 | Meyers et al. | |
| 4,645,568 A | 2/1987 | Kurps et al. | |
| 4,668,243 A | 5/1987 | Schulz | |
| 4,678,860 A | 7/1987 | Kuester | |
| 4,684,375 A | 8/1987 | Morin et al. | |
| 4,710,357 A | 12/1987 | Cetinkaya et al. | |
| 4,714,109 A | 12/1987 | Tsao | |
| 4,732,091 A | 3/1988 | Gould | |
| 4,823,712 A | 4/1989 | Wormer | |
| 4,849,091 A | 7/1989 | Cabrera et al. | |
| 4,880,473 A | 11/1989 | Scott et al. | |
| 4,881,592 A | 11/1989 | Cetinkaya | |
| 4,891,459 A | 1/1990 | Knight et al. | |
| 4,897,178 A | 1/1990 | Best et al. | |
| 4,931,171 A | 6/1990 | Piotter | |
| 4,940,007 A | 7/1990 | Hiltunen et al. | |
| 4,942,269 A | 7/1990 | Chum et al. | |
| 4,968,325 A | 11/1990 | Black et al. | |
| 4,983,278 A | 1/1991 | Cha et al. | |
| 4,987,178 A | 1/1991 | Shibata et al. | |
| 4,988,430 A | 1/1991 | Sechrist et al. | |
| 4,992,605 A | 2/1991 | Craig et al. | |
| 5,009,770 A | 4/1991 | Miller et al. | |
| 5,011,592 A | 4/1991 | Owen et al. | |
| 5,018,458 A | 5/1991 | Mcintyre et al. | |
| 5,041,209 A | 8/1991 | Cha et al. | |
| 5,059,404 A | 10/1991 | Mansour et al. | |
| 5,077,252 A | 12/1991 | Owen et al. | |
| 5,093,085 A | 3/1992 | Engstrom et al. | |
| 5,136,117 A | 8/1992 | Paisley et al. | |
| 5,225,044 A | 7/1993 | Breu | |
| 5,236,688 A | 8/1993 | Watanabe et al. | |
| 5,239,946 A | 8/1993 | Garcia-mallol | |
| 5,243,922 A | 9/1993 | Rehmat et al. | |
| 5,281,727 A | 1/1994 | Carver et al. | |
| 5,306,481 A | 4/1994 | Mansour et al. | |
| 5,326,919 A | 7/1994 | Paisley et al. | |
| 5,371,212 A | 12/1994 | Moens | |
| 5,376,340 A | 12/1994 | Bayer et al. | |
| 5,380,916 A | 1/1995 | Rao | |
| 5,407,674 A | 4/1995 | Gabetta et al. | |
| 5,423,891 A | 6/1995 | Taylor | |
| 5,426,807 A | 6/1995 | Grimsley et al. | |
| 5,478,736 A | 12/1995 | Nair | |
| 5,494,653 A | 2/1996 | Paisley | |
| 5,520,722 A | 5/1996 | Hershkowitz et al. | |
| 5,536,488 A | 7/1996 | Mansour et al. | |
| 5,578,092 A | 11/1996 | Collin | |
| 5,605,551 A | 2/1997 | Scott et al. | |
| 5,637,192 A | 6/1997 | Mansour et al. | |
| 5,654,448 A | 8/1997 | Pandey et al. | |
| 5,662,050 A | 9/1997 | Angelo, II et al. | |
| 5,713,977 A | 2/1998 | Kobayashi | |
| 5,725,738 A | 3/1998 | Brioni et al. | |
| 5,728,271 A | 3/1998 | Piskorz et al. | |
| 5,744,333 A | 4/1998 | Cociancich et al. | |
| 5,788,784 A | 8/1998 | Koppenhoefer et al. | |
| 5,792,340 A | 8/1998 | Freel et al. | |
| 5,853,548 A | 12/1998 | Piskorz et al. | |
| 5,879,642 A | 3/1999 | Trimble et al. | |
| 5,879,650 A | 3/1999 | Kaul et al. | |
| 5,904,838 A | 5/1999 | Kalnes et al. | |
| 5,961,786 A | 10/1999 | Freel et al. | |
| 5,969,165 A | 10/1999 | Liu | |

(56) References Cited

U.S. PATENT DOCUMENTS

| | | |
|---|---|---|
| 6,002,025 A | 12/1999 | Page et al. |
| 6,011,187 A | 1/2000 | Horizoe et al. |
| 6,033,555 A | 3/2000 | Chen et al. |
| 6,106,702 A | 8/2000 | Sohn et al. |
| 6,113,862 A | 9/2000 | Jorgensen et al. |
| 6,133,499 A | 10/2000 | Horizoe et al. |
| 6,149,765 A | 11/2000 | Mansour et al. |
| 6,190,542 B1 | 2/2001 | Comolli et al. |
| 6,193,837 B1 | 2/2001 | Agblevor et al. |
| 6,237,541 B1 | 5/2001 | Alliston et al. |
| 6,339,182 B1 | 1/2002 | Munson et al. |
| 6,452,024 B1 | 9/2002 | Bui-Khac et al. |
| 6,455,015 B1 | 9/2002 | Kilroy |
| 6,485,841 B1 | 11/2002 | Freel et al. |
| 6,547,957 B1 | 4/2003 | Sudhakar et al. |
| 6,555,649 B2 | 4/2003 | Giroux et al. |
| 6,656,342 B2 | 12/2003 | Smith et al. |
| 6,660,157 B2 | 12/2003 | Que et al. |
| 6,676,828 B1 | 1/2004 | Galiasso et al. |
| 6,743,746 B1 | 6/2004 | Prilutsky et al. |
| 6,759,562 B2 | 7/2004 | Gartside et al. |
| 6,776,607 B2 | 8/2004 | Nahas et al. |
| 6,808,390 B1 | 10/2004 | Fung |
| 6,814,940 B1 | 11/2004 | Hiltunen et al. |
| 6,844,420 B1 | 1/2005 | Freel et al. |
| 6,875,341 B1 | 4/2005 | Bunger et al. |
| 6,960,325 B2 | 11/2005 | Kao et al. |
| 6,962,676 B1 | 11/2005 | Hyppaenen |
| 6,988,453 B2 | 1/2006 | Cole et al. |
| 7,004,999 B2 | 2/2006 | Johnson et al. |
| 7,022,741 B2 | 4/2006 | Jiang et al. |
| 7,026,262 B1 | 4/2006 | Palmas et al. |
| 7,202,389 B1 | 4/2007 | Brem |
| 7,214,252 B1 | 5/2007 | Krumm et al. |
| 7,226,954 B2 | 6/2007 | Tavasoli et al. |
| 7,240,639 B2 | 7/2007 | Hyppaenen et al. |
| 7,247,233 B1 | 7/2007 | Hedrick et al. |
| 7,262,331 B2 | 8/2007 | van de Beld et al. |
| 7,263,934 B2 | 9/2007 | Copeland et al. |
| 7,285,186 B2 | 10/2007 | Tokarz |
| 7,319,168 B2 | 1/2008 | Sanada |
| 7,473,349 B2 | 1/2009 | Keckler et al. |
| 7,476,774 B2 | 1/2009 | Umansky et al. |
| 7,479,217 B2 | 1/2009 | Pinault et al. |
| 7,491,317 B2 | 2/2009 | Meier et al. |
| 7,563,345 B2 | 7/2009 | Tokarz |
| 7,572,362 B2 | 8/2009 | Freel et al. |
| 7,572,365 B2 | 8/2009 | Freel et al. |
| 7,578,927 B2 | 8/2009 | Marker et al. |
| 7,625,432 B2 | 12/2009 | Gouman et al. |
| 7,897,124 B2 | 3/2011 | Gunnerman et al. |
| 7,905,990 B2 | 3/2011 | Freel |
| 7,943,014 B2 | 5/2011 | Berruti et al. |
| 7,956,224 B2 | 6/2011 | Elliott et al. |
| 7,960,598 B2 | 6/2011 | Spilker et al. |
| 7,982,075 B2 | 7/2011 | Marker et al. |
| 7,998,315 B2 | 8/2011 | Bridgwater et al. |
| 7,998,455 B2 | 8/2011 | Abbas et al. |
| 7,999,142 B2 | 8/2011 | Kalnes et al. |
| 7,999,143 B2 | 8/2011 | Marker et al. |
| 8,043,391 B2 | 10/2011 | Dinjus et al. |
| 8,057,641 B2 | 11/2011 | Bartek et al. |
| 8,097,216 B2 | 1/2012 | Beech et al. |
| 8,147,766 B2 | 4/2012 | Spilker et al. |
| 8,153,850 B2 | 4/2012 | Hall et al. |
| 8,202,332 B2 | 6/2012 | Agblevor |
| 8,207,385 B2 | 6/2012 | O'Connor et al. |
| 8,217,211 B2 | 7/2012 | Agrawal et al. |
| 8,277,643 B2 | 10/2012 | Huber et al. |
| 8,288,600 B2 | 10/2012 | Bartek et al. |
| 8,304,592 B2 | 11/2012 | Luebke |
| 8,329,967 B2 | 12/2012 | Brandvold et al. |
| 8,499,702 B2 | 8/2013 | Palmas et al. |
| 8,524,087 B2 | 9/2013 | Frey et al. |
| 2002/0014033 A1 | 2/2002 | Langer et al. |
| 2002/0100711 A1 | 8/2002 | Freel et al. |
| 2002/0146358 A1 | 10/2002 | Smith et al. |
| 2003/0202912 A1 | 10/2003 | Myohanen et al. |
| 2004/0069682 A1 | 4/2004 | Freel et al. |
| 2004/0182003 A1 | 9/2004 | Bayle et al. |
| 2004/0200204 A1 | 10/2004 | Dries et al. |
| 2005/0167337 A1 | 8/2005 | Bunger et al. |
| 2005/0209328 A1 | 9/2005 | Allgood et al. |
| 2006/0010714 A1 | 1/2006 | Carin et al. |
| 2006/0016723 A1 | 1/2006 | Tang et al. |
| 2006/0070362 A1 | 4/2006 | Dewitz et al. |
| 2006/0074254 A1 | 4/2006 | Zhang et al. |
| 2006/0101665 A1 | 5/2006 | Carin et al. |
| 2006/0163053 A1 | 7/2006 | Ershag |
| 2006/0180060 A1 | 8/2006 | Crafton et al. |
| 2006/0201024 A1 | 9/2006 | Carin et al. |
| 2006/0254081 A1 | 11/2006 | Carin et al. |
| 2006/0264684 A1 | 11/2006 | Petri et al. |
| 2007/0000809 A1 | 1/2007 | Lin et al. |
| 2007/0141222 A1 | 6/2007 | Binder et al. |
| 2007/0205139 A1 | 9/2007 | Kulprathipanja et al. |
| 2007/0272538 A1 | 11/2007 | Satchell |
| 2008/0029437 A1 | 2/2008 | Umansky et al. |
| 2008/0035526 A1 | 2/2008 | Hedrick et al. |
| 2008/0035528 A1 | 2/2008 | Marker |
| 2008/0050792 A1 | 2/2008 | Zmierczak et al. |
| 2008/0051619 A1 | 2/2008 | Kulprathipanja et al. |
| 2008/0081006 A1 | 4/2008 | Myers et al. |
| 2008/0086937 A1 | 4/2008 | Hazlebeck et al. |
| 2008/0161615 A1 | 7/2008 | Chapus et al. |
| 2008/0171649 A1 | 7/2008 | Jan et al. |
| 2008/0185112 A1 | 8/2008 | Argyropoulos |
| 2008/0189979 A1 | 8/2008 | Carin et al. |
| 2008/0193345 A1 | 8/2008 | Lott et al. |
| 2008/0194896 A1 | 8/2008 | Brown et al. |
| 2008/0199821 A1 | 8/2008 | Nyberg et al. |
| 2008/0230440 A1 | 9/2008 | Graham et al. |
| 2008/0236043 A1 | 10/2008 | Dinjus et al. |
| 2008/0264771 A1 | 10/2008 | Dam-Johansen et al. |
| 2008/0274017 A1 | 11/2008 | Boykin et al. |
| 2008/0274022 A1 | 11/2008 | Boykin et al. |
| 2008/0282606 A1 | 11/2008 | Plaza et al. |
| 2008/0312476 A1 | 12/2008 | McCall |
| 2008/0318763 A1 | 12/2008 | Anderson |
| 2009/0008292 A1 | 1/2009 | Keusenkothen et al. |
| 2009/0077867 A1 | 3/2009 | Marker et al. |
| 2009/0077868 A1 | 3/2009 | Brady et al. |
| 2009/0078557 A1 | 3/2009 | Tokarz |
| 2009/0078611 A1 | 3/2009 | Marker et al. |
| 2009/0082603 A1 | 3/2009 | Kalnes et al. |
| 2009/0082604 A1 | 3/2009 | Agrawal et al. |
| 2009/0084666 A1 | 4/2009 | Agrawal et al. |
| 2009/0090046 A1 | 4/2009 | O'Connor et al. |
| 2009/0090058 A1 | 4/2009 | Dam-Johansen et al. |
| 2009/0113787 A1 | 5/2009 | Elliott et al. |
| 2009/0139851 A1 | 6/2009 | Freel |
| 2009/0165378 A1 | 7/2009 | Agblevor |
| 2009/0183424 A1 | 7/2009 | Gorbell et al. |
| 2009/0188158 A1 | 7/2009 | Morgan |
| 2009/0193709 A1 | 8/2009 | Marker et al. |
| 2009/0208402 A1 | 8/2009 | Rossi |
| 2009/0227823 A1 | 9/2009 | Huber et al. |
| 2009/0250376 A1 | 10/2009 | Brandvold et al. |
| 2009/0253947 A1 | 10/2009 | Brandvold et al. |
| 2009/0253948 A1 | 10/2009 | McCall et al. |
| 2009/0255144 A1 | 10/2009 | Gorbell et al. |
| 2009/0259076 A1 | 10/2009 | Simmons et al. |
| 2009/0259082 A1 | 10/2009 | Deluga et al. |
| 2009/0283442 A1 | 11/2009 | McCall et al. |
| 2009/0287029 A1 | 11/2009 | Anumakonda et al. |
| 2009/0293344 A1 | 12/2009 | O'Brien et al. |
| 2009/0293359 A1 | 12/2009 | Simmons et al. |
| 2009/0294324 A1 | 12/2009 | Brandvold et al. |
| 2009/0301930 A1 | 12/2009 | Brandvold et al. |
| 2009/0308787 A1 | 12/2009 | O'Connor et al. |
| 2009/0318737 A1 | 12/2009 | Luebke |
| 2009/0321311 A1 | 12/2009 | Marker et al. |
| 2010/0043634 A1 | 2/2010 | Shulfer et al. |
| 2010/0083566 A1 | 4/2010 | Fredriksen et al. |

(56) References Cited

U.S. PATENT DOCUMENTS

| | | | |
|---|---|---|---|
| 2010/0133144 A1 | 6/2010 | Kokayeff et al. |
| 2010/0147743 A1 | 6/2010 | MacArthur et al. |
| 2010/0148122 A1 | 6/2010 | Breton et al. |
| 2010/0151550 A1 | 6/2010 | Nunez et al. |
| 2010/0158767 A1 | 6/2010 | Mehlberg et al. |
| 2010/0162625 A1 | 7/2010 | Mills |
| 2010/0163395 A1 | 7/2010 | Henrich et al. |
| 2010/0266464 A1 | 10/2010 | Sipila et al. |
| 2010/0325954 A1 | 12/2010 | Tiwari et al. |
| 2011/0017443 A1 | 1/2011 | Collins |
| 2011/0068585 A1 | 3/2011 | Dube et al. |
| 2011/0113675 A1 | 5/2011 | Fujiyama et al. |
| 2011/0123407 A1 | 5/2011 | Freel |
| 2011/0132737 A1 | 6/2011 | Jadhav |
| 2011/0139597 A1 | 6/2011 | Lin |
| 2011/0146135 A1 | 6/2011 | Brandvold |
| 2011/0146140 A1 | 6/2011 | Brandvold et al. |
| 2011/0146141 A1 | 6/2011 | Frey et al. |
| 2011/0146145 A1 | 6/2011 | Brandvold et al. |
| 2011/0160505 A1 | 6/2011 | McCall |
| 2011/0182778 A1 | 7/2011 | Breton et al. |
| 2011/0201854 A1 | 8/2011 | Kocal et al. |
| 2011/0224471 A1* | 9/2011 | Wormsbecher et al. ...... 585/899 |
| 2011/0253600 A1 | 10/2011 | Niccum |
| 2011/0258914 A1 | 10/2011 | Banasiak et al. |
| 2011/0284359 A1 | 11/2011 | Sechrist et al. |
| 2012/0012039 A1 | 1/2012 | Palmas et al. |
| 2012/0017493 A1 | 1/2012 | Taynor et al. |
| 2012/0022171 A1 | 1/2012 | Frey |
| 2012/0023809 A1 | 2/2012 | Koch et al. |
| 2012/0047794 A1 | 3/2012 | Bartek et al. |
| 2012/0137939 A1 | 6/2012 | Kulprathipanja |
| 2012/0160741 A1 | 6/2012 | Gong et al. |
| 2012/0167454 A1 | 7/2012 | Brandvold et al. |
| 2012/0172622 A1 | 7/2012 | Kocal |
| 2012/0205289 A1 | 8/2012 | Joshi |
| 2012/0216448 A1 | 8/2012 | Ramirez Coredores et al. |
| 2012/0279825 A1 | 11/2012 | Freel et al. |
| 2012/0317871 A1 | 12/2012 | Frey et al. |
| 2013/0029168 A1 | 1/2013 | Trewella et al. |
| 2013/0062184 A1 | 3/2013 | Kulprathipanja et al. |
| 2013/0067803 A1 | 3/2013 | Kalakkunnath et al. |
| 2013/0075072 A1 | 3/2013 | Kulprathipanja et al. |
| 2013/0078581 A1 | 3/2013 | Kulprathipanja et al. |
| 2013/0105356 A1 | 5/2013 | Dijs et al. |
| 2013/0109765 A1 | 5/2013 | Jiang et al. |
| 2013/0118059 A1 | 5/2013 | Lange et al. |
| 2013/0150637 A1 | 6/2013 | Borremans et al. |
| 2013/0152453 A1 | 6/2013 | Baird et al. |
| 2013/0152454 A1 | 6/2013 | Baird et al. |
| 2013/0152455 A1 | 6/2013 | Baird et al. |
| 2013/0212930 A1 | 8/2013 | Naae et al. |
| 2013/0267743 A1 | 10/2013 | Brandvold et al. |
| 2014/0001026 A1 | 1/2014 | Baird et al. |
| 2014/0140895 A1 | 5/2014 | Davydov et al. |
| 2014/0142362 A1 | 5/2014 | Davydov et al. |

FOREIGN PATENT DOCUMENTS

| | | |
|---|---|---|
| CA | 1312497 | 1/1993 |
| CA | 2091373 | 9/1997 |
| CA | 2299049 | 12/2000 |
| CA | 2299149 | 12/2000 |
| CA | 2521829 | 3/2006 |
| CH | 9903742-6 | 1/2004 |
| CN | 1377938 | 11/2002 |
| CN | 1730177 | 2/2006 |
| CN | 101045524 | 10/2007 |
| CN | 101238197 | 8/2008 |
| CN | 101294085 | 10/2008 |
| CN | 101318622 | 12/2008 |
| CN | 101365770 | 2/2009 |
| CN | 101381611 | 3/2009 |
| CN | 101544901 | 9/2009 |
| CN | 101550347 | 10/2009 |
| CN | 101745349 | 6/2010 |
| CN | 101993712 | 3/2011 |
| EP | 105980 | 1/1986 |
| EP | 578503 | 1/1994 |
| EP | 676023 | 7/1998 |
| EP | 718392 | 9/1999 |
| EP | 787946 | 6/2000 |
| EP | 1420058 | 5/2004 |
| GB | 1019133 | 2/1966 |
| GB | 1300966 | 12/1972 |
| JP | 58150793 | 9/1983 |
| JP | 1277196 | 11/1989 |
| JP | 11148625 | 6/1999 |
| JP | 2001/131560 | 5/2001 |
| JP | 2007/229548 | 9/2007 |
| WO | 91/11499 | 8/1991 |
| WO | 92/07842 | 5/1992 |
| WO | 92/18492 | 10/1992 |
| WO | 94/13827 | 6/1994 |
| WO | 97/44410 | 11/1997 |
| WO | 01/09243 | 2/2001 |
| WO | 01/83645 | 11/2001 |
| WO | 2007/017005 | 2/2007 |
| WO | 2007/045093 | 4/2007 |
| WO | 2007/050030 | 5/2007 |
| WO | 2007/128798 | 11/2007 |
| WO | 2008/009643 | 1/2008 |
| WO | 2008/020167 | 2/2008 |
| WO | 2008/092557 | 8/2008 |
| WO | 2009/019520 | 2/2009 |
| WO | 2009/047387 | 4/2009 |
| WO | 2009/047392 | 4/2009 |
| WO | 2009/099684 | 8/2009 |
| WO | 2009/118357 | 10/2009 |
| WO | 2009/118363 | 10/2009 |
| WO | 2009/126508 | 10/2009 |
| WO | 2012/009207 | 1/2012 |
| WO | 2012/088546 | 6/2012 |

OTHER PUBLICATIONS

Adam, J. "Catalytic conversion of biomass to produce higher quality liquid bio-fuels," *PhD Thesis*, Department of Energy and Process Engineering, The Norwegian University of Science and Technology, Trondheim (2005).

Adam, J. et al. "Pyrolysis of biomass in the presence of Al-MCM-41 type catalysts," *Fuel*, 84 (2005) 1494-1502.

Adjaye, John D. et al. "Catalytic conversion of a biomass-derived oil to fuels and chemicals I: Model compound studies and reaction pathways," *Biomass & Bioenergy*, 8:3 (1995) 131-149.

Adjaye, John D. et al. "Catalytic conversion of a biomass-derived oil to fuels and chemicals II: Chemical kinetics, parameter estimation and model predictions," *Biomass & Bioenergy*, 8:4 (1995) 265-277.

Adjaye, John D. et al. "Catalytic conversion of wood derived bio-oil to fuels and chemicals," *Studies in Surface Science and Catalysis*, 73 (1992) 301-308.

Adjaye, John D. et al. "Production of hydrocarbons by the catalytic upgrading of a fast pyrolysis bio-oil," *Fuel Process Technol*, 45:3 (1995) 161-183.

Adjaye, John D. et al. "Upgrading of a wood-derived oil over various catalysts," *Biomass & Bioenergy*, 7:1-6 (1994) 201-211.

Aho, A. et al. "Catalytic pyrolysis of woody biomass in a fluidized bed reactor; Influence of zeolites structure, Science Direct," *Fuel*, 87 (2008) 2493-2501.

Antonakou, E. et al. "Evaluation of various types of Al-MCM-41 materials as catalysts in biomass pyrolysis for the production of bio-fuels and chemicals," *Fuel*, 85 (2006) 2202-2212.

Atutxa, A. et al. "Kinetic Description of the Catalytic Pyrolysis of Biomass in a Conical Spouted Bed Reactor," *Energy Fuels*, 19:3 (2005) 765-774.

Baker, E. G. et al. "Catalytic Upgrading of Biomass Pyrolysis Oils," in Bridgwater, A. V. et al. (eds) *Research in Thermochemical Biomass Conversion*, Elsevier Science Publishers Ltd., Barking, England (1988) 883-895.

(56) References Cited

OTHER PUBLICATIONS

Baldauf, W. et al. "Upgrading of flash pyrolysis oil and utilization in refineries," *Biomass & Bioenergy*, 7 (1994) 237-244.
Baumlin, "The continuous self stirred tank reactor: measurement of the cracking kinetics of biomass pyrolysis vapours," *Chemical Engineering Science*, 60 (2005) 41-55.
Berg, "Reactor Development for the Ultrapyrolysis Process," *The Canadian Journal of Chemical Engineering*, 67 (1989) 96-101.
Bielansky, P. et al. "Catalytic conversion of vegetable oils in a continuous FCC pilot plant," *Fuel Processing Technology*, 92 (2011) 2305-2311.
Bimbela, F. et al. "Hydrogen production by catalytic steam reforming of acetic acid, a model compound of biomass pyrolysis liquids," *J. Ana App. Pyrolysis*, 79 (2007) 112-120.
Bridgwater et al. (eds) *Fast Pyrolysis of Biomass: A Handbook*, Newbury Cpl Press, Great Britain (2002) 12-13.
Bridgwater, A.V. "Principles and practices of biomass fast pyrolysis processes for liquids," *Journal of Analytical and Applied Pyrolysis*, 51 (1999) 3-22.
Bridgwater, Tony "Production of high grade fuels and chemicals from catalytic pyrolysis of biomass," *Catalysis Today*, 29 (1996) 285-295.
Bridgwater, Tony et al. "Transport fuels from biomass by thermal processing," *EU-China Workshop on Liquid Biofuels*, Beijing, China (Nov. 4-5, 2004).
Buchsbaum, A. et al. "The Challenge of the Biofuels Directive for a European Refinery," *OMW Refining and Marketing, ERTC 9th Annual Meeting*, Prague, Czech Republic (Nov. 15-17, 2004).
Carlson, T. et al. "Aromatic Production from Catalytic Fast Pyrolysis of Biomass-Derived Feedstocks," *Top Catal*, 52 (2009) 241-242.
Carlson., T. et al. "Green Gasoline by Catalytic Fast Pyrolysis of Solid Biomass Derived Compounds," *ChemSusChem*, 1 (2008) 397-400.
Cass et al. "Challenges in the Isolation of Taxanes from *Taxus canadensis* by Fast Pyrolysis," *J Analytical and Applied Pyrolysis* 57 (2001) 275-285.
Chantal, P. D. et al. "Production of Hydrocarbons from Aspen Poplar Pyrolytic Oils over H-ZSM5," *Applied Catalysis*, 10 (1984) 317-332.
Chen, N. Y. et al. "Fluidized Upgrading of Wood Pyrolysis Liquids and Related Compounds," in Soltes, E. J. et al. (eds) *Pyrolysis Oils from Biomass*, ACS, Washington, DC (1988) 277-289.
Chinsuwan, A. et al. "An experimental investigation of the effect of longitudinal fin orientation on heat transfer in membrane water wall tubes in a circulating fluidized bed," *International Journal of Heat and Mass Transfer*, 52:5-6 (2009) 1552-1560.
Cornelissen, T. et al., "Flash co-pyrolysis of biomass with polylactic acid. Part 1: Influence on bio-oil yield and heating value," *Fuel* 87 (2008) 1031-1041.
Cousins, A. et al. "Development of a bench-scale high-pressure fluidized bed reactor and its sequential modification for studying diverse aspects of pyrolysis and gasification of coal and biomass," *Energy and Fuels*, 22:4 (2008) 2491-2503.
Cragg et al. "The Search for New Pharmaceutical Crops: Drug Discovery and Development at the National Cancer Institute," in Janick, J. and Simon, J.E. (eds) *New Crops*, Wiley, New York (1993) 161-167.
Czernik, S. et al. "Hydrogen from biomass-production by steam reforming of biomass pyrolysis oil," *Catalysis Today*, 129 (2007) 265-168.
Czernik, S. et al. "Hydrogren by Catalytic Steam Reforming of Liquid Byproducts from Biomass Thermoconversion Processes," *Ind. Eng. Chem. Res.*, 41 (2002) 4209-4215.
Dahmen, "Rapid pyrolysis for the pretreatment of biomass and generation of bioslurry as intermediate fuel", *Chemie-Ingenieur-Technik*, 79:9 (2007) 1326-1327. Language: German (Abstract only; Machine translation of Abstract).
Dandik, "Catalytic Conversion of Used Oil to Hydrocarbon Fuels in a Fractionating Pyrolysis Reactor," *Energy & Fuels*, 12 (1998) 1148-1152.

Daoust et al. "Canada Yew (*Taxus canadensis Marsh.*) and Taxanes: a Perfect Species for Field Production and Improvement through Genetic Selection," Natural Resources Canada, Canadian Forest Service, Sainte-Fov, Quebec (2003).
de Wild, P. et al. "Lignin valorisation for chemicals and (transportation) fuels via (catalytic) pyrolysis and hydrodeoxygenation," *Environ. Prog. Sustainable Energy*, 28 (2009) 461-469.
Demirbas, Ayhan "Fuel Conversional Aspects of Palm Oil and Sunflower Oil," *Energy Sources*, 25 (2003) 457-466.
Di Blasi, C. et al. "Effects of Potassium Hydroxide Impregnation of Wood Pyrolysis, American Chemical Society," *Energy & Fuels* 23 (2009) 1045-1054.
Ellioti, D. "Historical Developments in Hydroprocessing Bio-oils," *Energy & Fuels*, 21 (2007) 1792-1815.
Ensyn Technologies Inc. "Catalytic de-oxygenation of biomass-derived RTP vapors." Prepared for ARUSIA, Agenzia Regionale Umbria per lo Sviluppo e L'Innovazione, Perugia, Italy (Mar. 1997).
Filtration, Kirk-Othmer Encyclopedia of Chemical Technology 5th Edition. vol. 11., John Wiley & Sons, Inc., Feb. 2005.
Gayubo, A. G. et al. "Deactivation of a HZSM-5 Zeolite Catalyst in the Transformation of the Aqueous Fraction of Biomass Pyrolysis Oil into Hydrocarbons," *Energy &Fuels*, 18:6 (2004) 1640-1647.
Gayubo, A. G. et al. "Undesired components in the transformation of biomass pyrolysis oil into hydrocarbons on an HZSM-5 zeolite catalyst," *J Chem Tech Biotech*, 80 (2005) 1244-1251.
Gevert, Börjie S. et al. "Upgrading of directly liquefied biomass to transportation fuels: catalytic cracking," Biomass 14:3 (1987) 173-183.
Goesele, W. et al., Filtration, Wiley-VCH Verlag GmbH & Co. KGaA, Weinheim, 10.1002/14356007.b02 10, 2005.
Grange, P. et al. "Hydrotreatment of pyrolysis oils from biomass: reactivity of the various categories of oxygenated compounds and preliminary techno-economical study," *Catalysis Today*, 29 (1996) 297-301.
Hama, "Biodiesel-fuel production in a packed-bed reactor using lipase-producing *Rhizopus oryzae* cells immobilized within biomass support particles", *Biochemical Engineering Journal*, 34 (2007) 273-278.
Hoekstra, E. et al., "Fast Pyrolysis of Biomass in a Fluidized Bed Reactor: In Situ Filtering of the Vapors," *Ind. Eng. Chem. Res.*, 48:10 (2009) 4744-4756.
Holton et al. "First Total Synthesis of Taxol. 2. Completion of the C and D Rings," *J Am Chem Soc*, 116 (1994) 1599-1600.
Horne, Patrick A. et al. "Catalytic coprocessing of biomass-derived pyrolysis vapours and methanol," *J. Analytical and Applied Pyrolysis*, 34:1 (1995) 87-108.
Horne, Patrick A. et al. "Premium quality fuels and chemicals from the fluidised bed pyrolysis of biomass with zeolite catalyst upgrading," *Renewable Energy*, 5:5-8 (1994) 810-812.
Horne, Patrick a. et al. "The effect of zeolite ZSM-5 catalyst deactivation during the upgrading of biomass-derived pyrolysis vapours," *J Analytical and Applied Pyrolysis*, 34:1 (1995) 65-85.
Huang et al. "New Taxanes from *Taxus brevifolia*," *J of Natural Products*, 49 (1986) 665-669.
Huffman, D. R. et al., Ensyn Technologies Inc., "Thermo-Catalytic Cracking of Wood to Transportation Fuels," DSS Contract No. 38SQ. 23440-4-1429, Efficiency and Alternative Energy Technology Branch, Natural Resources Canada, Ottawa, Canada (1997).
Huffman, D. R., Ensyn Technologies Inc., "Thermo-catalytic cracking of wood to transportation fuels using the RTP process," DSS Contract No. 38SQ.23440-4-1429, Efficiency and Alternative Energy Technology Branch, Natural Resources Canada, Ottawa, Ontario (Jan. 1997).
Hughes, J. et al. "Structural variations in natural F. OH and Cl apatites," *American Mineralogist*, 74 (1989) 870-876.
Huie, C. W. "A review of modern sample-preparation techniques for the extraction and analysis of medicinal plants," *Anal Bioanal Chem*, 373 (2002) 23-30.
International Search Report dated Feb. 22, 2013 for corresponding International Application No. PCT/US2012/68876.
Ioannidou, "Investigating the potential for energy, fuel, materials and chemicals production from corn residues (cobs and stalks) by non-

(56) References Cited

OTHER PUBLICATIONS catalytic and catalytic pyrolysis in two reactor configurations," *Renewable and Sustainable Energy Reviews*, 13 (2009) 750-762.
Iojoiu, E. et al. "Hydrogen production by sequential cracking of biomass-derived pyrolysis oil over noble metal catalysts supported on ceria-zirconia," *Applied Catalysis A: General*, 323 (2007) 147-161.
Jackson, M. et al. "Screening heterogenous catalysts for the pyrolysis of lignin," *J. Anal. Appl. Pyrolysis*, 85 (2009) 226-230.
Junming et al. "Bio-oil upgrading by means of ethyl ester production in reactive distillation to remove water and to improve storage and fuel characteristics," *Biomass and Energy*, 32 (2008) 1056-1061.
Kalnes, Tom et al. "Feedstock Diversity in the Refining Industry," UOP Report to NREL and DOE (2004).
Khanal, "Biohydrogen Production in Continuous-Flow Reactor Using Mixed Microbial Culture," *Water Environment Research*, 78:2 (2006) 110-117.
Khimicheskaya Entsiklopediya. Pod red. N. S. Zefirov. Moskva, Nauchnoe Izdatelstvo "Bolshaya Rossyskaya Entsiklopediya", 1995, p. 133-137,529-530.
Kingston et al. "New Taxanes from *Taxus brevifolia*," *J of Natural Products*, 45 (1982) 466-470.
Lappas, A. A. et al. "Biomass pyrolysis in a circulating fluid bed reactor for the production of fuels and chemicals," *Fuel*, 81 (2002) 2087-2095.
Lappas, A. A. et al. "Production of Transportation Fuels from Biomass," *Workshop of Chemical Process Engineering Research Institute/Center for Research and Technology Hellas*, Thermi-Thessaloniki, Greece (2004).
Lappas, A.A., "Production of biofuels via co-processing in conventional refining process," *Catalysis Today*, 145 (2009) 55-62.
Maiti, R.N. et al. "Gas-liquid distributors for trickle-bed reactors: A review"; *Industrial and Engineering Chemistry Research*, 46:19 (2007) 6164-6182.
Mancosky, "The use of a controlled cavitation reactor for bio-diesel production," (abstract only), AIChE Spring National Meeting 2007, Houston, Texas.
Marker, Terry L., et al. "Opportunities for Biorenewables in Petroleum Refineries," Proceedings of the 230th ACS National Meeting, Washington, DC, Paper No. 125, Fuel Division (Aug. 31, 2005) (abstract only).
Marker, Terry L. et al., UOP, "Opportunities for Biorenewables in Oil Refineries," Final Technical Report, U.S. Department of Energy Award No. DE-FG36-05G015085, Report No. DOEGO15085Final (2005).
Marquevich, "Hydrogen from Biomass: Steam Reforming of Model Compounds of Fast-Pyrolysis Oil," *Energy & Fuels*, 13 (1999) 1160-1166.
Masoumifard, N. et al. "Investigation of heat transfer between a horizontal tube and gas-solid fluidized bed," *International Journal of Heat and Fluid Flow*, 29:5 (2008) 1504-1511.
McLaughlin et al. "19-Hydroxybaccatin III, 10-Deacetylcephalo-Mannine, and 10-Deacetyltaxol: New Anti-Tumor Taxanes from *Taxus wallichiana*," *J of Natural Products*, 44 (1981) 312-319.
McNeil "Semisynthetic Taxol Goes on Market Amid Ongoing Quest for New Versions," *J of the National Cancer Institute*, 87:15 (1995) 1106-1108.
Meier, D. et al. "State of the art of applied fast pyrolysis of lignocellulosic materials—a review," *Bioresource Technology*, 68:1 (1999) 71-77.
Meier, D. et al., "Pyrolysis and Hydroplysis of Biomass and Lignins—Activities at the Institute of Wood Chemistry in Hamburg, Germany," vol. 40, No. 2, Preprints of Papers Presented at the 209th ACS National Meeting, Anaheim, CA (Apr. 2-7, 1995).
Mercader, F. et al. "Pyrolysis oil upgrading by high pressure thermal treatment," *Fuel*, 89:10 (2010) 2829-2837.
Miller et al. "Antileukemic Alkaloids from *Taxus wallichiana Zucc,*" *J Org Chem*, 46 (1981) 1469-1474.
Mohan, D. et al. "Pyrolysis of Wood/Biomass for Bio-oil: A Critical Review," *Energy Fuels*, 20:3 (2006) 848-849.

Newton "Taxol: A Case Study in Natural Products Chemistry," Lecture Notes, University of Southern Maine, http://www.usm.maine.edu/ (2009) 1-6.
Nicolaou et al. "Total Synthesis of Taxol," *Nature*, 367 (1994) 630-634.
Nowakowski, D. et al. "Potassium catalysis in the pyrolysis behaviour of short rotation willow coppice," *Fuels*, 86 (2007) 2389-2402.
Ognisty, T. P. "The direct contact heat transfer performance of a spray nozzle, a notched through distributor, and two inch Pall rings," AlChE 1990 Spring National Meeting (Orlando 3/18-22-90) Preprint N. 37c 36P, Mar. 18, 1990.
Ohman "Bed Agglomeration Characteristics during Fluidized Bed Combustion of Biomass Fuels," *Energy& Fuels*, 14 (2000) 169-178.
Okumura, Y. et al. "Pyrolysis and gasification experiments of biomass under elevated pressure condition," Nihon Kikai Gakkai Ronbunshu, B Hen/Transactions of the Japan Society of Mechanical Engineers, Part B, vol. 73, No. 7, 2007, pp. 1434-1441.
Olazar, M. et al. "Pyrolysis of Sawdust in a Conical Spouted-Bed Reactor with a HZSM-5 Catalyst," *AlChE Journal*, 46:5 (2000) 1025-1033.
Onay "Influence of pyrolysis temperature and heating rate on the production of bio-oil and char from safflower seed by pyrolysis, using a well-swept fixed-bed reactor," *Fuel Processing Technology*, 88 (2007) 523-531.
Onay, "Production of Bio-Oil from Biomass: Slow Pyrolysis of Rapeseed (*Brassica napus* L.) in a Fixed-Bed Reactor," *Energy Sources*, 25 (2003) 879-892.
Ong et al. "Pressurized hot water extraction of bioactive or marker compounds in botanicals and medicinal plant materials," *J Chromatography A*, 1112 (2006) 92-102.
Ooi, Y. S. et al. "Catalytic Cracking of Used Palm Oil and Palm Oil Fatty Acids Mixture for the Production of Liquid Fuel: Kinetic Modeling" *J Am Chem Soc*, 18 (2004) 1555-1561.
Otterstedt, J. E. et al. "Catalytic Cracking of Heavy Oils," in Occelli, Mario L. (ed) Fluid Catalytic Cracking, Chapter 17, ACS, Washington, DC (1988) 266-278.
Padmaja, K.V. et al. "Upgrading of Candelilla biocrude to hydrocarbon fuels by fluid catalytic cracking," *Biomass and Bioenergy*, 33 (2009) 1664-1669.
Pavia et al., Intro to Org Labo Techniques (1988) 3d ed. Saunders College Publishing, Washington p. 62-66, 541-587.
PCT/US2012/055384 International Search Report, dated Mar. 28, 2013, and International Preliminary Report on Patentability, dated Mar. 25, 2014.
Pecora, A.A.B. at al., "Heat transfer coefficient in a shallow fluidized bed heat exchanger with a continuous ftow of solid particles," *Journal of the Brazilian Society of Mechanical Sciences and Engineering*, 28:3 (2006) 253-258.
Pecora, A.A.B., et al., "An analysis of process heat recovery in a gas-solid shallow fluidized bed," *Brazilian Journal of Chemical Engineering*, 23:4 (2006) 497-506.
Petrik, P.T. et al. "Heat exchange in condensation of R227 coolant on inclined tubes placed in a granular BED," *Journal of Engineering Physics and Thermophysics*, 77:4 (2004) 758-761.
Prasad Y. S. et al. "Catalytic conversion of canola oil to fuels and chemical feedstocks. Part II. Effect of co-feeding steam on the performance of HZSM-5 catalyst," *Can J Chem Eng*, 64 (1986) 285-292.
Prins, Wolter et al. "Progress in fast pyrolysis technology," *Topsoe Catalysis Forum* 2010, Munkerupgaard, Denmark (Aug. 19-20, 2010).
Radlein, D. et al. "Hydrocarbons from the Catalytic Pyrolysis of Biomass," *Energy & Fuels*, 5 (1991) 760-763.
Rao "Taxol and Related Taxanes. I. Taxanes of *Taxus brevifolia* Bark," *Pharm Res* 10:4 (1993) 521-524.
Rao et al. "A New Large-Scale Process for Taxol and Related Taxanes from *Taxus brevifolia*," *Pharm Res*, 12:7 (1995) 1003-1010.
Ravindranath, G., et al., "Heat transfer studies of bare tube bundles in gas-solid fluidized bed", 9th International Symposium on Fluid Control Measurement and Visualization 2007, FLUCOME 2007, vol. 3, 2007, pp. 1361-1369.

(56) References Cited

OTHER PUBLICATIONS

Rodriguez, O.M.H. et al. "Heat recovery from hot solid particles in a shallow fluidized bed," *Applied Thermal Engineering*, 22:2 (2002) 145-160.

Samolada, M. C. et al. "Production of a bio-gasoline by upgrading biomass flash pyrolysis liquids via hydrogen processing and catalytic cracking," *Fuel*, 77:14 (1998) 1667-1674.

Sang "Biofuel Production from Catalytic Cracking of Palm Oil," *Energy Sources*, 25 (2003) 859-869.

Scahill, J. et al. "Removal of Residual Char Fines from Pyrolysis Vapors by Hot Gas Filtration," in Bridgwater, A. V. et al. (eds) *Developments in Thermochemical Biomass Conversion*, Springer Science+Business Media, Dordrecht (1997) 253-266.

Scott, D. et al. *Pretreatment of poplar wood for fast pyrolysis: rate of cation removal, Journal of Analytical and Applied Pyrolysis*, 57 (2000) 169-176.

Senilh et al. "Mise en Evidence de Nouveaux Analogues du Taxol Extraits de *Taxus baccata*," *J of Natural Products*, 47 (1984) 131-137. (English Abstract included).

Sharma, R. "Upgrading of pyrolytic lignin fraction of fast pyrolysis oil to hydrocarbon fuels over HZSM-5 in a dual reactor system," *Fuel Processing Technology*, 35 (1993) 201-218.

Sharma, R. K. et al. "Catalytic Upgrading of Pyrolysis Oil," *Energy & Fuels*, 7 (1993) 306-314.

Sharma, R. K. et al. "Upgrading of wood-derived bio-oil over HZSM-5," *Bioresource Technology*, 35:1 (1991) 57-66.

Smith R.M. "Extractions with superheated water," *J Chromatography A*, 975 (2002) 31-46.

Snader "Detection and Isolation," in Suffness, M. (ed) *Taxol-Science and Applications*, CRC Press, Boca Raton, Florida (1995) 277-286.

Srinivas, S.T. et al "Thermal and Catalytic Upgrading of a Biomass-Derived Oil in a Dual Reaction System," *Can. J. Chem. Eng.*, 78 (2009) 343-354.

Stierle et al. "The Search for Taxol-Producing Microorganism Among the Endophytic Fungi of the Pacific Yew, *Taxus brevifolia*," *J of Natural Products*, 58 (1995) 1315-1324.

Stojanovic, B. et al. "Experimental investigation of thermal conductivity coefficient and heat exchange between fluidized bed and inclined exchange surface," *Brazilian Journal of Chemical Engineering*, 26:2 (2009) 343-352.

Sukhbaatar, B. "Separation of Organic Acids and Lignin Fraction From Bio-Oil and Use of Lignin Fraction in Phenol-Formaldehyde Wood Adhesive Resin," *Master's Thesis*, Mississippi State (2008).

Twaiq, A. A. et al. "Performance of composite catalysts in palm oil cracking for the production of liquid fuels and chemicals," *Fuel Processing Technology*, 85 (2004) 1283-1300.

Twaiq, F. A. et al. "Liquid hydrocarbon fuels from palm oil by catalytic cracking over aluminosilicate mesoporous catalysts with various Si/Al ratios," *Microporous and Mesoporous Materials*, 64 (2003) 95- 107.

Tyson, K. et al. "Biomass Oil Analysis: Research Needs and Recommendations," National Renewable Energy Laboratory, Report No. NREL/TP-510-34796 (Jun. 2004).

Valle, B. et al. "Integration of Thermal Treatment and Catalytic Transformation for Upgrading Biomass Pyrolysis Oil," *International Journal of Chemical Reactor Engineering*, 5:1 (2007).

Vasanova, L.K. "Characteristic features of heat transfer of tube bundles in a cross water-air flow and a three-phase fluidized bed," *Heat Transfer Research*, 34:5-6 (2003) 414-420.

Vitolo, S. et al. "Catalytic upgrading of pyrolytic oils over HZSM-5 zeolite: behaviour of the catalyst when used in repeated upgrading—regenerating cycles," *Fuel*, 80 (2001) 17-26.

Vitolo, S. et al. "Catalytic upgrading of pyrolytic oils to fuel over different zeolites," *Fuel*, 78:10 (1999) 1147-1159.

Wang, Xianhua et al., "The Influence of Microwave Drying on Biomass Pyrolysis," *Energy & Fuels* 22 (2008) 67-74.

Westerhof, Roel J. M. et al., "Controlling the Water Content of Biomass Fast Pyrolysis Oil," *Ind. Eng. Chem. Res.* 46 (2007) 9238-9247.

Williams, Paul T. et al. "Characterisation of oils from the fluidised bed pyrolysis of biomass with zeolite catalyst upgrading," *Biomass and Bioenergy*, 7:1-6 (1994) 223-236.

Williams, Paul T. et al. "Compa son of products from the pyrolysis and catalytic pyrolysis of rice husks," *Energy*, 25:6 (2000) 493-513.

Williams, Paul T. et al. "The influence of catalyst type on the composition of upgraded biomass pyrolysis oils," *J Analytical and Applied Pyrolysis*, 31 (1995) 39-61.

Yukimune et al. "Methyl Jasmonate-induced Overproduction of Paclitaxel and Baccatin III in Taxus Cell Suspension Cultures," *Nature Biotechnology* 14 (1996) 1129-1132.

Zhang et al. "Investigation on initial stage of rapid pyrolysis at high pressure using Taiheiyo coal in dense phase," *Fuel*, 81:9 (2002) 1189-1197.

Zhang, "Hydrodynamics of a Novel Biomass Autothermal Fast Pyrolysis Reactor: Flow Pattern and Pressure Drop," *Chem. Eng. Technol.*, 32:1 (2009) 27-37.

Graham, R.G. et al. "Thermal and Catalytic Fast Pyrolysis of Lignin by Rapid Thermal Processing (RPT)," Seventh Canadian Bioenergy R&D Seminar, Skyline Hotel, Ottawa, Ontario, Canada, Apr. 24-26, 1989.

Wisner, R. "Renewable Identification Nos. (RINs) and Government Biofuels Blending Mandates," *AgMRC Renewable Energy Newsletter* (Apr. 2009), available at http://www.agmrc.org/renewable_energy/biofuelsbiorefining_general/renewable-identification-numbers-rins-and-government-biofuels-blending-mandates/.

\* cited by examiner

METHODS FOR RENEWABLE FUELS WITH REDUCED WASTE STREAMS

CROSS REFERENCE TO RELATED APPLICATIONS

This application is a continuation of U.S. patent application Ser. No. 13/709,822, filed Dec. 10, 2012, which application is fully incorporated herein by reference in its entirety. This application also claims priority to: U.S. Provisional Application No. 61/569,712, filed Dec. 12, 2011; U.S. Provisional Application No. 61/646,152, filed May 11, 2012; and U.S. Provisional Application No. 61/673,683, filed Jul. 19, 2012. Priority to each of these provisional applications is expressly claimed, and the disclosures of each of these respective provisional applications are hereby incorporated by reference in their entireties for all purposes.

The present disclosure relates to: U.S. Pat. No. 7,905,990; U.S. Pat. No. 5,961,786; and U.S. Pat. No. 5,792,340, each of which are hereby further incorporated by reference in their entirety.

FIELD OF THE INVENTION

The present disclosure generally relates to the introduction of a renewable fuel or renewable oil as a feedstock into refinery systems or field upgrading equipment. More specifically, the present disclosure is directed to methods of introducing a liquid thermally produced from biomass into a petroleum conversion unit; for example, a refinery fluid catalytic cracker (FCC), a coker, a field upgrader system, a hydrocracker, and/or hydrotreating unit; for co-processing with petroleum fractions, petroleum fraction reactants, and/or petroleum fraction feedstocks and the products, e.g., fuels, and uses and value of the products resulting therefrom.

BACKGROUND

Biomass has been a primary source of energy over much of human history. During the late 1800's and 1900's the proportion of the world's energy sourced from biomass dropped, as the commercial development and utilization of fossil fuels occurred, and markets for coal and petroleum products dominated. Nevertheless, some 15% of the world's energy continues to be sourced from biomass, and in developing countries the contribution of biomass is much higher at 38%. In addition, there has been a new awareness of the impact of the utilization of fossil fuels on the environment. In particular, the contribution of greenhouse gases, as a result of consuming fossil fuels.

Biomass, such as wood, wood residues, and agricultural residues, can be converted to useful products, e.g., fuels or chemicals, by thermal or catalytic conversion. An example of thermal conversion is pyrolysis where the biomass is converted to a liquid and char, along with a gaseous co-product by the action of heat in essentially the absence of oxygen.

In a generic sense, pyrolysis is the conversion of biomass to a liquid and/or char by the action of heat, typically without involving any significant level of direct combustion of the biomass feedstock in the primary conversion unit.

Historically, pyrolysis was a relatively slow process where the resulting liquid product was a viscous tar and "pyroligneous" liquor. Conventional slow pyrolysis has typically taken place at temperatures below 400° C., and over long processing times ranging from several seconds to minutes or even hours with the primary intent to produce mainly charcoal and producing liquids and gases as by-products.

A more modern form of pyrolysis, or rapid thermal conversion, was discovered in the late 1970's when researchers noted that an extremely high yield of a light, pourable liquid was possible from biomass. In fact, liquid yields approaching 80% of the weight of the input of a woody biomass material were possible if conversion was allowed to take place over a very short time period, typically less than 5 seconds.

The homogeneous liquid product from this rapid pyrolysis, which has the appearance of a light to medium petroleum fuel oil, can be considered renewable oil. Renewable oil is suitable as a fuel for clean, controlled combustion in boilers, and for use in diesel and stationary turbines. This is in stark contrast to slow pyrolysis, which produces a thick, low quality, two-phase tar-aqueous mixture in very low yields.

In practice, the short residence time pyrolysis of biomass causes the major part of its organic material to be instantaneously transformed into a vapor phase. This vapor phase contains both non-condensable gases (including methane, hydrogen, carbon monoxide, carbon dioxide and olefins) and condensable vapors. It is the condensable vapors that constitute the final liquid product, when condensed and recovered, and the yield and value of this liquid is a strong function of the method and efficiency of the downstream capture and recovery system.

Given the fact that there is a limited availability of hydrocarbon crude and an ever increasing demand for energy, particularly liquid transportation fuels, alternative sources are therefore required. The abundance and sustainability of biomass makes this renewable feedstock an attractive option to supplement the future demand for petroleum. The difficulty with biomass is the fact that it contains oxygen, unlike conventional hydrocarbon fuels, and historically has not been readily convertible into a form that can be easily integrated into existing hydrocarbon based infrastructure.

A significant amount of work has been done to investigate the production of liquid hydrocarbon fuels from biomass by various thermal and thermocatalytic schemes. U.S. Pat. No. 5,792,340; U.S. Pat. No. 5,961,786; Lappas et al., *Biomass Pyrolysis in a Circulating Fluid Bed Reactor for the Production of Fuels and Chemicals*, Fuel 81 (2002), 2087-2095); and Samolada et al., *Catalyst Evaluation for Catalytic Biomass Pyroloysis*, Fuel & Energy 2000, 14, 1161-1167, describe the direct processing of biomass or other oxygenated carbonaceous feedstocks in a circulating fluid bed reactor using a catalyst (zeolite FCC catalyst) as the solid circulating media in an effort to directly deoxygenate the biomass and produce transportation fuels or fuel blends, as well as other hydrocarbons. Although some hydrocarbon products were produced, the yields were unacceptably low, and there was a high yield of char or coke and by-product gas produced. In addition, there were frequent issues with reactor fouling and plugging, and other serious technical difficulties associated with catalyst performance. Not only were the liquid yields lower, much of liquid product produced would require further upgrading and treatment to enable any direct immediate use in place of fossil fuel-based hydrocarbons.

Given the above limitations, another alternative for hydrocarbon production from biomass is to convert solid biomass first into a thermally-produced or thermocatalytically-produced liquid, and then feed this neat liquid (i.e. 100% liquid biomass product) into a circulating fluid bed reactor using a FCC catalyst or other appropriate catalyst as the solid circulating media (Adjaye et al., *Production of Hydrocarbons by Catalytic Upgrading of a Fast Pyrolysis Bio-oil*, Fuel Processing Technology 45 (1995), 185-192). Again, in this case, unacceptable hydrocarbon yields were achieved, reactor plugging and fouling was often evident, and much of the feedstock was converted to char/coke, gas and an oxygen-rich liquid that tended to separate into different liquid phases.

The use of catalytic cracking of a solid or liquid biomass, a biomass-derived vapor, or a thermally-produced liquid as a means to produce hydrocarbons from oxygenated biomass is technically complex, relatively inefficient, and produces significant amounts of low value byproducts. To solve the catalyst and yield issues, researchers looked at stand-alone upgrading pathways where biomass-derived liquids could be converted to liquid hydrocarbons using hydrogen addition and catalyst systems in conversion systems that were tailored specifically for the processing of oxygenated materials (Elliott, *Historical Developments in Hydroprocessing Bio-oils*, Energy & Fuels 2007, 21, 1792-1815). Although technically feasible, the large economies-of-scale and the technical complexities and costs associated with high-pressure multi-stage hydrogen addition (required for complete conversion to liquid hydrocarbon fuels) are severely limiting and generally viewed as unacceptable.

As a means to overcome the technical and economic limitations associated with full stand-alone biomass upgrading to transportation fuels, researchers (de Miguel Mercader, *Pyrolysis Oil Upgrading for Co-Processing in Standard Refinery Units*, Ph.D Thesis, University of Twente, 2010 ("Mercader"); Fogassy et al., *Biomass Derived Feedstock Co-Processing with EGO for Hybrid Fule Production in FCC Units*, Institut de Recherches sur la Catalyse et l'Environnement de Lyon, UMR5236 CNRS-UCBL ("Fogassy"); Gutierrez et al., *Co-Processing of Upgraded Bio-Liquids in Standard Refinery Units—Fundamentals*, 15$^{th}$ European Biomass Conference & Exhibition, Berlin May 7-11, 2007) are looking at various schemes for partial upgrading of the oxygenated biomass to reduce oxygen, followed by the co-processing of this intermediate biomass product with petroleum feedstocks in existing petroleum refinery operations. These initiatives are all focused on hydrodeoxygenation of the biomass-derived liquid prior to co-processing with petroleum, and are predicated on the consideration that hydrotreatment of the thermally produced liquid is necessary prior to petroleum co-processing in order to avoid rapid FCC catalyst deactivation and reactor fouling, and to preclude excessive coke and gas production. Hence, the published studies and prior art include the co-processing of petroleum in fluid catalytic cracking (FCC) refinery units with upgraded liquids that have been hydrotreated after their initial thermal production from biomass.

The early FCC units traditionally used dense phase bed reactor systems to enable good contact between the catalyst and the hydrocarbon feedstock. Long residence times were required to ensure sufficient conversion of the feedstock to the desired product. As catalyst systems improved and the catalyst became more active, the FCC was redesigned to incorporate a riser configuration. The riser configuration enabled contact times between the catalyst and hydrocarbon feedstock to be reduced to somewhere around 2 to 3 seconds (does not include any residence time in the reactor vessel or termination section).

One drawback of many, if not most of the early FCC designs was the riser termination systems that essentially linked the riser to an open reactor vessel that housed the solids separation devices. It had been recognized for several years that significant post riser thermal cracking occurs in commercial FCC units resulting in the substantial production of dry gas and other lower value products. The two mechanisms by which this occurs are through thermal and dilute catalytic cracking. Thermal cracking results from extended residence times of hydrocarbon vapors in the reactor disengaging area, and leads to high dry gas yields via non-selective free radical cracking mechanisms. Dilute phase catalytic cracking results from extended contact between catalyst and hydrocarbon vapors downstream of the riser. While much of this was eliminated in the transition from bed to riser cracking, there is still a substantial amount that can occur in the dilute phase due to significant catalyst holdup which occurs without an advanced termination system design.

Many FCC vendors and licensors offer advanced riser termination systems to minimize post-riser cracking, and many if not most units have implemented these in both new unit and revamp applications. In addition, some refiners have implemented their own "in-house" designs for the same purpose. Given the complexity and diversity of FCC units as well as new unit design differences, there are many variations of these advanced termination systems such as "closed" cyclones, "close-coupled" cyclones, "direct coupled" cyclones, "high containment systems", "vortex separation system", etc. There are differences in the specific designs, and some may be more appropriate for specific unit configurations than others, but all serve the same fundamental purpose of reducing the undesirable post-riser reactions.

Contact time of the catalyst with the feedstock is comprised of the residence time in the riser and often includes the residence time in the advanced riser termination system as described above. Typical riser residence times are about 2 to 3 seconds and the additional termination system residence time may be about 1 to 2 seconds. This leads to an overall catalyst contact time of about 3 to 5 seconds.

One innovative embodiment that forms part of the present application may be to processes employing thermally-produced liquids in conjunction with petroleum based materials in FCCs or field upgrader operations. For example, a method that includes the co-processing of an non-hydrotreated biomass derived liquid in small amounts with VGO or other crude oil based liquids in the FCC or field upgrader operations.

Another innovative embodiment that forms part of the present application may be for biomass conversion that the prior art has overlooked and intentionally avoided: the co-processing of non-upgraded, thermally-produced liquid with hydrocarbons in a manner which removes the complexity of intermediate upgrading steps and yet may be still compatible with crude oil feedstock processing. As already indicated, the prior art has clearly shown that non-treated, thermally-produced biomass liquids are not suitable for conversion to liquid hydrocarbons directly in FCC and other catalytic conversion systems. Therefore when various schemes of co-processing with petroleum in existing refinery operations are considered in the prior art, including FCC co-processing, the co-processing of non-upgraded, non-treated thermal biomass liquids may be excluded from these co-processing options (Mercader; Fogassy). However, as set forth in the present disclosure, unexpected technical and economic benefits are in fact evident in the co-processing of thermally-derived biomass products with petroleum feedstocks in various refinery operations.

BRIEF SUMMARY OF THE APPLICATION

In certain embodiments, the invention relates a fuel composition derived from a petroleum fraction feedstock and a renewable fuel oil feedstock. In certain embodiments, the invention relates a fuel composition derived from a petroleum fraction feedstock and a renewable fuel oil feedstock co-processed in the presence of a catalyst. In certain embodiments, the invention relates a fluidized catalytic cracker product composition derived from a feedstock comprising a renewable fuel oil. In certain embodiments, the invention relates a fuel composition derived from greater than 80 wt. % of a petroleum fraction feedstock and less than 20 wt. % of a renewable fuel oil feedstock that may have been processed in a conversion unit, in the presence of a catalyst.

In certain embodiments, the invention relates to a fuel comprising a product of a conversion unit, such as a fluidized catalytic cracker, having a petroleum fraction and a renewable fuel oil as reactants. In certain embodiments the invention relates to fuel comprising a product of a refinery conversion unit co-processing a petroleum fraction jointly with a renewable fuel oil. In certain embodiments, the invention relates to a fuel comprising a product of a refinery conversion unit wherein the conversion unit receives a petroleum fraction and a renewable fuel oil.

In certain embodiments, the invention relates to a method of preparing a fuel, for example a transportation fuel, comprising providing a renewable fuel oil feedstock with a petroleum fraction feedstock in the presence of a catalyst. In certain embodiments, the invention relates to a method of preparing a fuel, comprising processing a petroleum fraction feedstock with a renewable fuel oil feedstock in the presence of a catalyst.

In certain embodiments, the invention relates to a method of preparing a fuel comprising processing a petroleum fraction feedstock with a renewable fuel oil feedstock in the presence of a catalyst and, optionally, adjusting feed addition rates of the petroleum fraction feedstock, the renewable fuel oil feedstock, or both, to target a particular fuel product profile, riser temperature, or reaction zone temperature; and/or, optionally, adjusting catalyst to combined petroleum fraction feedstock and renewable fuel oil feedstock ratio (catalyst:oil ratio) to target a particular fuel product profile, riser temperature, or reaction zone temperature; wherein the catalyst:oil ratio is a weight ratio or a volume ratio.

In certain embodiments, the invention relates to a method of co-processing a petroleum fraction feedstock and a renewable fuel oil such that the fuel product has at least 70 vol. % of gasoline and LCO or at least 70 vol. % of transportation fuel, relative to the total volume of product resulting from the product stream of the conversion unit.

In certain embodiments, the invention relates to a method of improving petroleum conversion in a refinery, comprising processing a petroleum fraction substituted with a renewable fuel oil (on an equivalent energy basis and/or carbon content basis) in the presence of a catalyst.

In certain embodiments, the invention relates to a method of increasing fuel yield, for example the yield of one or more of gasoline, diesel fuel, LPG, LCO, heating oil, and/or jet fuel, from conversion of a petroleum fraction feedstock, comprising processing a petroleum fraction feedstock with a renewable fuel oil feedstock in the presence of a catalyst.

In certain embodiments, the invention relates a fluidized catalytic cracker apparatus comprising a riser having a petroleum fraction injection port and a renewable fuel injection port or a riser that has been retro-fitted to add an element to allow for the injection of renewable fuel. In certain embodiments, the invention relates a refinery system, comprising a first assembly for introduction of a petroleum fraction feedstock; and a second assembly for introduction of a renewable fuel oil feedstock or has been retro-fitted to add the same. In certain embodiments, the invention relates a refinery system, comprising a first assembly for introduction of a petroleum fraction feedstock; and a second assembly for introduction of a renewable fuel oil feedstock into the conversion unit of the refinery or has been retro-fitted or adapted to add the same.

In certain embodiments, the invention relates to one or more units (for example a conversion unit) in a refinery system suitable for accepting a renewable fuel oil feedstock, comprising an installed independent port for introducing the renewable fuel oil feedstock. In certain embodiments, the invention relates to refinery system comprising an additional or modified riser assembly suitable for accepting the renewable fuel oil, for example an independent port comprising a nozzle; a separate or independent tankage for introducing the renewable fuel oil feedstock; an installed, re-calibrated, or modified or independent control or control system; and/or an installed live-tap for introducing the renewable fuel oil feedstock.

In certain embodiments, the invention relates a method of increasing mix-zone temperature in an FCC unit comprising injecting between 0.05-15 wt. % renewable fuel oil feedstock via a quench riser system downstream (after) of the introduction of a petroleum fraction feedstock injection nozzle.

In certain embodiments, the invention relates to a method of co-processing a renewable fuel oil; that has a carbon content level in the range of between 35-80 wt. %, on a dry basis moisture-free basis and/or an energy content level of at least 30% of the energy content contained in the biomass from which it is derived; and a petroleum fraction feedstock; that comprises a gas oil (GO) feedstock, a vacuum gas oil (VGO) feedstock, a heavy gas oil (HGO) feedstock, a middle distillate feedstock, a heavy-middle distillate feedstock, a hydrocarbon-based feedstock, or combinations thereof; by introducing the renewable fuel oil and the petroleum gas fraction feedstock into a conversion unit wherein they have contact with a catalyst.

In certain embodiments, the invention relates to a fuel (for example diesel fuel and/or gasoline) producing pathway for generating cellulosic renewable identification numbers comprising converting a cellulosic feedstock via rapid thermal processing to form a renewable fuel oil and co-processing a petroleum fraction feedstock with the renewable fuel oil in the presence of a catalyst to produce a cellulosic renewable identification number-compliant fuel. In certain embodiments, the invention relates a diesel fuel and/or gasoline producing pathway for generating cellulosic renewable identification numbers comprising thermally converting a renewable [cellulosic] biomass feedstock to form a renewable fuel oil and co-processing a petroleum fraction feedstock with the renewable fuel oil in a refinery to produce a diesel fuel and/or gasoline that complies with a fuel pathway specified in U.S. renewable fuel standard program (RFS) regulations for generating the cellulosic renewable identification number. In certain embodiments, the invention relates to a fuel producing pathway for generating cellulosic renewable identification numbers comprising thermally processing a cellulosic feedstock via rapid thermal processing to form an unenriched renewable fuel oil and processing a petroleum fraction feedstock with the unenriched renewable fuel oil in a refinery to produce a unit of diesel fuel sufficient to generate greater than 0.5 units of a cellulosic renewable identification number-compliant fuel.

In certain embodiments, the invention relates to a transportation fuel comprising a product resulting from the catalytic conversion of a mixture comprising greater than 90 wt. % of a petroleum fraction feedstock and less than 10 wt. % of an unenriched renewable fuel oil feedstock derived from biomass (for example a cellulosic biomass).

In certain embodiments, the invention relates to a method of preparing a cellulosic renewable identification number qualifying-fuel comprising, optionally, forming a renewable fuel oil via rapid thermal processing of a renewable cellulosic biomass feedstock; injecting greater than 90 wt. % of a petroleum fraction feedstock into a refinery process; injecting less than 10 wt. % of the renewable fuel oil into the refinery process proximate the injection point of the petroleum fraction feedstock; and co-processing the petroleum fraction feedstock and renewable fuel oil to produce the cellulosic-renewable identification number qualifying-fuel; wherein the renewable fuel oil has a pH of 1.5-6, a solids content of less than 2.5 wt. %, and a water content of 20-45 wt. %.

In certain embodiments, the invention relates to a method of preparing a fuel derived at least in part from a renewable fuel processed through a refinery conversion unit, for example an FCC. In certain embodiments, the invention relates to a method of preparing a fuel derived at least in part from a renewable fuel having a pH of 1.5-6 and a water content of 20-45 wt. %, that has been processed through a refinery conversion unit, for example an FCC.

In certain embodiments, the invention relates to a method of producing a combustible fuel via a fuel pathway compliant with U.S. renewable fuel standard program regulations for generating renewable identification numbers, wherein the method comprises thermally converting cellulosic-based biomass into a renewable fuel oil such that the carbon content of the renewable fuel oil is less than 60 wt. % and has a pH of 1.5-8. In certain embodiments, the invention relates to a method of producing a combustible fuel via a fuel pathway compliant with U.S. renewable fuel standard program regulations for generating renewable identification numbers, wherein the method comprises thermally converting cellulosic-based biomass into a renewable fuel oil such that the carbon content of the renewable fuel oil is greater than at least 80 wt. % of the carbon content of the cellulosic-based biomass. In certain embodiments, the invention relates to a method of producing a combustible fuel via a fuel pathway compliant with U.S. renewable fuel standard program regulations for generating renewable identification numbers, wherein the method comprises thermally converting cellulosic-based biomass into a renewable fuel oil and co-processing a portion of the renewable fuel oil with greater than 90 wt. % of a non-hydrotreated gas oil feedstock to produce the combustible fuel.

In certain embodiments, the invention relates to a fuel composition derived at least in part from a petroleum fraction feedstock and a renewable fuel oil feedstock wherein the petroleum feedstock and renewable fuel oil feedstock have been co-processed in the presence of a catalyst. In certain embodiments, the invention relates to a fluidized catalytic cracker product composition derived from a feedstock comprising a renewable fuel oil.

In certain embodiments, the invention relates to a method of preparing a fuel comprising processing a petroleum fraction feedstock with a renewable fuel oil feedstock in the presence of a catalyst wherein the yield of fuel product from the process is equivalent to or greater than the yield of fuel product resulting from running the process with no renewable fuel oil feedstock, on an energy input basis of the feedstock. In certain embodiments, the invention related to a method of preparing a fuel comprising processing a petroleum fraction feedstock with a renewable fuel oil feedstock in the presence of a catalyst wherein the fuel obtain from the process is completely compatible with fuel derived with no renewable fuel oil feedstock.

In certain embodiments, the invention relates to a method of generating one or more cellulosic-renewable identification numbers comprising thermally processing a cellulosic biomass to form a renewable fuel oil (for example an unenriched renewable fuel oil) and co-processing a petroleum fraction feedstock with the renewable fuel oil in a refinery conversion unit to thereby produce a cellulosic-renewable identification number-compliant diesel fuel, jet fuel, gasoline, or heating oil.

In certain embodiments, the invention relates to a combustible fuel for an internal combustion engine, derived from a petroleum fraction feedstock and less than 5 wt. % of a renewable fuel oil feedstock wherein the renewable fuel oil feedstock and the petroleum fraction feedstock are co-processed in the presence of an FCC catalyst.

In certain embodiments, the invention relates to a method of improving an amount of valuable fuel components derived from the conversion of a petroleum fraction feedstock comprising introducing the petroleum fraction feedstock into a refinery system comprising an FCC catalyst and adding at least 2 wt. % renewable fuel oil feedstock, relative to the total amount feedstock (for example petroleum fraction feedstock plus renewable fuel oil feedstock) and co-processing, in the presence of the FCC catalyst, the combined feedstock in the FCC for at least 2 seconds.

In certain embodiments, the invention relates to a method of trading renewable identification numbers, comprising co-processing petroleum fraction feedstock with a renewable fuel oil to form fuel compliant with one or more fuel pathways, in accordance with the U.S. renewable fuel standard program, and transferring the rights of at least a portion of the one or more U.S. renewable identification numbers from the owner or purchaser of the fuel. In certain embodiments, the invention relates to a renewable fuel oil compliant with a fuel pathway specified in U.S. renewable fuel standard program regulations for generating the cellulosic renewable identification number, derived by thermally processing cellulosic biomass. In certain embodiments, the invention relates to an internal combustion engine fuel derived from a renewable fuel oil compliant with a fuel pathway specified in U.S. renewable fuel standard program regulations for generating the cellulosic renewable identification number. In certain embodiments, the invention relates to an internal combustion engine fuel derived from a refinery conversion unit feedstock comprising 1-5 wt % of a renewable fuel oil compliant with a fuel pathway specified in U.S. renewable fuel standard program regulations for generating the cellulosic renewable identification number.

In certain embodiments, the invention relates to a blended combustible fuel composition comprising a FCC co-processed gas oil and renewable fuel oil product.

In certain embodiments, the invention relates to a method of using one or more of the above fuels in a vehicle comprising an internal combustion engine.

In certain embodiments, the invention relates to a computer system comprising monitoring an amount of throughput in an FCC unit and controlling the amount of renewable fuel oil to introduce for co-processing with petroleum based feedstock.

In certain embodiments, the invention relates to a computer system comprising monitoring an amount of throughput in an FCC unit inclusive of the quantity of renewable fuel oil being processed and calculating the cellulosic-renewable identification numbers generated.

DETAILED DESCRIPTION OF THE DRAWINGS

Many of the benefits of the materials, systems, methods, products, uses, and applications among others may be readily appreciated and understood from consideration of the description and details provided in this application inclusive of the accompanying drawings and abstract, wherein:

FIG. 1: illustrates a fluid catalytic cracking (FCC) unit.

Figure 2A:
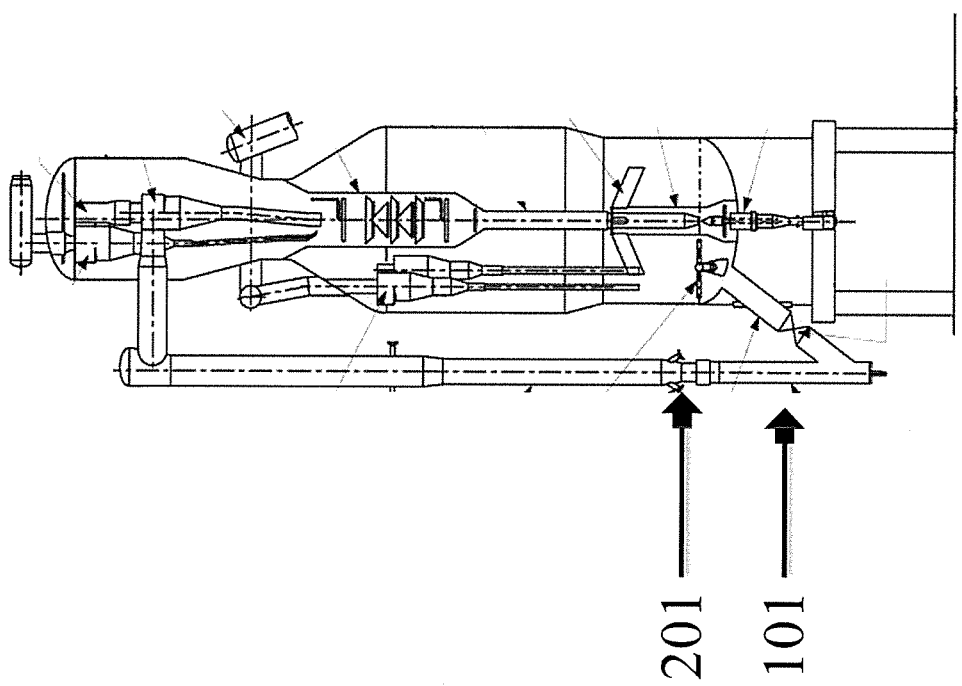

FIG. 2A: illustrates a exemplary converter.

Figure 2B:
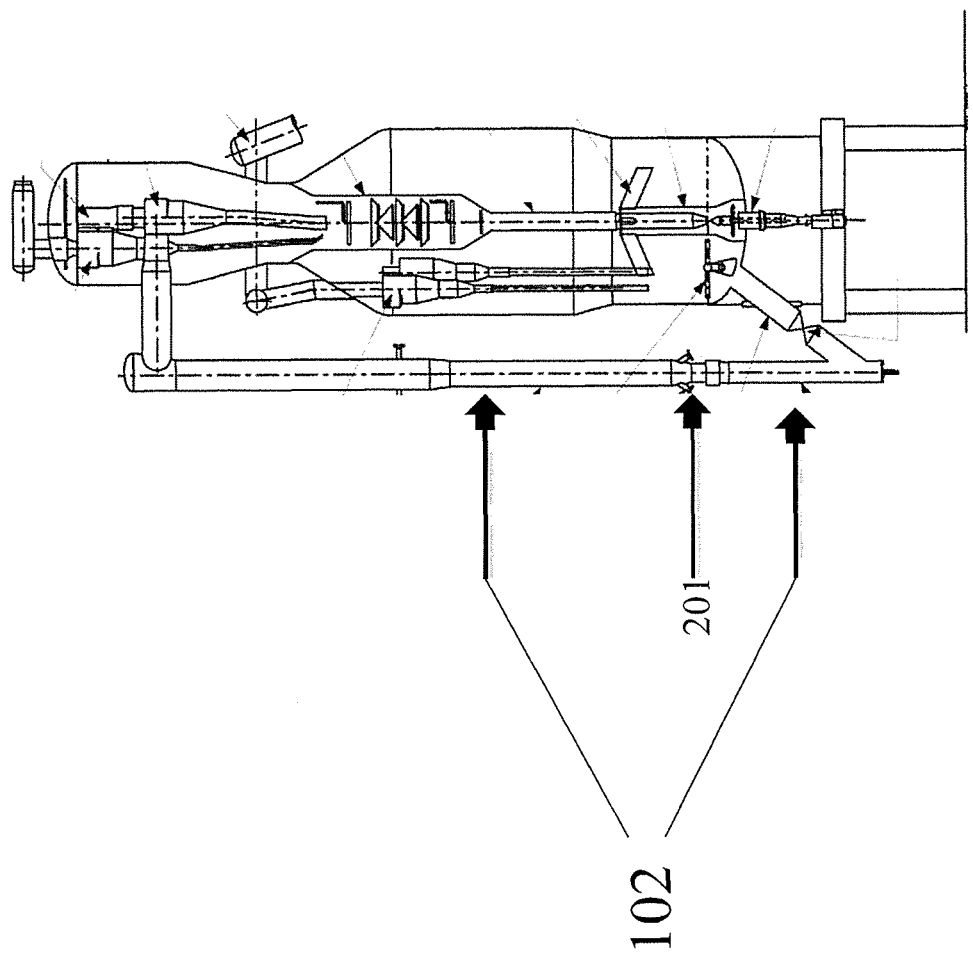

FIG. 2B: illustrates a exemplary converter that has been retro-fitted with an injection port or two (102), with two different locations (which may be alternative locations or both used) suitable for introducing a renewable fuel oil (RFO) feedstock.

Figure 3:
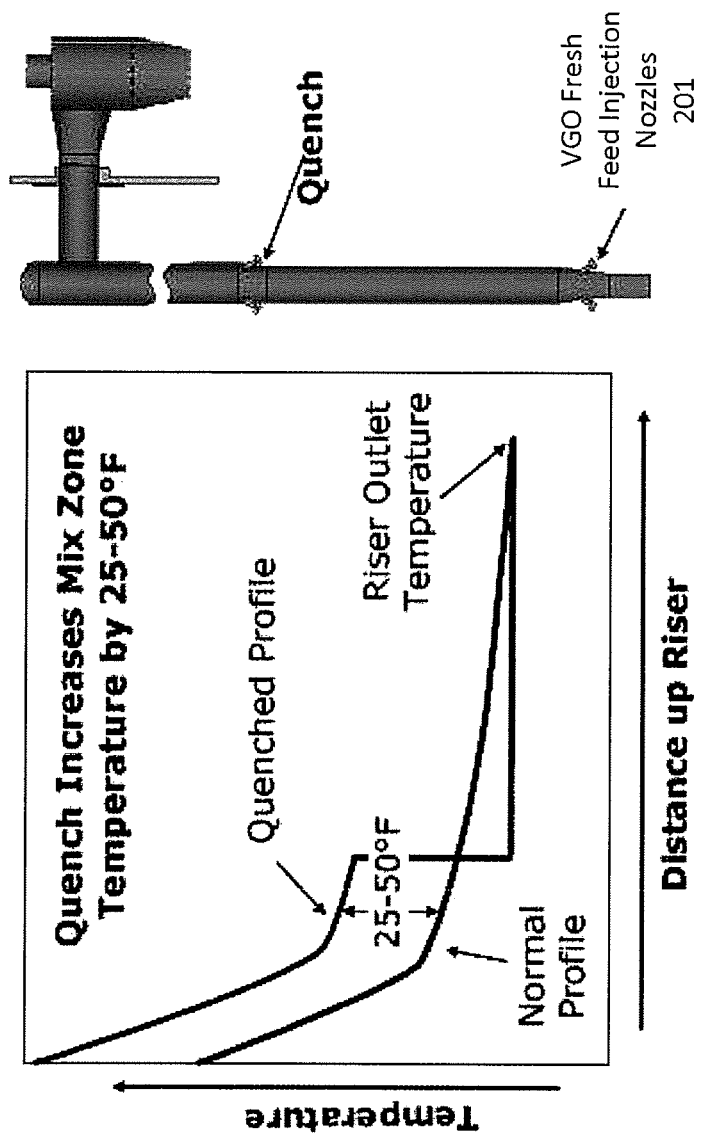

FIG. 3: illustrates a riser quench technology.

Figure 4:
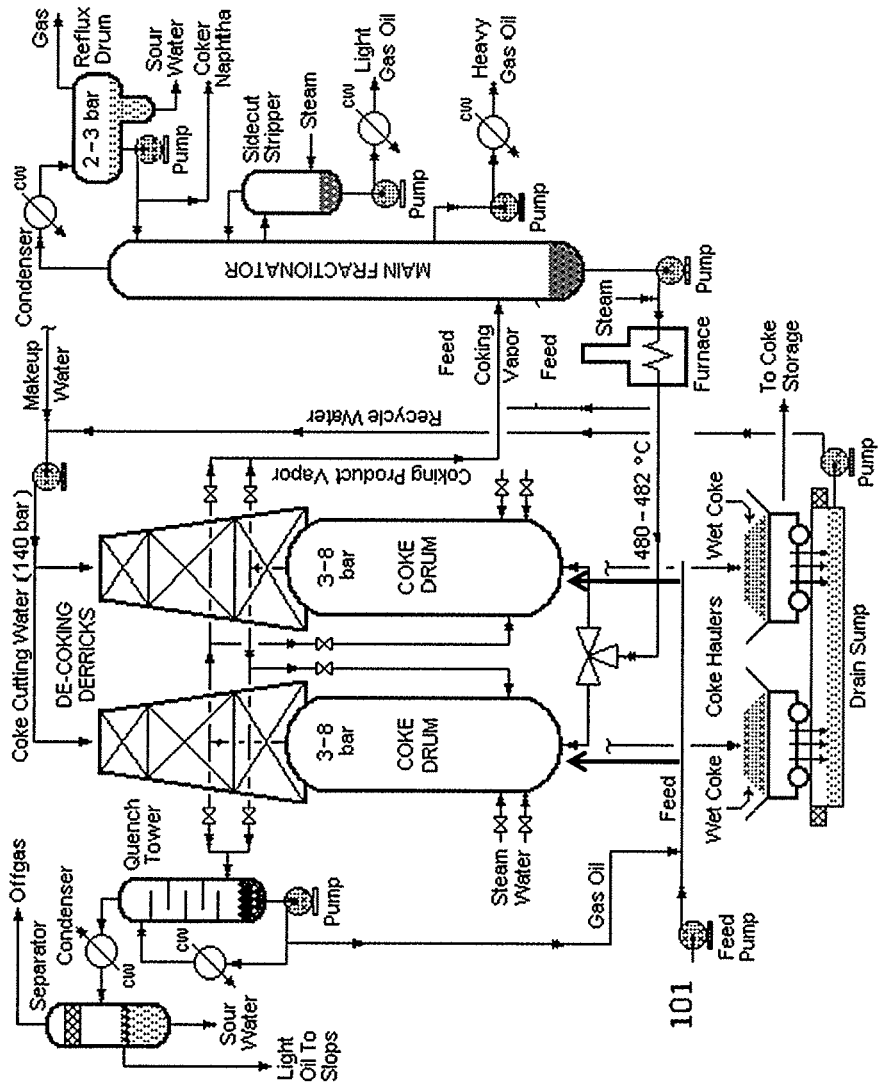

FIG. 4: illustrates a coking unit.

Figure 5:
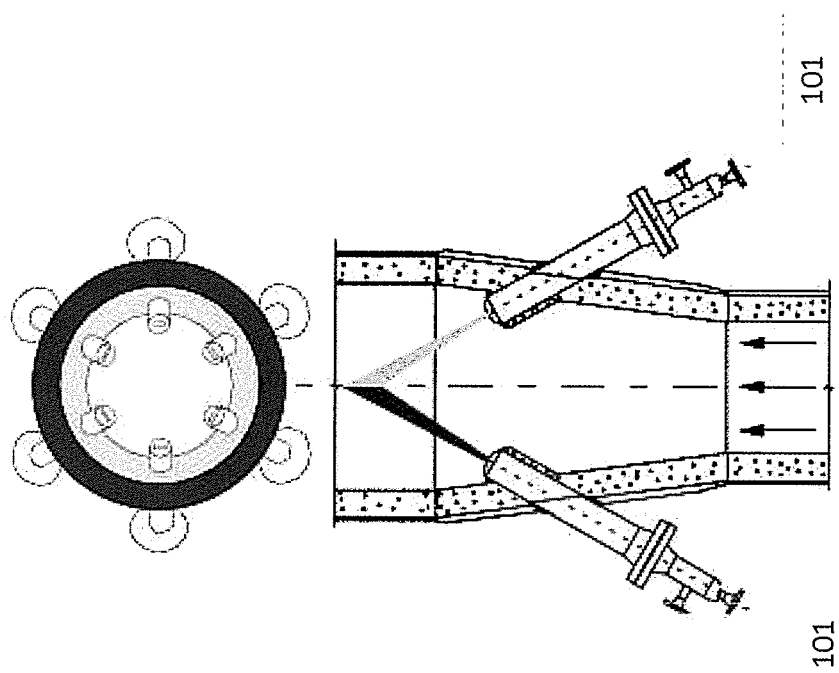

FIG. 5: illustrates a feed injection system.

Figure 6:
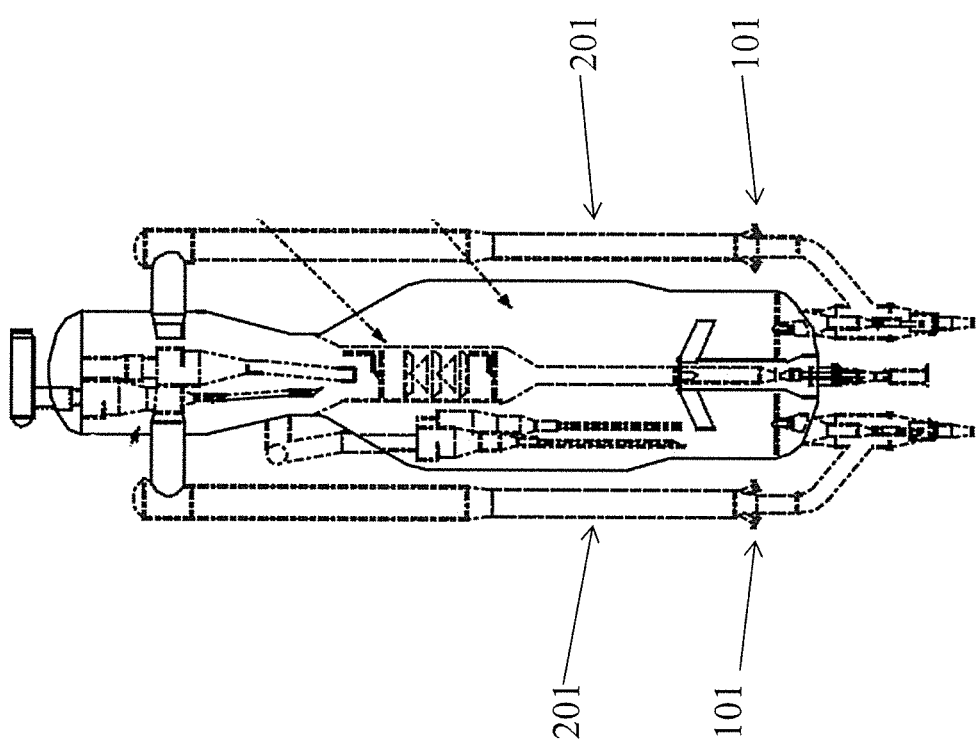

FIG. 6: illustrates a FCC unit with dual risers.

Figure 7:
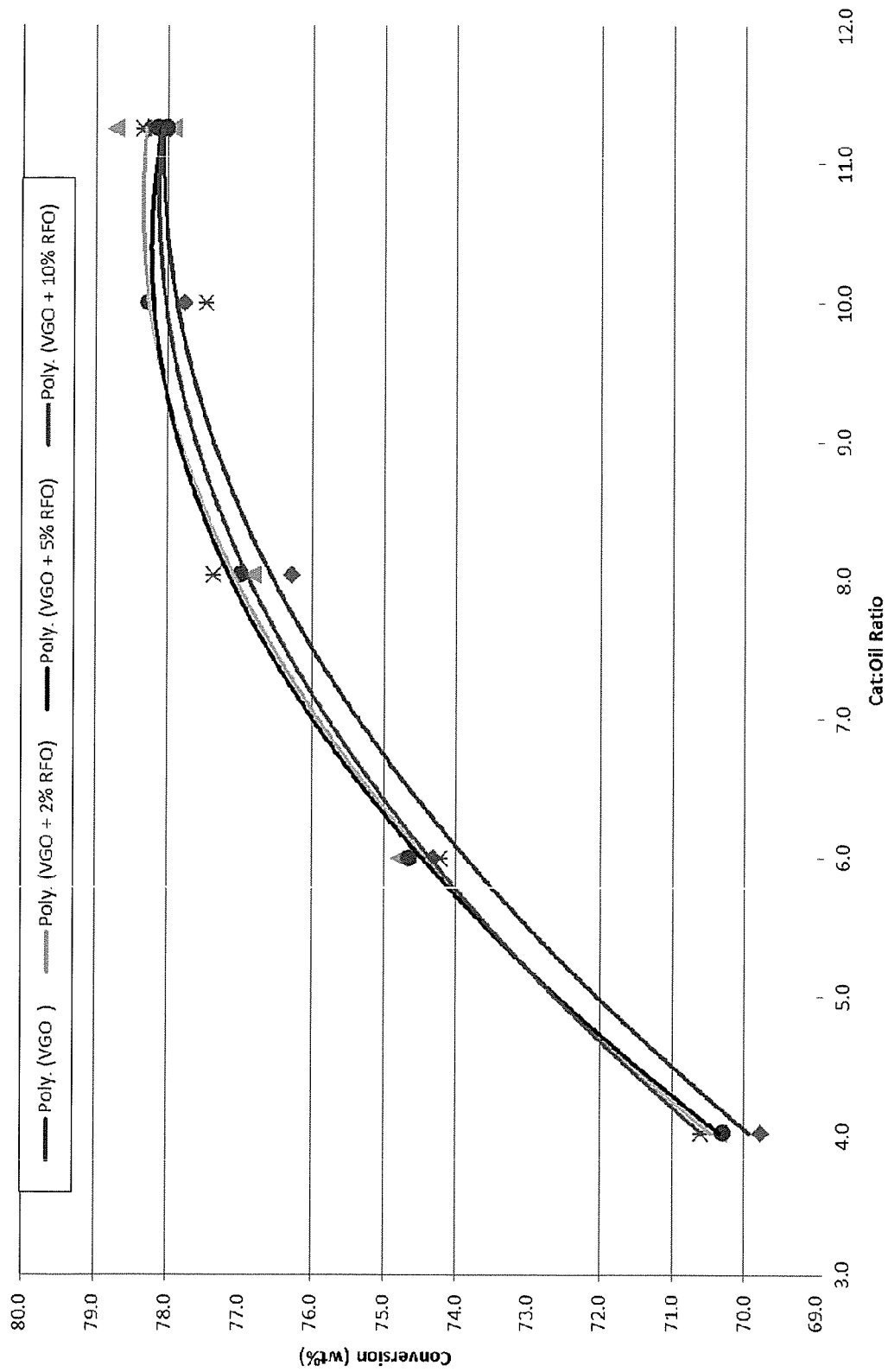

FIG. 7: is a graph presenting the influence of catalyst:oil ratio and RFO concentration in VGO on conversion (on a mass basis).

Figure 8:
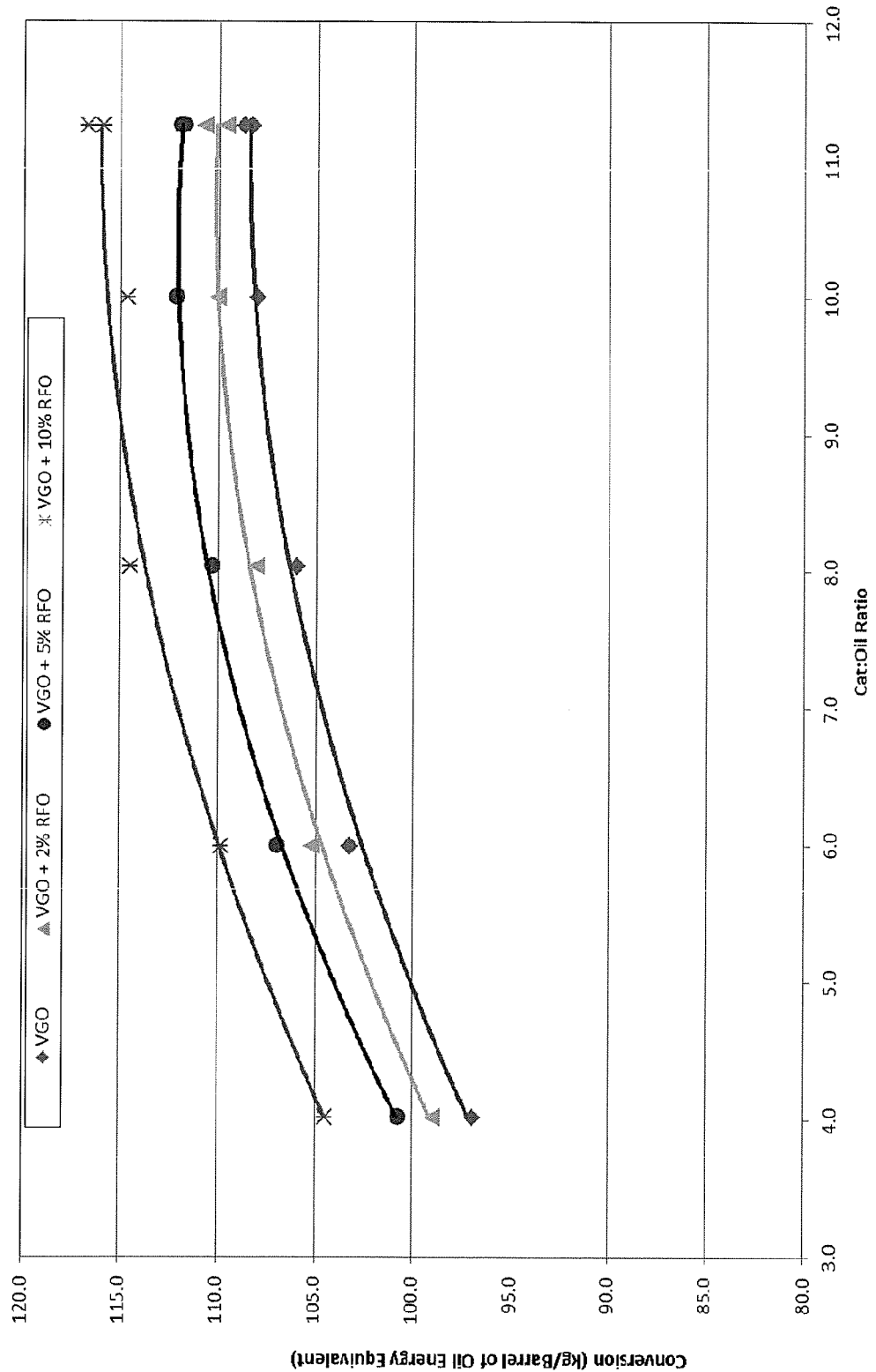

FIG. 8: is a graph presenting the influence of catalyst:oil ratio and RFO concentration in VGO on overall conversion (on an equivalent energy input basis).

Figure 9:
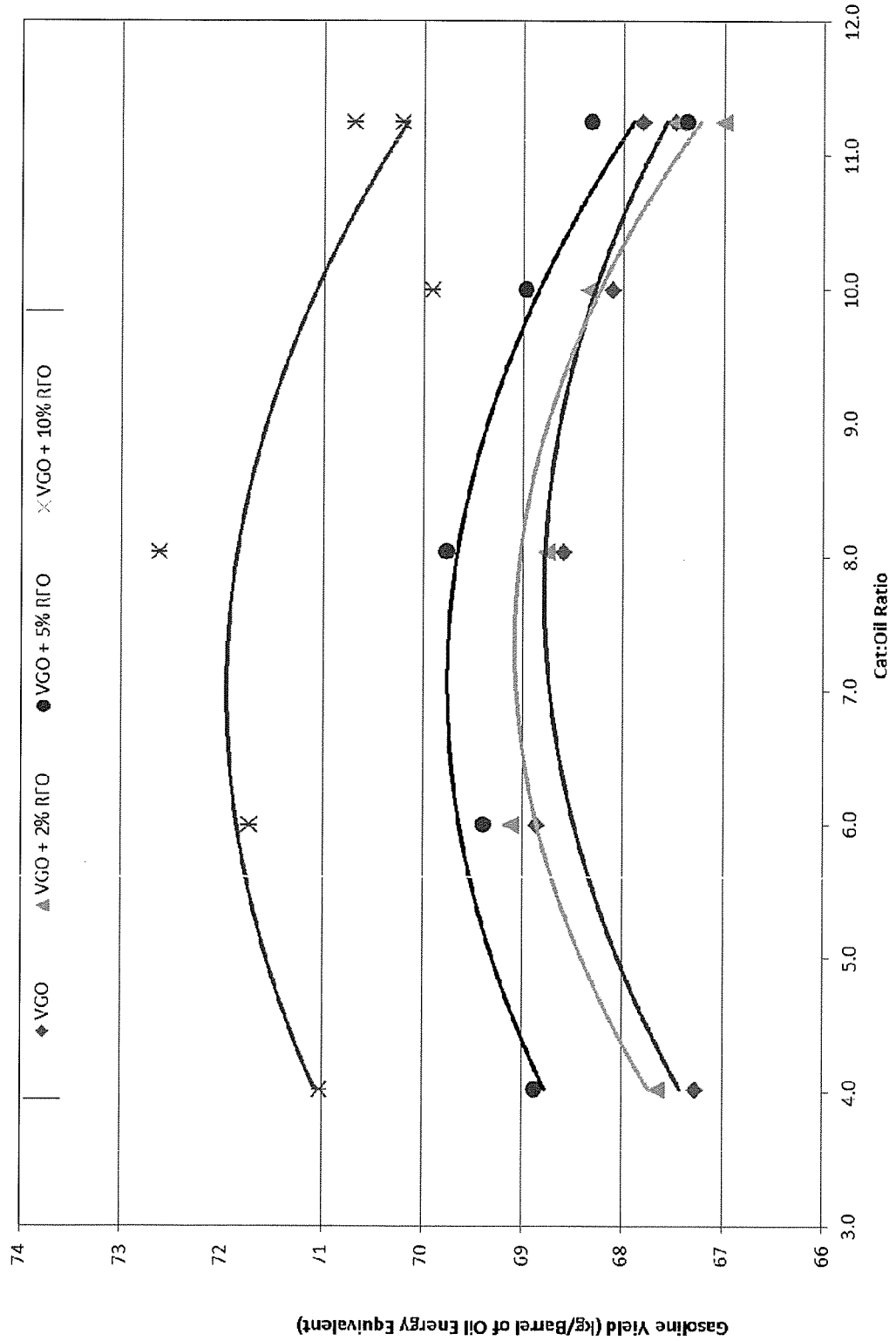

FIG. 9: is a graph presenting the influence of catalyst:oil ratio and RFO concentration in VGO on gasoline yield (on an energy equivalent input basis).

Figure 10:
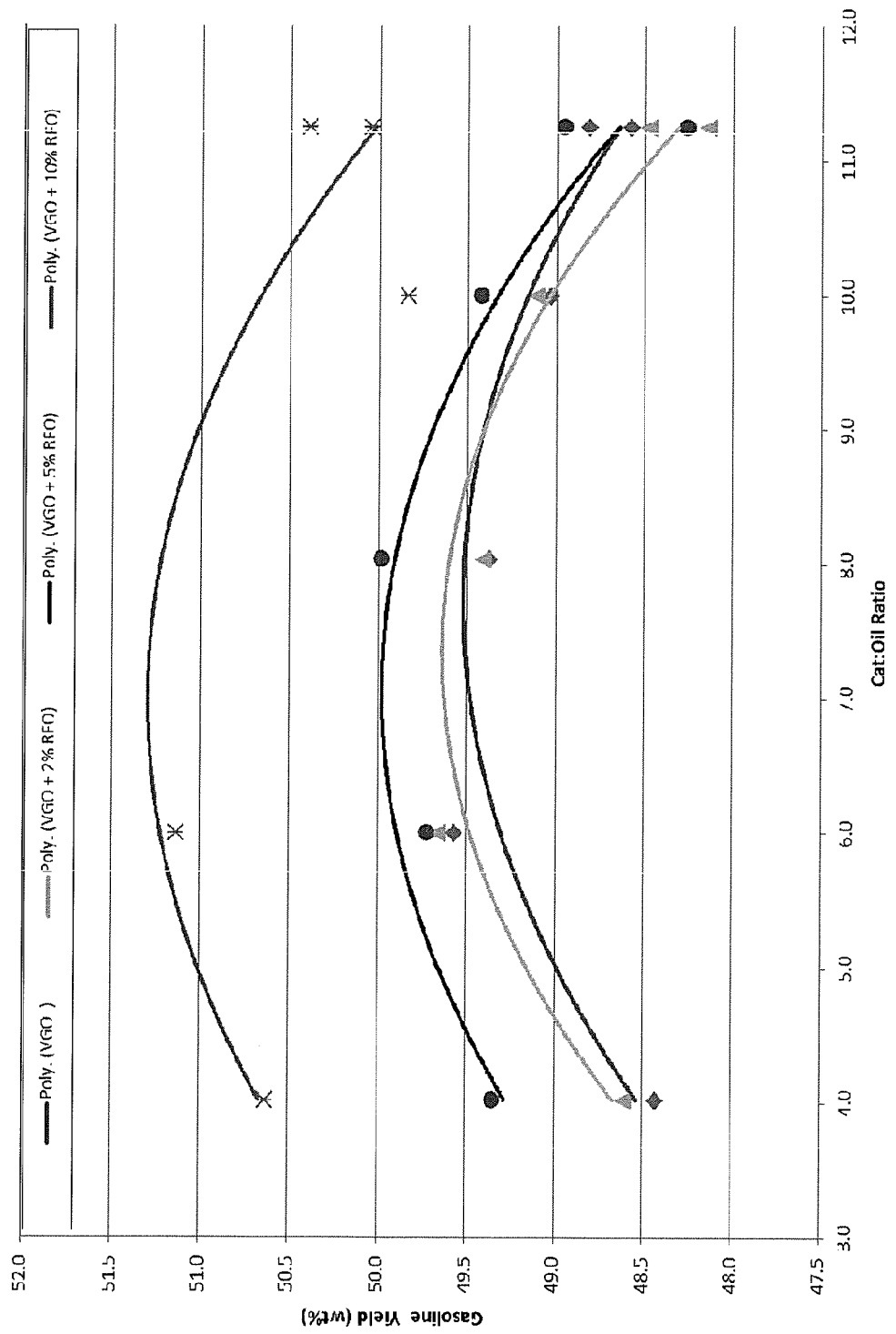

FIG. 10: is a graph depicting the influence of catalyst:oil ratio and RFO concentration in VGO on gasoline yield as a function of feed carbon content (on an equivalent carbon input basis).

Figure 11:
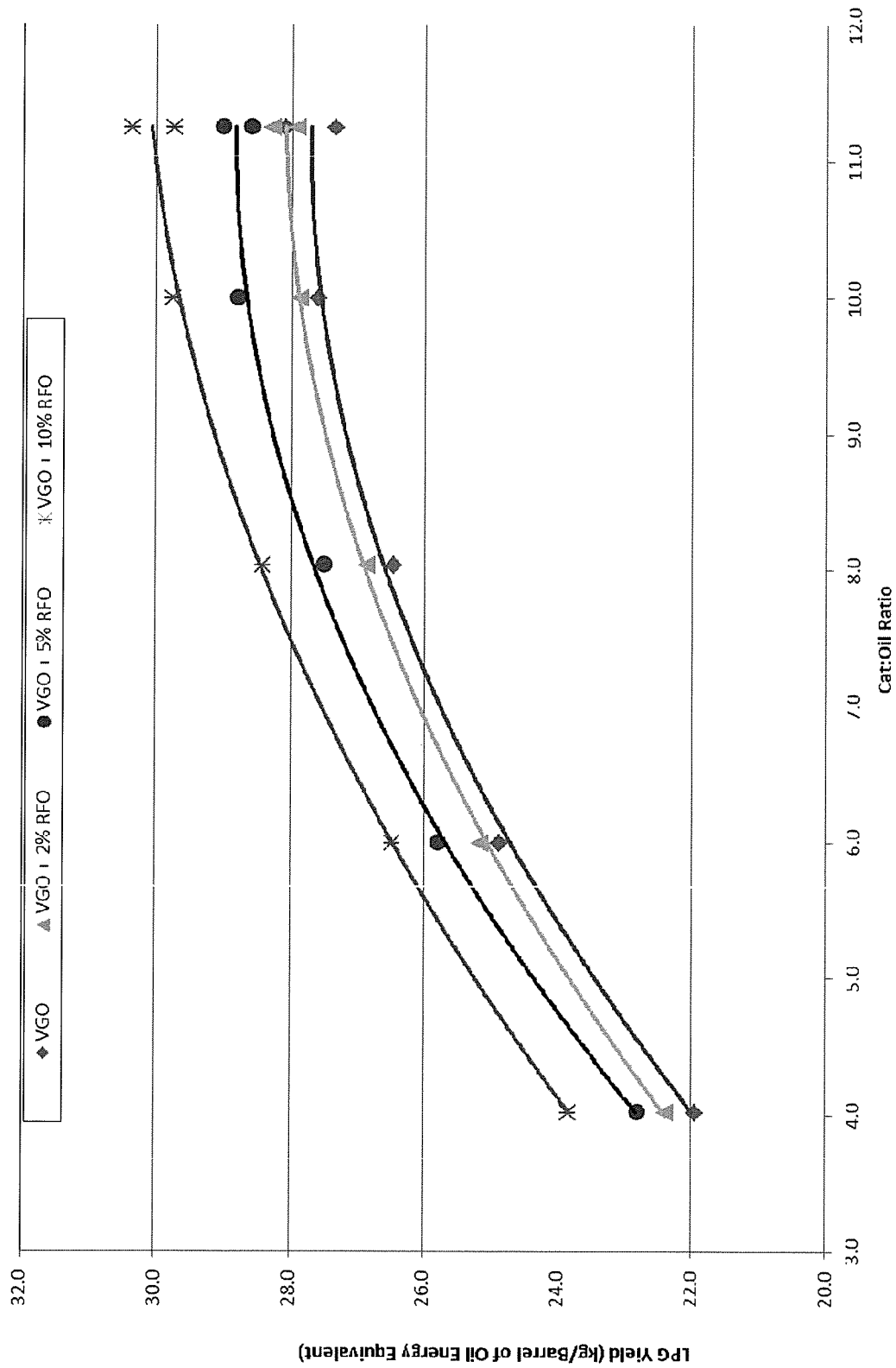

FIG. 11: is a graph depicting the influence of catalyst:oil ratio and RFO concentration in VGO on LPG yield (on an equivalent energy input basis).

Figure 12:
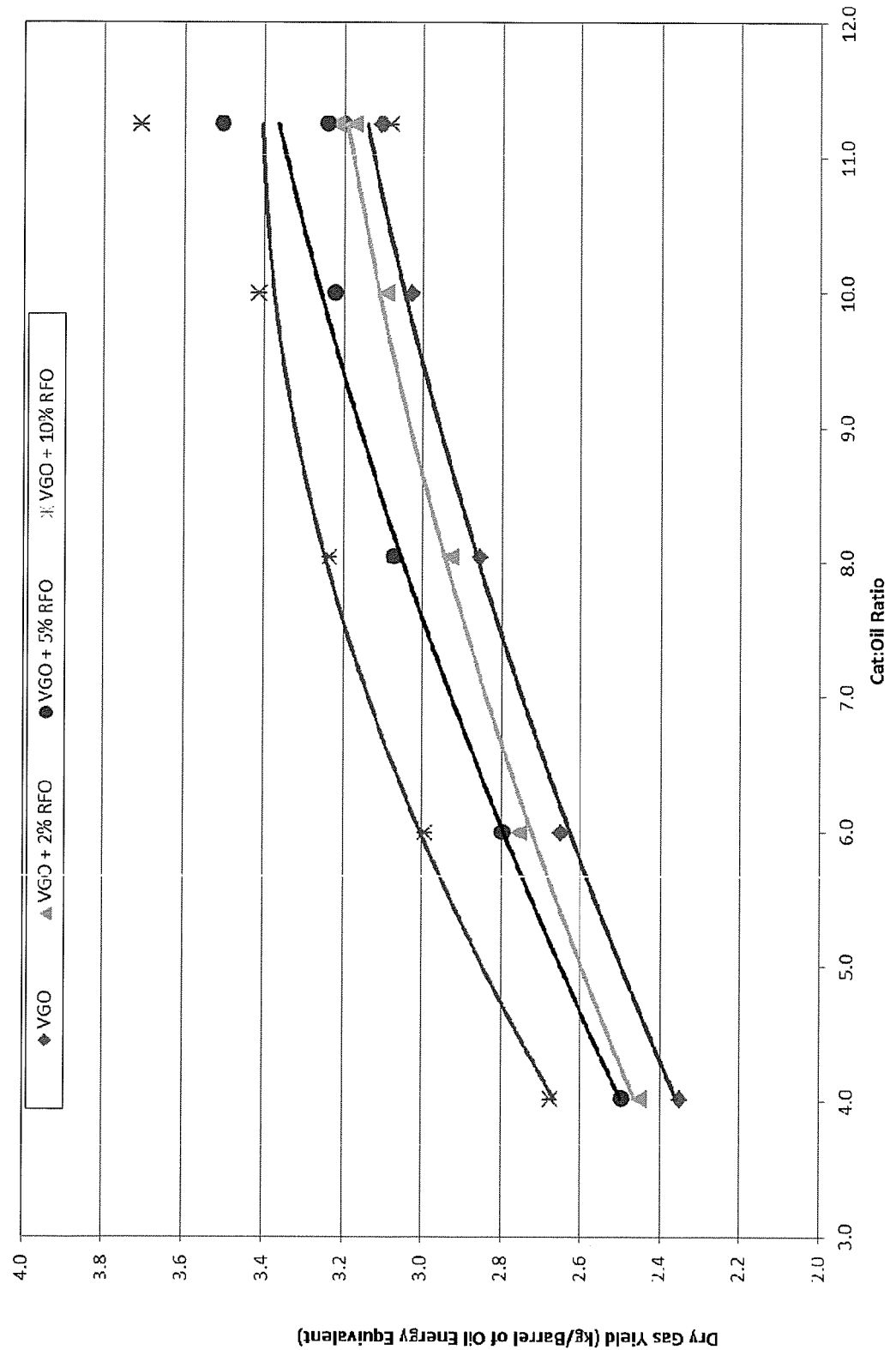

FIG. 12: is a graph depicting the influence of catalyst:oil ratio and RFO concentration in VGO on dry gas yield (on an equivalent energy input basis).

Figure 13:
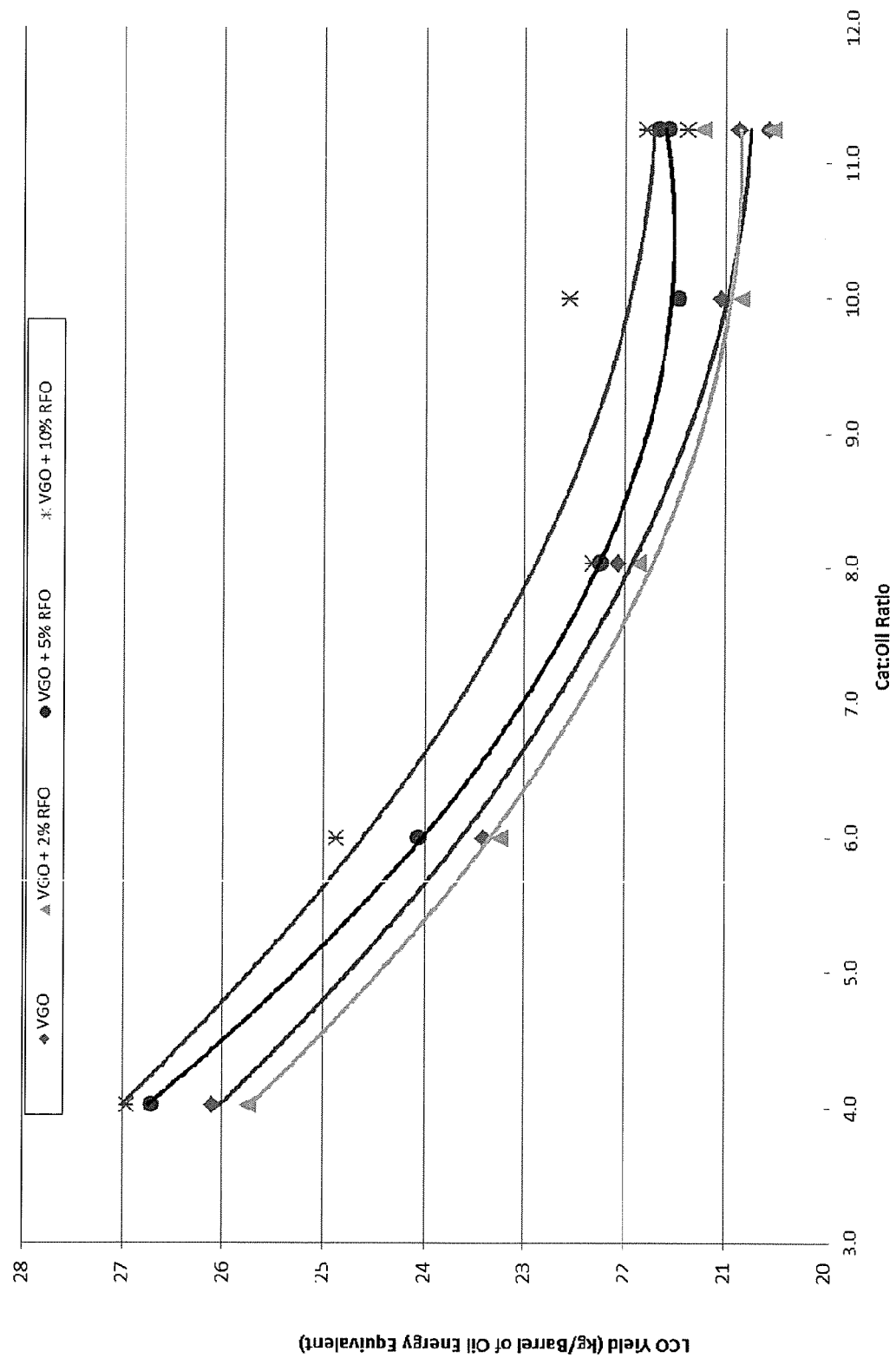

FIG. 13: is a graph depicting the influence of catalyst:oil ratio and RFO concentration in VGO on LCO yield (on an equivalent energy input basis).

Figure 14:
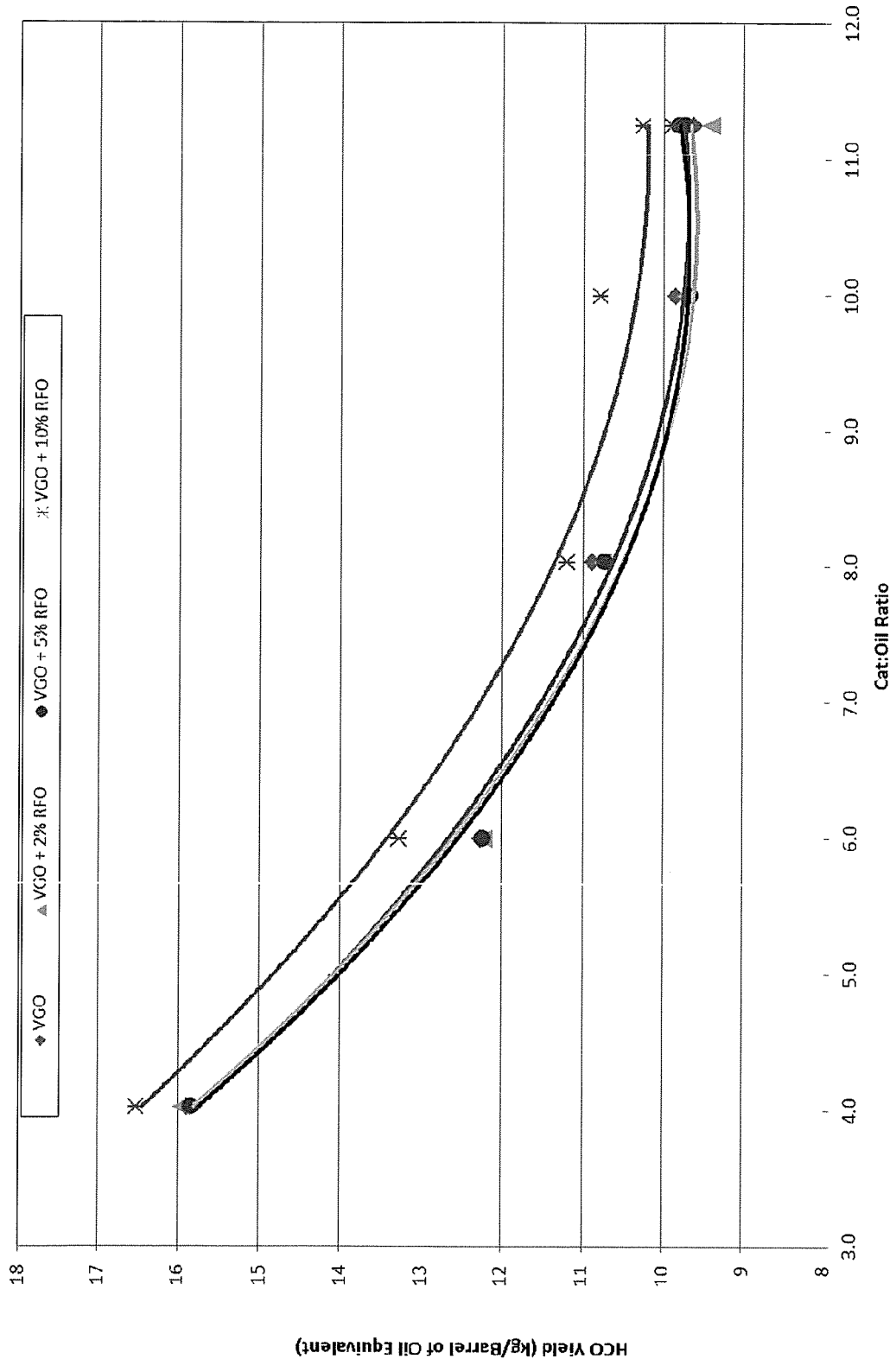

FIG. 14: is a graph depicting the influence of catalyst:oil ratio and RFO concentration in VGO on HCO yield (on an equivalent energy input basis).

Figure 15:
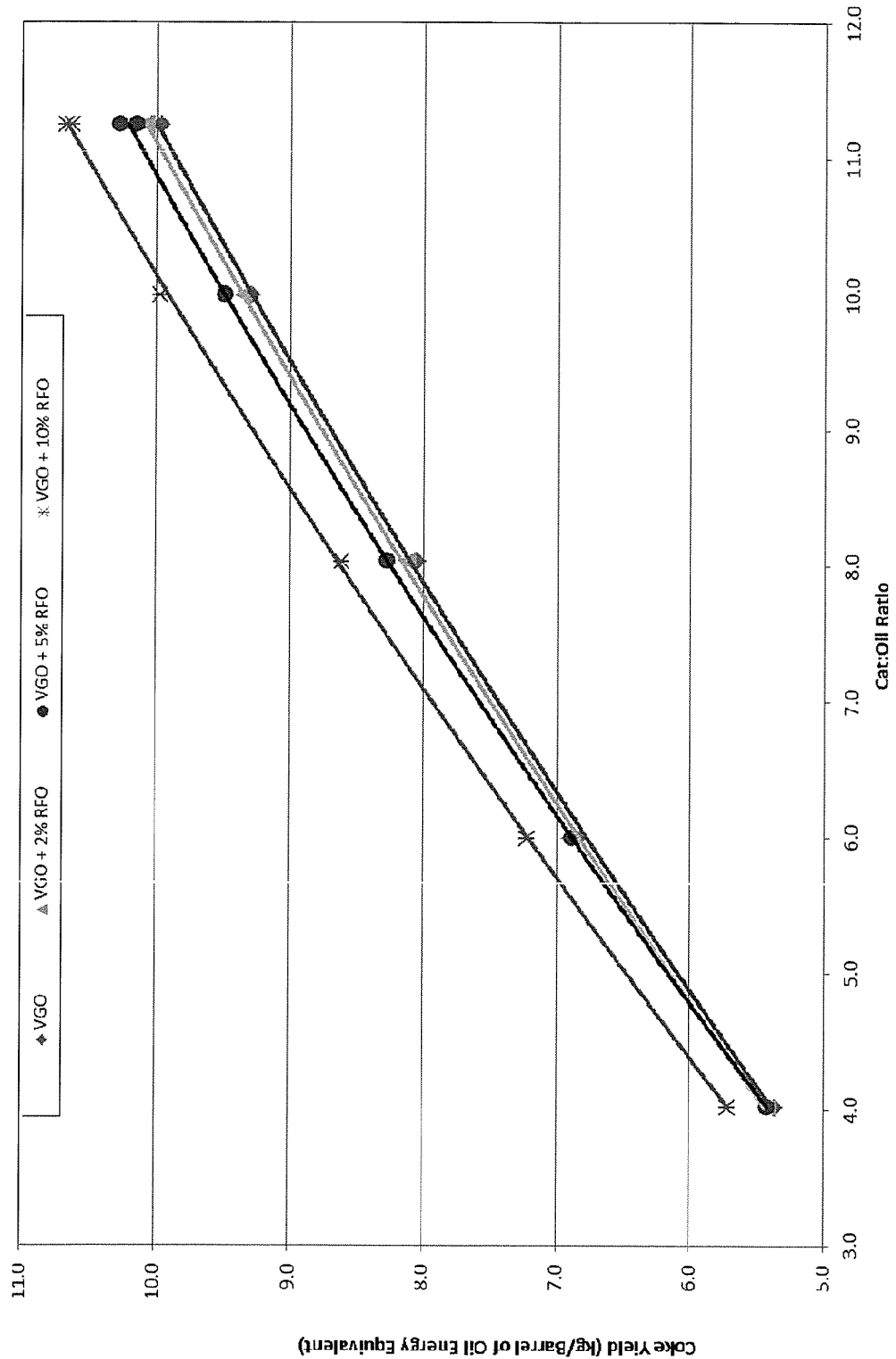

FIG. 15: is a graph depicting the influence of catalyst:oil ratio and RFO concentration in VGO on coke yield (on an equivalent energy input basis)).

Figure 16:
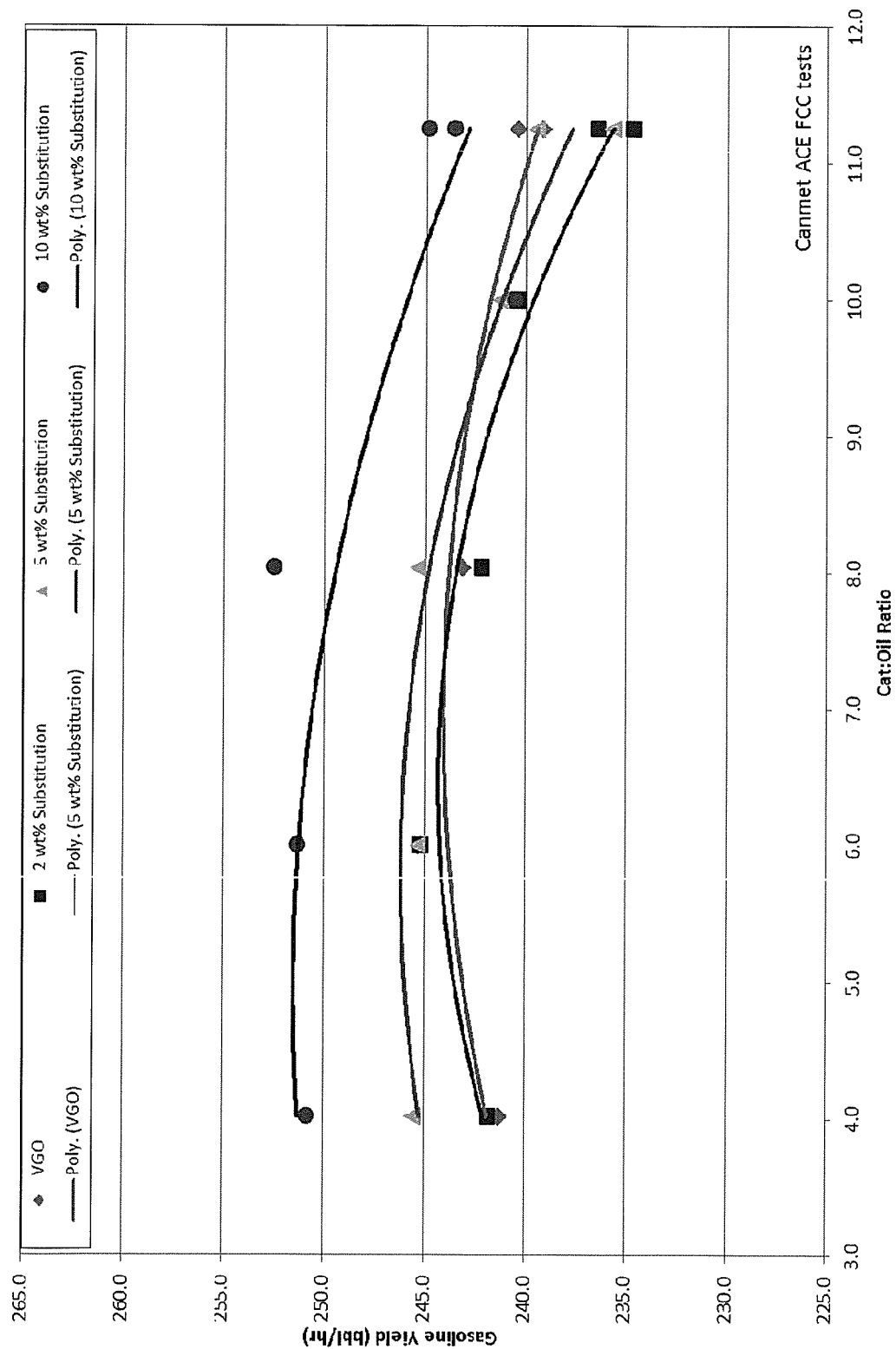

FIG. 16: is a graph depicting gasoline yield as a function of RFO substitution and catalyst:oil ratio (on a 10,000 bbls/day, water free basis).

Figure 17:
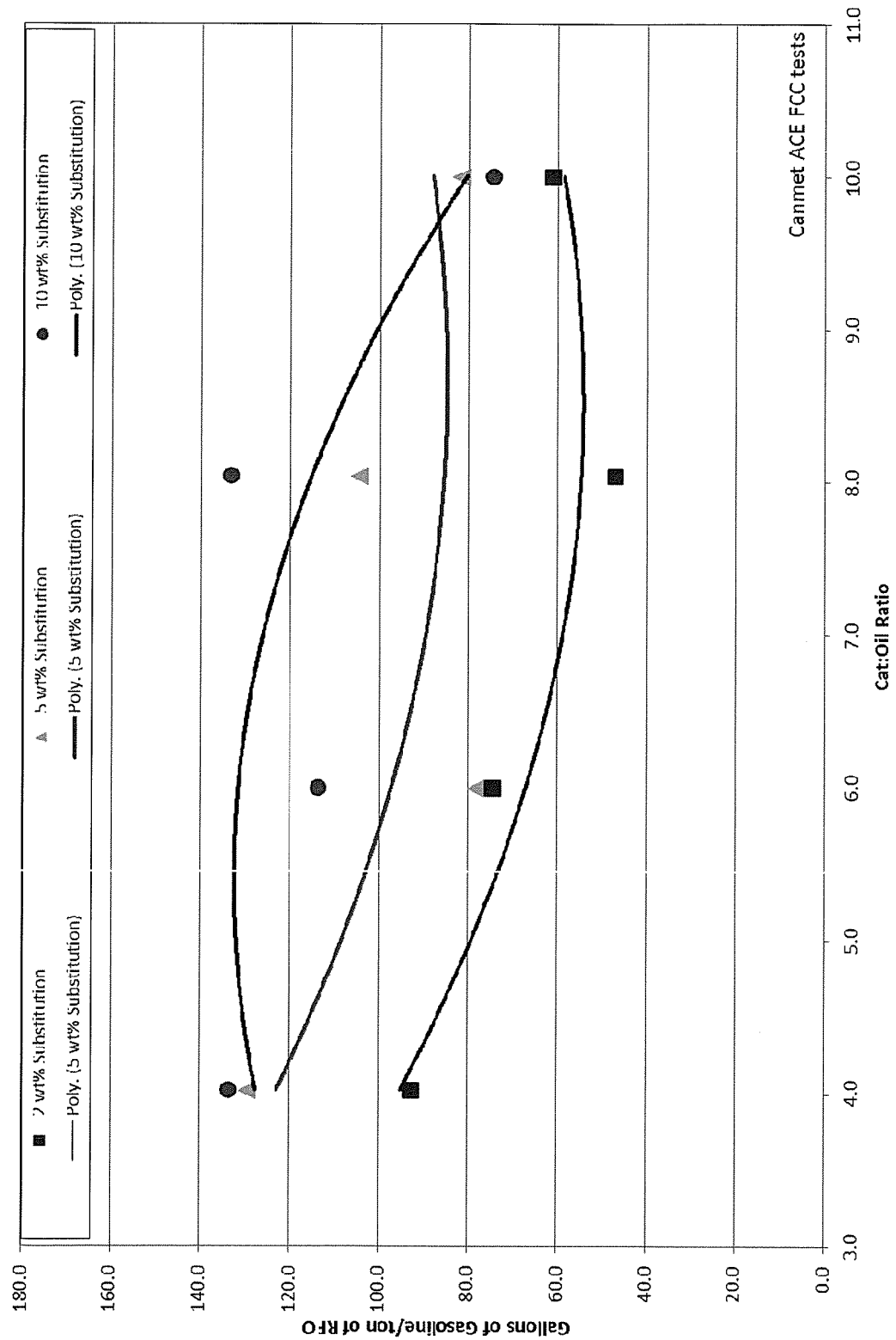

FIG. 17: is graph depicting gallons of gasoline/ton of RFO as a function of RFO substitution and catalyst:oil ratio (on a wt. % contribution using reference VGO).

Figure 18:
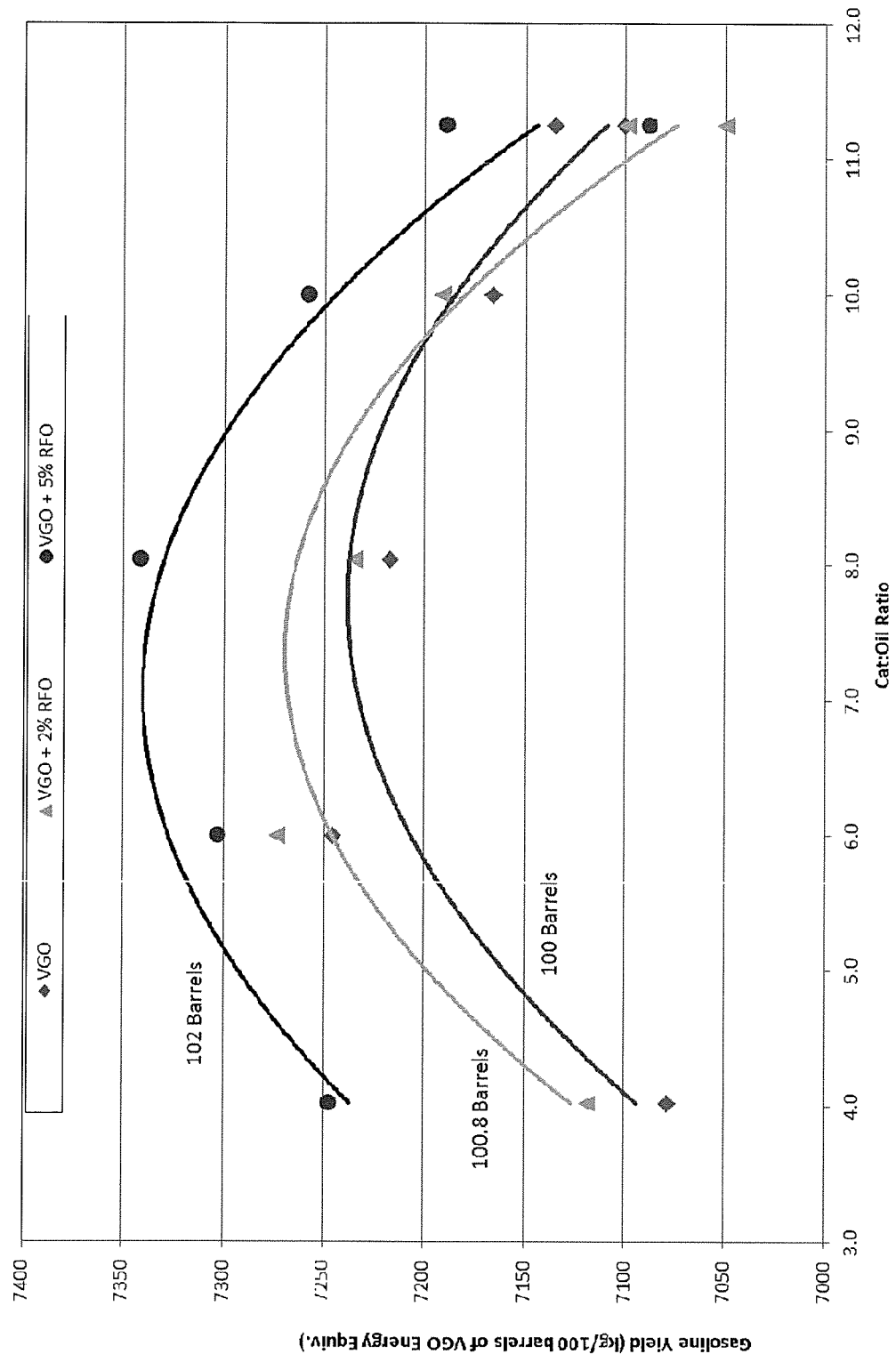

FIG. 18: is a graph depicting the influence of catalyst:oil ratio and RFO concentration in VGO on gasoline yield (on volume input to the FCC unit basis).

Figure 19:
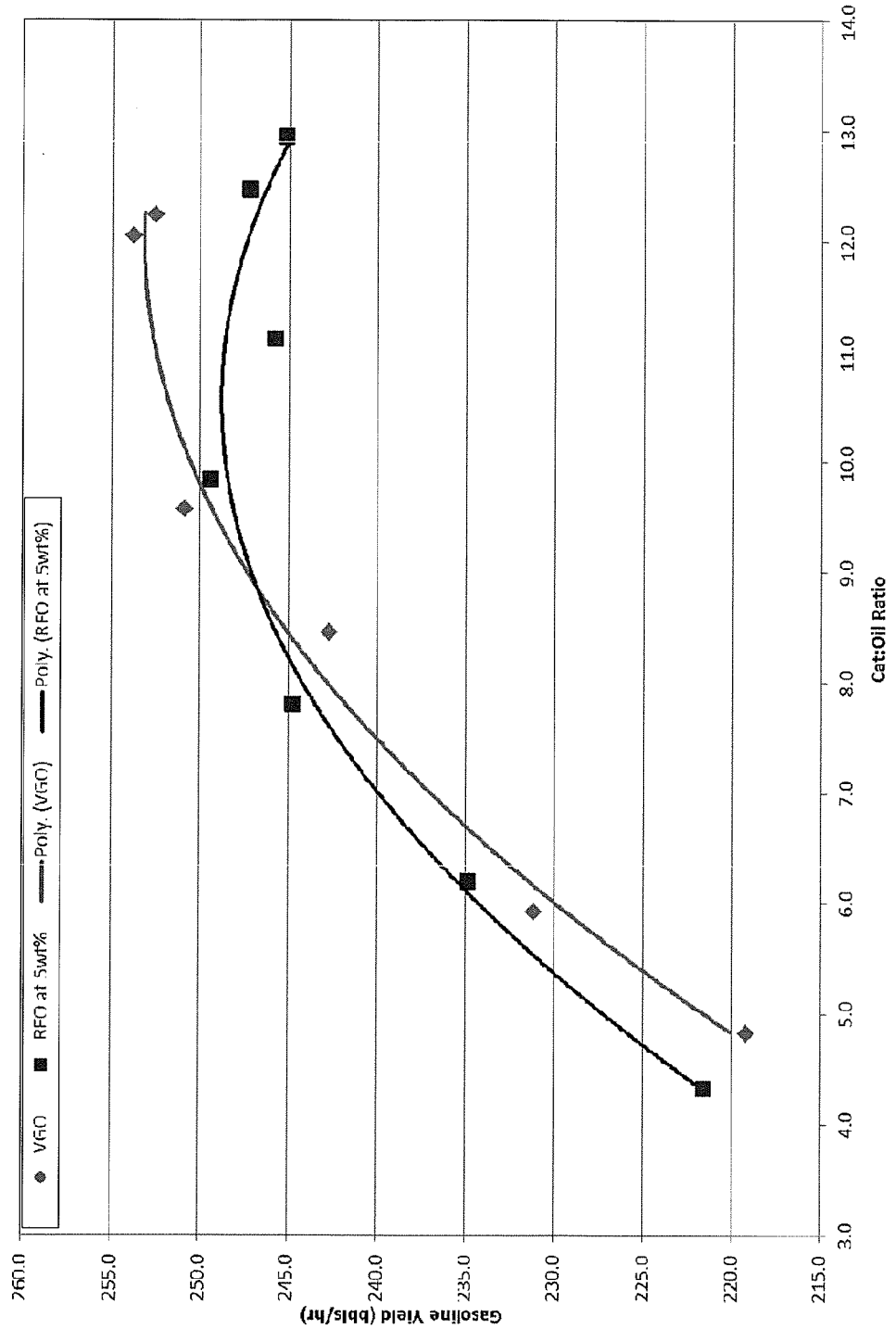

FIG. 19: is a graph depicting the influence of catalyst:oil ratio and RFO concentration in HGO on gasoline yield (on a 10,000 bbls/day feed basis)

DETAILED DESCRIPTION

In 2005, the Environmental Protection Agency (EPA) released its Renewable Fuel Standards (RFS1), which were the first renewable fuel mandates in the United States. The RFS called for 7.5 B gallons of renewable fuel to be blended into gasoline by 2012. Two years later, the program was expanded under the Energy Independence and Security Act of (EISA) of 2007 to target 36 B gallons of renewable fuel by 2022. In addition, EISA expanded the RFS to cover diesel fuels as well as gasoline (jet fuels were not initially included under RFS) and established individual volume targets for the different types of renewable fuel (e.g., RFS2 calls for 21 B gallons of advanced biofuels by 2022).

In February 2010, the EPA submitted its final rule for RFS2, its revision to the previous renewable fuel standards (RFS1). The ruling set forth volume targets for 36 B gallons of renewable fuels produced in the US by 2022 with 21 B being advanced biofuels (non-ethanol). Due to the lack of commercial cellulosic facilities in the U.S., the EPA conducts an annual review of total cellulosic capacity to evaluate the feasibility of its production targets and subsequently makes adjustments. The EPA has proposed cellulosic volumes of up to 12.9M gallons (up to 15.7M gallons on an ethanol equivalent basis) for 2012, well below its original 500M gallon target. Significant progress must be made in facilitating the scale-up cellulosic technologies in order for the U.S. to meet the 16 B gallon production target for cellulosic fuels by 2022.

Part of the regulations include an incentive program that provides for an award of Renewable Identification Numbers (RIN) for the production of fuels in accordance with certain pathways that are designed to be environmentally less harmful than the traditional methods of producing fuels. Among the several approved pathways, there are some related to the use of cellulosic containing biomass (cellulosic biomass) that can earn Cellulosic Renewable Identification Numbers (C-RIN's). The use of cellulosic biomass can also aid fuel producers in meeting their Renewable Volume Obligations (RVO) as well. One aspect of the current application may be that the use of unenriched renewable fuel oil in amounts of less than 20 wt. %, for example, less than 10 wt. %, less than 8 wt. %, less than 6 wt. % such as at about 5 wt. % or about 3 wt. %; relative to the total weight of feedstock fed (for example, petroleum fraction and renewable feedstock) to a conversion unit employed to produce gasoline, among other fuels and by products, resulted not only in an opportunity to comply with the requirements to earn C-RIN's and/or RVO's but also an at least an equivalent yield of gasoline (on an equivalent input basis, for example, energy basis or carbon content basis). The equivalent yield of gasoline includes an increase yield of gasoline for example and increase of more than 0.5 wt. %, more than 0.75 wt. %, more than 1 wt. %, such as from 0.5 wt. % and 5.0 wt. % or from 1.25 wt. % and 3.0 wt. % on an equivalent input basis, for example, energy basis or carbon content basis.

In certain embodiments, a method and system for including renewable fuel, renewable fuel oil, or renewable oil as a feedstock in FCCs and other refinery systems or field upgrader operations. Renewable fuels include fuels produced from renewable resources. Examples include biofuels (e.g. vegetable oil used as fuel), ethanol, methanol from biomass, or biodiesel and Hydrogen fuel (when produced with renewable processes), thermochemically produced liquids, and catalytically converted biomass to liquids.

Suitable biomass, biomass materials, or biomass components, include but are not limited to, wood, wood residues, sawdust, slash bark, thinnings, forest cullings, begasse, corn fiber, corn stover, empty fruit bunches (EFB), fronds, palm fronds, flax, straw, low-ash straw, energy crops, palm oil, non-food-based biomass materials, crop residue, slash, pre-commercial thinnings and tree residue, annual covercrops, switchgrass, miscanthus, cellulosic containing components, cellulosic components of separated yard waste, cellulosic components of separated food waste, cellulosic components of separated municipal solid waste (MSW), or combinations thereof. Cellulosic biomass, for example, includes biomass derived from or containing cellulosic materials. For example, the biomass may be one characterized as being compliant with U.S. renewable fuel standard program (RFS) regulations, or a biomass suitable for preparing a cellulosic-renewable identification number-compliant fuel. In certain embodiments, the biomass may be characterized as being compliant with those biomass materials specified in the pathways for a D-code 1, 2, 3, 4, 5, 6, or 7-compliant fuel, in accordance with the U.S. renewable fuel standard program (RFS) regulations. For example, the biomass may be characterized as being compliant with those biomass materials suitable for preparing a D-code 3 or 7-compliant fuel, in accordance with the U.S. renewable fuel standard program (RFS) regulations or the biomass may be characterized as being composed of only hydrocarbons (or renewable hydrocarbons).

A renewable fuel oil (also referred to herein as "RFO") refers to a biomass-derived fuel oil or a fuel oil prepared from the conversion of biomass. For example, in certain embodiments, the renewable fuel oil may be a cellulosic renewable fuel oil (also referred to herein as "cellulosic RFO"), and may be derived or prepared from the conversion of cellulosic-containing biomass. The biomass or cellulosic-containing biomass may be converted to form a suitable renewable fuel, by one or more of the following processes: thermal conversion, thermo-mechanical conversion, thermo-catalytic conversion, or catalytic conversion of the biomass or cellulosic-containing biomass. In certain embodiments, the renewable fuel oil may be non-hydrodeoxygenated (non-HDO), non-deoxygenated, non-upgraded, thermally-processed, rapid thermally-processed, thermo-mechanically-processed, rapid thermo-mechanically-processed, non-hydrotreated, conditioned, and/or combinations thereof. For example, the renewable fuel oil may be non-hydrodeoxygenated (non-HDO) renewable fuel oil; a non-HDO, non-deoxygenated renewable fuel oil; a rapid thermo-mechanically-processed, non-hydrotreated renewable fuel oil; or a non-deoxygenated, non-upgraded, thermally-processed renewable fuel oil. A further example of a suitable renewable fuel oil may be a non-hydrodeoxygenated, non-deoxygenated, non-hydrotreated, non-upgraded, non-catalytically processed, thermo-mechanically-processed renewable fuel oil which would be understood to mean a renewable fuel oil that may be derived from simply mechanically grinding a biomass, for example a cellulosic biomass, and then thermally processing the ground biomass, for example rapidly, to derive a liquid with no further processing steps to substantially alter the oxygen content, the water content, the sulfur content, the nitrogen content, the solids content or otherwise enrich the renewable fuel oil for processing into a fuel. Additionally, this non-hydrodeoxygenated, non-deoxygenated, non-hydrotreated, non-upgraded, non-catalytically processed, thermo-mechanically-processed renewable fuel oil could be blended with other batches of non-hydrodeoxygenated, non-deoxygenated, non-hydrotreated, non-upgraded, non-catalytically processed, thermo-mechanically-processed renewable fuel oil and/or other non-hydrodeoxygenated, non-deoxygenated, non-hydrotreated, non-upgraded, non-catalytically processed, thermo-mechanically-processed renewable fuel oil that have been derived from other biomass to form blends of non-hydrodeoxygenated, non-deoxygenated, non-hydrotreated, non-upgraded, non-catalytically processed, thermo-mechanically-processed renewable fuel oil.

In particular, the renewable fuel oil may be a liquid formed from a biomass comprising cellulosic material, wherein the only processing of the biomass may be a therma-mechanical process (specifically comprising grinding and rapid thermal processing, with no post processing or enrichment of the liquid prior to introduction into petroleum conversion unit). Specifically, no hydrodeoxygenation, no hydrotreating, no catalytic exposure or contact just unenriched renewable fuel oil derived by thermo-mechanically processing cellulosic containing biomass.

A preferred renewable fuel oil may be an unenriched liquid (also referred to as an unenriched renewable fuel oil) formed from ground-up biomass by a process, for example rapid thermal processing, wherein the resulting liquid may be at least 50 wt. %, for example at least 60 wt. %, at least 70 wt. %, at least 75 wt. %, at 80 wt. % or at least 85 wt. % of the total weight of the processed biomass. In other words the liquid yield from the processed biomass may be at least 50 wt. %, for example at least 60 wt. %, at least 70 wt. %, at least 75 wt. %, at 80 wt. % or at least 85 wt. % of the total weight of the ground biomass being processed. Unenriched should be understood to refer to renewable fuel oil liquid that does not undergo any further pre- or post-processing including, specifically, no hydrodeoxygenation, no hydrotreating, no catalytic exposure or contact. In certain embodiments, unenriched renewable fuel oil may be prepared from the ground biomass and then transported and/or stored, and may be even heated or maintained at a given temperature; not exceeding 150 degrees Fahrenheit, on its way to being introduced into the coversion unit at the refinery. The mechanical handling associated with transporting, storing, heating, and/or pre-heating of the unenriched renewable fuel oil is not be considered an enriching step. In certain embodiments, an unenriched renewable fuel oil may comprise one or more unenriched renewable fuels oils mixed from separate unenriched batches and/or unenriched batches resulting from different cellulosic biomass (for example, several different types of non-food biomass). In certain embodiments, these mixed compositions, which may be blended to purposefully provide or achieve certain characterisitics in the combined unenriched renewable fuel oil, may still be considered unenriched renewable fuel oil provided that substantially all (for example greater than 80 wt. %, or greater than 90 wt. % such as greater than 95 wt. % or greater than 98 wt. % or greater than 99 wt. %) or all of the combined batches are unenriched renewable fuel oil.

A preferred (non-HDO) renewable fuel oil; a non-HDO, non-deoxygenated renewable fuel oil; a rapid thermo-mechanically-processed, non-hydrotreated renewable fuel oil; or a non-deoxygenated, non-upgraded, thermally-processed renewable fuel oil.

For example, the renewable fuel oil may comprise only thermally converted biomass or only thermo-mechanically converted biomass. Suitable renewable fuel oils may include a pyrolytic liquid, a thermo-pyrolytic liquid, a thermo-mechanical-pyrolytic liquid, a rapid thermo-pyrolytic liquid, or a rapid thermo-pyrolytic-mechanical liquid, derived or prepared from the conversion of biomass or cellulosic biomass. In certain embodiments, the renewable fuel oil may include a non-hydrodeoxygenated (non-HDO) renewable fuel oil; a non-deoxygenated renewable fuel oil; a non-upgraded renewable fuel oil; a thermally-processed cellulosic renewable fuel oil; a thermally-processed, non-upgraded-cellulosic renewable fuel oil; a thermally-processed biomass liquid; a thermally-processed, non-upgraded-biomass liquid; a thermally processed non-food-based biomass liquid; a thermally-processed non-food, cellulosic-based biomass liquid; a thermally-processed non-food, renewable liquid; a thermally-processed cellulosic liquid; a rapid thermal-processed cellulosic liquid; a rapid thermal-processed bio-oil; a rapid thermal processed biomass liquid or thermo-pyrolytic liquid having less than 5 wt. % solid content, such as less than 4 wt. %, 3 wt. %, 2.5 wt. %, 2 wt. %, 1 wt. %, or less than 0.5 wt. % solid content; a conditioned renewable fuel oil; a non-hydrotreated, non-upgraded renewable fuel oil; a pyrolysis oil or pyrolytic liquid; a thermo-pyrolysis oil or a thermo-pyrolytic liquid; a biooil or a bio-oil liquid; a biocrude oil or biocrude liquid; a thermo-catalytic pyrolysis oil or a thermo-catalytic pyrolytic oil; a catalytic pyrolysis oil; a catalytic pyrolytic liquid; or combinations thereof. For example, in certain embodiments, the renewable fuel oil may comprise one or more of a non-hydrodeoxygenated (non-HDO) renewable fuel oil; a non-deoxygenated renewable fuel oil; a non-upgraded renewable fuel oil; a thermally-processed cellulosic renewable fuel oil; a rapid thermo-mechanically-processed renewable fuel oil; a non-hydrotreated, non-upgraded renewable fuel oil; a pyrolysis oil or pyrolytic liquid; or a thermo-pyrolysis oil or a thermo-pyrolytic liquid.

In certain embodiments, the thermal conversion process of forming a suitable renewable fuel from biomass may include, for example, rapid thermal conversion processing. In certain embodiments, the mechanical aspect of the conversion process (sometimes referred to herein as "conditioning"), of forming a suitable renewable fuel from biomass may include, but may be not limited to drying; grinding; removing fines; removing tramp metal; sizing; removing ferrous metals; removing portions of ash; filtering; screening; cycloning; mechanically manipulating to remove a substantial portion of solid content; or combinations thereof. For example, conditioning may include one or more of the following processes, such as drying, grinding, removing fines, removing tramp metal, sizing, removing ferrous metals, removing portions of ash, filtering, screening, passing through a cyclone, mechanically manipulating, contacting with a magnet, or passing through a magnetic field. In certain embodiments, the conditioning may further include the addition of water or one or more alcohols, such as methanol, ethanol, propanol, isopropyl alcohol, glycerol, or butanol. For example, the renewable fuel oil may be conditioned by undergoing filtering, screening, cycloning, or mechanical manipulation processes to remove a substantial portion of solid content. In certain embodiments, conditioning of the biomass during the conversion to form a suitable renewable fuel oil may include removing a portion of carbon from the biomass by filtering, screening, cyclone, or mechanically manipulating the biomass. In certain embodiments, the thermal conversion process or thermo-mechanical conversion process may comprise a rapid thermal conversion process.

In certain embodiments, the renewable fuel oil may have a pH in the range of 0.5 to 8.0. For example, the renewable fuel oil may have a pH in the range of 0.5 to 7.0, such as 0.5 to 6.5, 1.0 to 6.0, 2.0 to 5.0, 3.0 to 7.0, 1.0 to 4.0, or 2.0 to 3.5. In certain embodiments, the pH of the renewable fuel oil may be less than 8.0, such as less than 7.0, less than 6.5, less than 6.0, less than 5.5, less than 5.0, less than 4.5, less than 4.0, less than 3.5, less than 3.0, less than 2.5, or less than 2.0. In certain embodiments, the pH of the renewable fuel oil may be altered or modified by the addition of an external, non-biomass derived material or pH altering agent. In certain embodiments, the renewable fuel oil may be acidic. For example, the renewable fuel oil may have a pH in the range of between 0.5 to 7, such as between 1 to 7, between 1 to 6.5, between 2 to 5, between 2 to 3.5, between 1 to 4, between 2 to 6, or between 2 to 5. In certain embodiments, the renewable fuel oil has the pH resulting from the conversion of the biomass from which it may be derived, such as a biomass-derived pH.

In certain embodiments, the renewable fuel oil may have a solids content in the range less than 5 wt. %. For example, the renewable fuel oil may have a solids content of less than 4 wt. %, less than 3 wt. %, less than 2.5 wt. %, less than 2 wt. %, less than 1 wt. %, less than 0.5 wt. %, or less than 0.1 wt. %. In certain embodiments, the renewable fuel oil may have a solids content in the range of between 0.005 wt. % and 5 wt. %. For example, the renewable fuel oil may have a solids content in the range of between 0.005 wt. % and 4 wt. %, such as between 0.005 wt. % and 3 wt. %, between 0.005 wt. % and 2.5 wt. %, between 0.005 wt. % and 2 wt. %, between 0.005 wt. % and 1 wt. %, between 0.005 wt. % and 0.5 wt. %, between 0.05 wt. % and 4 wt. %, between 0.05 wt. % and 2.5 wt. %, between 0.05 wt. % and 1 wt. %, between 0.05 wt. % and 0.5 wt. %, between 0.5 wt. % and 3 wt. %, between 0.5 wt. % and 1.5 wt. %, or between 0.5 wt. % and 1 wt. %.

In certain embodiments, the renewable fuel oil may have an ash content of less than 0.5 wt. %. For example, the renewable fuel oil may have an ash content of less than 0.4 wt. %, such as less than 0.3 wt. %, less than 0.2 wt. %, less than 0.1 wt. %, less than 0.05 wt. %, less than 0.005 wt. %, or less than 0.0005 wt. %. In certain embodiments, the renewable fuel oil may have an ash content in the range of between 0.0005 wt. % and 0.5 wt. %, such as between 0.0005 wt. % and 0.2 wt. %, between 0.0005 wt. % and 0.05 wt. %, or between 0.0005 wt. % and 0.1 wt. %.

In certain embodiments, the renewable fuel oil may comprise a water content in the range of between 10-40 wt. %. For example, the renewable fuel oil may comprise a water content in the range of between 15-35 wt. %, such as between 15-30 wt. %, between 20-35 wt. %, between 20-30 wt. %, between 30-35 wt. %, between 25-30 wt. %, or between 32-33 wt. % water. In certain embodiments, the renewable fuel oil may comprise a water content in the range of less than 40 wt. %, such as less than 35 wt. %, or less than 30 wt. %. In certain embodiments, the renewable fuel oil may comprise a water content of at least 10 wt. %, such as at least 15 wt. %, at least 20 wt. %, or at least 25 wt. %.

In certain embodiments, the renewable fuel oil may comprise an oxygen content level higher than that of a petroleum fraction feedstock. For example, the renewable fuel oil may have an oxygen content level of greater than 20 wt. %, on a dry basis or moisture-free basis, such as an oxygen content level in the range of between 20-50 wt. %, between 35-40 wt. %, between 25-35 wt. %, between 20-30 wt. %, between 25-50 wt. %, between 20-40 wt. %, or between 20-35 wt. %, on a dry basis or moisture-free basis.

In certain embodiments, the renewable fuel oil may comprise a greater oxygen content level than carbon content level. For example, the renewable fuel oil may have a greater oxygen content level than carbon content level, on a moisture-containing basis. In certain embodiments, the renewable fuel oil may have in the range of between 35-80 wt. % carbon content and in the range of between 20-50 wt. % oxygen content, on a dry basis or moisture-free basis. For example, the renewable fuel oil may have in the range of between 50-60 wt. % carbon content and in the range of between 35-40 wt. % oxygen content, on a dry basis or moisture-free basis.

In certain embodiments, the renewable fuel oil may comprise a carbon content level of at least 40 wt. % of the carbon content contained in the biomass from which it may be derived. For example, the renewable fuel oil may comprise a carbon content level of at least 45 wt. %, such as at least 50 wt. %, at least 55 wt. %, at least 60 wt. %, at least 65 wt. %, at least 70 wt. %, at least 75 wt. %, at least 80 wt. %, at least 85 wt. %, at least 90 wt. %, or at least 95 wt. % of the carbon content contained in the biomass from which it may be derived. In certain embodiments, the renewable fuel oil may comprise a carbon content level in the range of between 40 wt. % and 100 wt. % of the carbon content contained in the biomass from which it may be derived. For example, the renewable fuel oil may comprise a carbon content level in the range of between 40 wt. % and 95 wt. %, between 40 wt. % and 90 wt. %, between 40 wt. % and 80 wt. %, between 50 wt. % and 90 wt. %, between 50 wt. % and 75 wt. %, between 60 wt. % and 90 wt. %, between 60 wt. % and 80 wt. %, between 70 wt. % and 95 wt. %, between 70 wt. % and 80 wt. %, or between 70 wt. % and 90 wt. % of the carbon content contained in the biomass from which it may be derived. In certain embodiments, the renewable fuel oil may comprise a carbon content level lower than that of a petroleum fraction feedstock. For example, the renewable fuel oil may comprise a carbon content level in the range of between 35-80 wt. %, on a dry basis moisture-free basis, such as between 40-75 wt. %, between 45-70 wt. %, between 50-65 wt. %, between 50-60 wt. %, or between 54-58 wt. %, on a dry basis or moisture-free basis.

By way of example, Tables 1 & 2 provide analyses of several suitable renewable fuel oils which were prepared according to one or more of the procedures described in U.S. Pat. No. 7,905,990, U.S. Pat. No. 5,961,786, and U.S. Pat. No. 5,792,340, each of which is incorporated by reference in their entirety.

TABLE 1

Analytical Results for Alcell Lignin - Mild Run (LS-3) & Severe Run (LS-4)

| | LS-3 | LS-4 |
|---|---|---|
| Volatiles (wt %) | 14.7 | 27.9 |
| Moisture Content (wt %) | 1.0 | 0.9 |
| Ash content (wt %) | 0.05 | 1.00 |
| Elemental (wt %, MAF) | | |
| Carbon | 68.68 | 73.04 |
| Hydrogen | 7.16 | 6.52 |
| Nitrogen | 0.00 | 0.01 |
| Oxygen (difference) | 24.16 | 20.43 |
| Hydroxyl (wt %) | 7.54 | 7.50 |
| Methoxyl (wt %) | 15.68 | 1.02 |
| Sequential Solubility (wt %) | | |
| Diethyl Ether | 41.8 | 40.3 |
| Ethyl Acetate | 48.9 | 42.4 |
| Methanol | 0.2 | 0.6 |
| Residue | 9.1 | 16.7 |
| Fractionation (wt %) | | |
| Organic Acids | 31.7 | 3.6 |
| Phenols & Neutrals | 45.0 | 81.7 |
| Residue | 23.3 | 14.1 |

TABLE NOTE:
Mild Run (LS-3) was rapid thermal processed at about 500° C. and the Severe Run (LS-4) was rapid thermal processed ar about 700° C.

TABLE 2

Analytical Results of Renewable Fuel Oil Derived from Wood Biomass

| LABORATORY | 1) | 1) | 2) | 3) | 3) | 4) | 5) | AVERAGE |
|---|---|---|---|---|---|---|---|---|
| SPECIFIC GRAVITY | 1.19 | 1.20 | 1.21 | 1.217 | 1.226 | 1.186 | 1.188 | 1.20 |
| WATER CONTENT (% by wt) | 26 | 27 | 21 | 20.5 | 21 | 28.1 | | 23.9 |
| CHAR CONTENT (% by wt) | 2.0 | 0.6 | | 1.4 | 2.2 | 5.5 | 2.2 | 2.3 |
| HIGHER HEATING (BTU/lb) | 7267 | 7310 | 9245 | 7525 | 7955 | 6536 | 6880 | 7525 |
| ELEMENTAL (%, MAF) | | | | | | | | |
| CARBON | 55.1 | | 53.63 | 55.5 | 52.8 | 58.27 | 51.5 | 54.5 |
| HYDROGEN | 6.7 | | 6.06 | 6.7 | 6.9 | 5.5 | 6.8 | 6.4 |
| NITROGEN | 0.15 | | 0.24 | 0.1 | <0.1 | 0.39 | 0.17 | 0.18 |
| SULFUR | | | 0.02 | | | <0.14 | 0.07 | <.001 |
| ASH (% by wt) | | | | 0.13 | 0.15 | 0.22 | 0.13 | 0.16 |

TABLE NOTES:
The RFO derived from the Wood Biomass was analyzed by the following labs: 1) Universite Catholique de Louvain, Belgium; 2) ENEL, Centro Ricerca Termica, Italy; 3) VTT, Laboratory of Fuel and Process Technology, Finland; 4) CANMET, Energy Research Laboratories, Canada; 5) Commercial Testing and Engineering Co., U.S.A.

In certain embodiments, the renewable fuel oil may comprise an energy content level of at least 30% of the energy content contained in the biomass from which it may be derived. For example, the renewable fuel oil may comprise a energy content level of at least 45%, such as at least 55. %, at least 60%, at least 65. %, at least 70. %, at least 75. %, at least 80. %, at least 85%, at least 90. %, or at least 95. % of the energy content contained in the biomass from which it may be derived. In certain embodiments, the renewable fuel oil may comprise a energy content level in the range of between 50% and 98% of the energy content contained in the biomass from which it may be derived. For example, the renewable fuel oil may comprise a energy content level in the range of between 50% and 90%, between 50% and 75%, between 60% and 90%, between 60% and 80%, between 70% and 95%, between 70% and 80%, or between 70% and 90% of the energy content contained in the biomass from which it may be derived.

In certain embodiments, the renewable fuel oil may comprise a energy content level lower than that of a petroleum fraction feedstock. For example, the renewable fuel oil may comprise a energy content level in the range of between 30-95%, on a dry basis (moisture-free basis), relative to the energy content of a petroleum feedstock, such as between 40-90%, between 45-85%, between 50-80%, between 50-60%, or between 54-58%, on a dry basis or moisture-free basis, relative to the energy content of a petroleum feedstock. In certain embodiments, the renewable fuel oil may have an energy content in the range of between 30-90%, relative to the petroleum fraction feedstock energy content. For example, the renewable fuel oil may have an energy content of 35%, 40%, 45%, 50%, 55%, 60%, 65%, 70%, 75%, 80%, 85%, relative to the petroleum fraction feedstock energy content. In certain embodiments, a unit of the renewable fuel oil may have an energy content suitable to generate between 0.5-1.5 units of cellulosic-renewable index number-compliant fuel, such as between 0.7-1.2 units, between 0.9-1.1 units of cellulosic-renewable index number-compliant fuel. In certain embodiments, a unit of the renewable fuel oil may have an energy content equivalent to between 0.5-1.5 volume units of ethanol, such as between 0.7-1.2 volume units, between 0.9-1.1 volume units of ethanol.

In certain embodiments, a refinery method and system may include an assembly for introducing renewable fuel, renewable fuel oil or biomass-derived thermally produced liquid, in low proportions into a petroleum conversion unit, a refinery FCC unit (know more formally as a fluidized catalytic cracker) or field upgrader operation with the contact time of the FCC catalyst being for a period of seconds, for example 0.5 to 15 seconds, such as 1 second, 1.5 seconds, 2 seconds, 2.5 seconds, 3 seconds, 3.5 seconds, 4 seconds, 5 seconds and time periods approximating these times for example approximately 3-5 seconds.

The renewable oil may be conditioned to enable introduction into the refinery process and can be made from several compositions. One such example may be renewable oil that was produced from the rapid thermal conversion of biomass under the conditions of 400 to 600° C. at a processing residence time of less than 10 seconds either with or without the action of a catalyst. An example of a catalyst may be ZSM-5 or other FCC catalyst.

According to one embodiment, an amount of thermally produced renewable oil addition rate (in the case of an FCC unit, an example detailed in FIG. 1) includes less than 10% by weight (e.g. in a range between 0.05% by weight and 10% by weight), preferably in the range greater than 1% by weight and less than 5% by weight.

In certain embodiments, a petroleum fraction feedstock, for example derived from upgrading petroleum, comprises a gas oil (GO) feedstock, a vacuum gas oil (VGO) feedstock, a heavy gas oil (HGO) feedstock, a middle distillate feedstock, a heavy-middle distillate feedstock, a hydrocarbon-based feedstock, or combinations thereof. For example, the petroleum fraction feedstock comprises a gas oil feedstock, a vacuum gas oil (VGO) feedstock, a heavy gas oil (HGO) feedstock, or a middle distillate feedstock.

In certain embodiments, the amount of renewable fuel oil (RFO) feedstock that may be introduced into a refinery for co-processing with a petroleum fraction feedstock, may be in the range of 1 wt. % to 20 wt. %, relative to the total amount of feedstock introduced into the refinery for processing. For example, the amount of renewable fuel oil (RFO) feedstock introduced into the refinery for co-processing with a petroleum fraction feedstock, may be in the range of 1 wt. % to 15 wt. %, relative to the total amount (for example the petroleum fraction feedstock plus the RFO feedstock) of feedstock introduced into the conversion unit of the refinery for processing, such as 2 wt. % to 13 wt. %, 4 wt. % to 10 wt. %, 5 wt. % to 8 wt. %, 7 wt. % to 12 wt. %, or 3 wt. % to 7 wt. %, relative to the total amount of feedstock introduced into the conversion unit for processing. In certain embodiments, the amount of renewable fuel oil (RFO) feedstock introduced into the conversion unit for co-processing with a petroleum fraction feedstock, may be 1 wt. %, relative to the total amount of feedstock introduced into the refinery for processing, such as 2 wt. %, 3 wt. %, 4 wt. %, 5 wt. %, 6 wt. %, 7 wt. %, 8 wt. %, 9 wt. %, 10 wt. %, 11 wt. %, 12 wt. %, 13 wt. %, 14 wt. %, 15 wt. %, 16 wt. %, 17 wt. %, 18 wt. %, 19 wt. %, 20 wt. %, relative to the total amount of feedstock introduced into the refinery for processing. In certain embodiments, the amount of renewable fuel oil (RFO) feedstock introduced into the refinery for co-processing with a petroleum fraction feedstock, may be at least 1 wt. % and less than 20 wt. %, relative to the total amount of feedstock introduced into the refinery for processing, such as at least 2 wt. %, 3 wt. %, 4 wt. %, 5 wt. %, 6 wt. %, 7 wt. %, 8 wt. %, 9 wt. %, or 10 wt. %, and less than 20 wt. %, relative to the total amount of feedstock introduced into the conversion unit for processing.

In certain embodiments, the processing of the petroleum fraction feedstock with the renewable fuel oil has a substantially equivalent or greater performance in preparing the fuel product, relative to processing solely the petroleum fraction feedstock in the absence of the renewable fuel oil. For example, processing a up to 20 wt. % of RFO with the remainder petroleum fraction feedstock, for example 2:98, 5:95, 10:90 weight ratio of renewable fuel oil to the petroleum fraction feedstock may have a substantially equivalent or greater performance in the resulting the fuel products, relative to processing solely the petroleum fraction feedstock in the absence of the renewable fuel oil. For example, processing in the range of between a 20:80 to 0.05:99.95 weight ratio of renewable fuel oil with petroleum fraction feedstock may resulting in an weight percent increase in gasoline of more than 0.1 wt. %, for example 0.5 wt. %, 1.0 wt. %, 1.5 wt. %, 2.0 wt. % or more, relative to processing solely the petroleum fraction feedstock in the absence of the renewable fuel oil.

According to one embodiment, an amount of RFO may be blended with a wide variety of gas oils and/or blends of gas oils including HGO (Heavy Gas Oil), LGO (Light Gas Oil) and VGO (Vacuum Gas Oil) as well as other petroleum fractions and blends. The HGO may be another lighter feedstock that can be directed to a refinery FCC unit. Either in combination with the gas oil, as in a mixed feed stream or as a separate feed stream either before, after or before and after the introduction of the gas oil. Alternatively, the gas oil may be introduced jointly with the RFO, before, after or before and after the introduction of the RFO. Either the RFO or the gas oil or both may be alternatively fed in a pulse manner.

According to one embodiment, an amount of renewable oil may be blended with VGO (Vacuum Gas Oil). VGO may be a feedstock typically fed to a refinery FCC unit. The blend of renewable oil and VGO targets a final measured TAN (Total Acid Number) less than 1.0 (e.g. in a range between 0.05 and 1.0), and preferably in the range less than 0.5 (e.g. in a range between 0.05 and 0.5), and more preferably in the range less than 0.25 (e.g. in a range between 0.05 and 0.25).

According to one embodiment, an amount of renewable oil may be blended with HGO (Heavy Gas Oil). HGO may be another lighter feedstock that can be directed to a refinery FCC unit. Either in combination with VGO or as a separate feed.

According to one embodiment, an amount of renewable oil may be blended with lighter petroleum fractions such as LCO, or gasoline with or without a surfactant. The content of LCO, and/or gasoline blended with the renewable oil may be in the range of less than 10% by weight (e.g., in a range between 0.005% by weight and 10% by weight), and preferably in the range less than 5% by weight (e.g., in a range between 0.005% by weight and 5% by weight), and more preferably in the range of less than 1% by weight (e.g., in a range between 0.005% by weight and 1% by weight).

According to one embodiment, the renewable oil includes all of the whole liquid produced from the thermal or catalytic conversion of biomass, with preferably low water content. Alternatively, whole liquid produced from the thermal or catalytic conversion of biomass may be phase separated to provide a predominately non-aqueous fraction as the feedstock for refinery systems. In addition, fractions can be taken from the unit operations of the downstream liquid collection system of thermal or catalytically converted biomass such as a primary condenser means, a secondary condenser, demister, filter, or an electrostatic precipitator.

According to one embodiment, the flash point of a renewable oil may be increased to reduce the volatile content of the liquid and subsequently co-processed in an FCC with a petroleum feedstock. The flash point would be increased above the range of 55-62° C. as measured by the Pensky-Martens closed cup flash point tester (e.g. ASTM D-93). Various methods and apparatus can be used to effectively reduce the volatile components, such as wiped film evaporator, falling film evaporator, flash column, packed column, devolatilization vessel or tank. Reduction of the some of the volatile components of the renewable can help to reduce undesirable components such as phenols from passing through the FCC reactor and ending up in the collected water stream.

In certain embodiments, the water content of the renewable fuel oil (RFO) feedstock that may be introduced into a refinery for co-processing with a petroleum fraction feedstock, may be in the range of 0.05 wt. % to 40 wt. %. For example, the water content of the renewable fuel oil (RFO) feedstock introduced into the refinery for co-processing with a petroleum fraction feedstock, may be in the range of 1 wt. % to 35 wt. %, such as 5 wt. % to 35 wt. %, 10 wt. % to 30 wt. %, 10 wt. % to 20 wt. %, 10 wt. % to 15 wt. %, 15 wt. % to 25 wt. %, 15 wt. % to 20 wt. %, 20 wt. % to 35 wt. %, 20 wt. % to 30 wt. %, 20 wt. % to 25 wt. %, 25 wt. % to 30 wt. %, or 30 wt. % to 35 wt. %. In certain embodiments, the water content of the renewable fuel oil (RFO) feedstock introduced into the refinery for co-processing with a petroleum fraction feedstock, may be at least 23 wt. % such as at least 25 wt. %, at least 28 wt. %, at least 30 wt. %, at least 31 wt. %, at least 32 wt. %, at least 33 wt. %, or at least 35 wt. %. In certain embodiments, the water content of the renewable fuel oil (RFO) feedstock introduced into the refinery for co-processing with a petroleum fraction feedstock, may be at least 1 wt. %, such as at least 10 wt. %, at least 15 wt. %, at least 20 wt. %, or at least 30 wt. %. In certain embodiments, the water content of the renewable fuel oil (RFO) feedstock introduced into the refinery for co-processing with a petroleum fraction feedstock, may be less than 38 wt. %, such as less than 35 wt. %, less than 34 wt. %, less than 30 wt. %, less than 25 wt. %, less than 20 wt. %, or less than 15 wt. %.

The hydrogen forms of zeolites used in FCC systems are powerful solid-based acids, and can facilitate a host of acid-catalyzed reactions, such as isomerisation, alkylation, and cracking. The specific activation modality of most zeolitic catalysts used in petrochemical applications involves quantum-chemical Lewis acid site reactions. The present system benefits from the characteristics of renewable oil, namely its TAN or acidic nature, that can lead to an improvement in cracking or the conversion of VGO (i.e., a synergistic effect) in FCC operations. This results in a shift toward more light ends or desirable products and a reduction in undesirable products by way of example heavy cycle oil and clarified slurry oil.

Fluid catalytic cracking (FCC) may be a conversion process used in petroleum refineries. It may be widely used to convert the high-boiling, high-molecular weight hydrocarbon fractions of petroleum crude oils to more valuable gasoline, olefinic gases, and other products. Catalytic cracking produces more gasoline with a higher octane rating. It also produces byproduct gases that are more olefinic, and hence more valuable, than those produced by thermal cracking.

The feedstock to an FCC may be usually that portion of the crude oil that has an initial boiling point of 340° C. or higher at atmospheric pressure and an average molecular weight ranging from about 200 to 600 or higher. This portion of crude oil may be often referred to as heavy gas oil. The FCC process vaporizes and breaks the long-chain molecules of the high-boiling hydrocarbon liquids into much shorter molecules by contacting the feedstock, at high temperature and moderate pressure, with a fluidized powdered catalyst.

FIG. 1 illustrates a fluid catalytic cracking (FCC) unit. The schematic flow diagram of a typical modern FCC unit in FIG. 1 is based upon a "side-by-side" configuration. The illustration depicts where the renewable fuel oil feedstock 101 could be introduced into a system. The FFC could be designed to have two or more feedstock injection points at least one for the petroleum fraction feedstock and at least one for the renewable fuel oil feedstock or these feedstock could be co-injected (by have them mixed upstream of the injection point) or the system could be fitted with multiple points of injection for either, both or mixtures of the feedstock. Alternatively, the FCC unit could be retro-fitted to include a way of introducing the renewable fuel oil, for example adding an injection port proximate the riser or at some point in the process wherein the catalyst may be upflowing.

In FIGS. 2A&B, unprocessed renewable oil feedstock 101 can be fed upstream or downstream of a gas oil (GO) feed inlet port 201. Renewable oil feedstock 101 is introduced in this section of the riser thereby potentially imparting properties of the renewable oil (e.g., acid nature of the oil) onto the catalyst and promoting GO conversion as it may be introduced downstream of the renewable oil 101. Alternatively, the renewable oil can be introduced downstream of the GO fresh feed injection nozzles 201. FIG. 2B, presents a retrofitted riser with a retro-fitted renewable oil feedstock injection port or ports 102. The riser may be adapted to include multiple renewable oil feedstock injection port or ports 102 both before and after the introduction of the VGO. It may be retro-fitted to have only one additional renewable oil feedstock injection port 102 positioned either before or after the GO injection point or it may be retro-fitted to have a renewable oil feedstock injection port or ports 102 along the GO feedstock feed line.

In FIG. 3 A riser quench system injects vaporizable oil into the riser above the VGO feed injection nozzles 201. The recycle material may act as a heat sink as it may be vaporized by the catalyst. At constant riser outlet temperature, quench may increase the catalyst-to-oil ratio because the riser outlet temperature control point may be downstream of the quench location. Introduction of the quench oil may also increases the temperature in the mix zone and lower section of the riser, as shown in FIG. 3. In an embodiment (or a retro-fitted embodiment) the renewable fuel oil feedstock may be injected into the quench line of the riser.

In some embodiment, it may be that the primary contaminants found in VGO, typically fed to an FCC, are vanadium, nickel and to a lesser degree, sodium and iron. The catalyst used in FCC may tend to absorb these contaminants which may then have a negative effect on the conversion of VGO in the reactor. An additional advantage of co-feeding a renewable fuel oil with a GO, for example VGO, to an FCC may be that the renewable oil contains little or none of these contaminants. Thereby, prolonging the useful life of the catalyst, and helping to maintain greater catalyst activity and improved conversion levels.

In certain embodiments, the system or apparatus may be employed for processing or co-processing the petroleum fraction feedstock, the renewable fuel oil, or combinations thereof, may include a refinery system, a conversion unit, such as a fluidized catalytic cracker (FCC), a FCC refinery system, a coker, a coking unit, a field upgrader unit, a hydrotreater, a hydrotreatment unit, a hydrocracker, a hydrocracking unit, or a desulfurization unit. For example, the system, apparatus or conversion may be or comprise an FCC unit operation; the system or apparatus is or comprises a coker; the system or apparatus is or comprises a hydrotreater; or the system or apparatus is or comprises a hydrocracker. In certain embodiments, the system or apparatus may be employed for processing or co-processing the petroleum fraction feedstock, the renewable fuel oil, or combinations thereof, may include a retro-fitted refinery system, such as a refinery system comprising a retro-fitted port for the introduction of a renewable fuel oil. For example, the system or apparatus employed may include a retro-fitted FCC refinery system having one or more retro-fitted ports for introducing a renewable fuel oil. The retro-fitted port, for example, may be stainless steel port, such as a 304 or 316 stainless steel port, titanium or some other alloy or combination of high durability, high corrosive environment material.

In certain embodiments, the system present includes an apparatus, and a method of using the same, for example a refinery system, such as a fluidized catalytic cracker (FCC), a FCC refinery system, a coker, a coking unit, a field upgrader unit, a hydrotreater, a hydrotreatment unit, a hydrocracker, a hydrocracking unit, a desulfurization unit, or a retro-fitted refinery system, in conjunction with providing, injecting, introducing, or processing the renewable fuel oil. For example, a refinery system for processing a petroleum fraction feedstock with a renewable fuel may include a retro-fitted refinery system, a fluidized catalytic cracker (FCC), a retro-fitted FCC, a coker, a retro-fitted coker, a field upgrader unit, a hydrotreater, a retro-fitted hydrotreater, a hydrocracker, or a retro-fitted hydrocracker.

In certain embodiments, the method may include introducing, injecting, feeding, co-feeding, a renewable fuel oil into a refinery system via a mixing zone, a nozzle, a retro-fitted port, a retro-fitted nozzle, a velocity steam line, or a live-tap. For example, the method may comprise processing a petroleum fraction feedstock with a renewable fuel oil. In certain embodiments, the processing may comprise co-injecting the petroleum fraction feedstock and the renewable fuel oil, such as co-feeding, independently or separately introducing, injecting, feeding, or co-feeding, the petroleum fraction feedstock and the renewable fuel oil into a refinery system. For example, the petroleum fraction feedstock and the renewable fuel oil may be provided, introduced, injected, fed, or co-fed proximate to each other into the reactor, reaction zone, reaction riser of the refinery system. In certain embodiments, the renewable fuel oil may be provided, introduced, injected, fed, co-fed into the reactor, reaction zone, or reaction riser of the refinery system proximate, upstream, or downstream to the delivery or injection point of the petroleum fraction feedstock. In certain embodiments, the petroleum fraction feedstock and the renewable fuel oil come in contact with each other upon introduction, delivery, injection, feeding, co-feeding into the refinery system, into the reactor, into the reaction zone, or into the reaction riser. In certain embodiments, the petroleum fraction feedstock and the renewable fuel oil come in contact with each other subsequent to entering the refinery system, the reactor, the reaction zone, or the reaction riser. In certain embodiments, the petroleum fraction feedstock and the renewable fuel oil make first contact with each other subsequent to entering into, introduction into, injection into, feeding into, or co-feeding into the refinery system, the reactor, the reaction zone, or the reaction riser. In certain embodiments, the petroleum fraction feedstock and the renewable fuel oil are co-blended prior to injection into the refinery system.

The petroleum fraction feedstock and the renewable fuel oil may be introduced into the refinery system through different or similar delivery systems. For example, the petroleum fraction feedstock and the renewable fuel oil may be introduced into the refinery system through one or more independent or separate injection nozzles. The petroleum fraction feedstock and the renewable fuel oil may be introduced into the refinery system proximate or near to each other in a FCC reactor riser in the refinery system. The renewable fuel oil may be introduced into the refinery system above, below, near, or proximate the introduction point of the fossil fuel feedstock in the refinery system. In certain embodiments, one or more injection nozzles may be located in a FCC reactor riser in the refinery system suitable for introducing the fossil fuel feedstock or the renewable fuel oil. The renewable fuel oil may be introduced into the refinery system through a lift steam line located at the bottom of the FCC reactor riser. In certain embodiments, the petroleum fraction feedstock may be introduced into the refinery system at a first injection point and the renewable fuel oil may be introduced into the refinery system at a second injection point. For example, the first injection point may be upstream of the second injection point, the first injection point may be downstream of the second injection point, the first injection point may be proximate to the second injection point, the first injection point and the second injection point may be located in a reactor riser, such as an FCC reactor riser. In certain embodiments, a renewable fuel oil may be introduced below a reactor riser, such as an FCC reactor riser, during conversion of the petroleum fraction feedstock. For example, a renewable fuel oil may be injected via a quench riser system upstream, downstream, or proximate, from the introduction point of the petroleum fraction feedstock. In certain embodiments, a renewable fuel oil may be injected via a quench riser system located above, below, or proximate, a petroleum fraction feedstock injection nozzle.

In certain embodiments, the prepared fuel product may comprise a product of a fluidized catalytic cracker having a petroleum fraction and a renewable fuel oil as reactants, for example, a product of a fluidized catalytic cracker processing a petroleum fraction and a renewable fuel oil, a product of a fluidized catalytic cracker wherein the fluidized catalytic cracker receives a petroleum fraction and a renewable fuel oil, a processed product from a mixture of a petroleum fraction feedstock and a renewable fuel oil that have been in contact with a catalyst.

In certain embodiments, the prepared fuel product may comprise a fluidized catalytic cracker product composition derived from catalytic contact of a feedstock comprising a renewable fuel oil, for example a fuel composition derived from a petroleum fraction feedstock, and a renewable fuel oil feedstock, such as a fuel composition derived from 80-99.95 wt. % of a petroleum fraction feedstock, and 0.05-20 wt. % of a renewable fuel oil feedstock, or a fuel composition derived from 80-99.95 vol. % of a petroleum fraction feedstock, and 20-0.05 vol. % of a renewable fuel oil.

In certain embodiments, a method of processing a petroleum fraction with a substituted amount of a renewable fuel oil in the presence of a catalyst results in an increased or improved yield of transportation fuel for example, and increase of at least 0.5 wt. %, relative to the identical process on an equivalent energy or carbon content basis of the feedstream wherein the petroleum fraction is not substituted with the renewable fuel oil. For example, the improved or increased transportation fuel yield may be a gasoline, a diesel fuel, a LPG, a heating oil, a jet fuel, an LCO, a transportation fuel, and/or a power fuel.

In certain embodiments, a method of improving or increasing petroleum conversion, relative to an equivalent energy input of a fraction of the petroleum, in a refinery may comprise processing a lesser amount of the fraction of the petroleum with a renewable fuel oil in the presence of a catalyst. For example, the method of improving or increasing petroleum fraction feedstock conversion may comprise processing the petroleum fraction feedstock with a renewable fuel oil feedstock in the presence of a catalyst. In certain embodiments, a method of improving or increasing fuel yield from a petroleum feedstock, may comprise processing a fraction of the petroleum with a renewable fuel oil in the presence of a catalyst. For example, the improved or increased fuel yield may be a gasoline, a diesel fuel, a LPG, a heating oil, a jet fuel, an LCO, a transportation fuel, or a power fuel.

In certain embodiments, a method of preparing a fuel may comprise processing a petroleum fraction feedstock with a renewable fuel oil feedstock in the presence of a catalyst. For example, the method of preparing a fuel may comprise providing a renewable fuel oil feedstock for processing with a petroleum fraction feedstock in the presence of a catalyst. In certain embodiments, the method of preparing a fuel may comprises: i) processing a petroleum fraction feedstock with a renewable fuel oil feedstock in the presence of a catalyst; and ii) optionally, adjusting feed addition rates of the petroleum fraction feedstock, the renewable fuel oil feedstock, or both, to target a particular fuel product profile, riser temperature, or reaction zone temperature; or iii) optionally, adjusting catalyst to combined petroleum fraction feedstock and renewable fuel oil feedstock ratio (catalyst:oil ratio) to target a particular fuel product profile, riser temperature, or reaction zone temperature; wherein the catalyst:oil ratio may be a weight ratio or a volume ratio.

For example, the method of preparing a fuel may comprises: i) processing a petroleum fraction feedstock with a renewable fuel oil feedstock in the presence of a catalyst; ii) adjusting feed addition rates of the petroleum fraction feedstock, the renewable fuel oil feedstock, or both, to target a particular fuel product profile, riser temperature, or reaction zone temperature; and iii) optionally, adjusting catalyst to combined petroleum fraction feedstock and renewable fuel oil feedstock ratio (catalyst:oil ratio) to target a particular fuel product profile, riser temperature, or reaction zone temperature; wherein the catalyst:oil ratio may be a weight ratio or a volume ratio. For example, the method of preparing a fuel may comprises: i) processing a petroleum fraction feedstock with a renewable fuel oil feedstock in the presence of a catalyst; ii) optionally, adjusting feed addition rates of the petroleum fraction feedstock, the renewable fuel oil feedstock, or both, to target a particular fuel product profile, riser temperature, or reaction zone temperature; and iii) adjusting catalyst to combined petroleum fraction feedstock and renewable fuel oil feedstock ratio (catalyst:oil ratio) to target a particular fuel product profile, riser temperature, or reaction zone temperature; wherein the catalyst:oil ratio may be a weight ratio or a volume ratio. For example, the method of preparing a fuel may comprises: i) processing a petroleum fraction feedstock with a renewable fuel oil feedstock in the presence of a catalyst; ii) adjusting feed addition rates of the petroleum fraction feedstock, the renewable fuel oil feedstock, or both, to target a particular fuel product profile, riser temperature, or reaction zone temperature; and iii) adjusting catalyst to combined petroleum fraction feedstock and renewable fuel oil feedstock ratio (catalyst:oil ratio) to target a particular fuel product profile, riser temperature, or reaction zone temperature; wherein the catalyst:oil ratio may be a weight ratio or a volume ratio. For example, the method may include increasing or decreasing the wt. % or vol. % of the renewable fuel oil to favor a particular fuel product profile, such as favoring an increased yield of gasoline, diesel fuel, LPG, heating oil, jet fuel, or LCO, such as gasoline, LCO, or gasoline and LCO. For example, the method may include increasing or decreasing the catalyst:oil ratio to favor a particular fuel product profile, such as favoring an increased yield of gasoline, diesel fuel, LPG, heating oil, jet fuel, or LCO, such as gasoline, LCO, or gasoline and LCO. For example, the method of preparing a fuel product having at least 70 vol. % of gasoline and LCO may comprise the following steps: i) processing a petroleum fraction feedstock with a renewable fuel oil feedstock in the presence of a catalyst; and ii) optionally, adjusting feed addition rates of the petroleum fraction feedstock, the renewable fuel oil feedstock, or both, to target a particular fuel product profile, riser temperature, or reaction zone temperature; or iii) optionally, adjusting catalyst to combined petroleum fraction feedstock and renewable fuel oil feedstock ratio (catalyst:oil ratio) to target a particular fuel product profile, riser temperature, or reaction zone temperature; wherein the catalyst:oil ratio may be a weight ratio or a volume ratio. For example, the fuel prepared may be a gasoline, a diesel fuel, a LPG, a heating oil, a jet fuel, an LCO, a transportation fuel, or a power fuel.

In certain embodiments, the method includes processing or co-processing a petroleum fraction feedstock in the presence of a catalyst with a renewable fuel oil in a refinery to produce a fuel product, such as a cellulosic renewable identification number-compliant fuel product. For example, the prepared fuel product from processing or co-processing a petroleum fraction feedstock with a renewable fuel oil in a refinery may include a distillated fuel or distillate fuel oil, a heating oil, refined-heating oil, heating oil distillate, or a refined-heating oil distillate. In certain embodiments, the prepared fuel product may include one or more of a transportation fuel, such as a high-value transportation liquid, a gasoline, a light cycle oil (LCO), a diesel fuel, a jet fuel, an LPG (C4-C3), a heating oil distillate, a middle distillate, a high-value middle distillate, a combustible fuel, a power fuel, a generator fuel, a generator-compliant fuel, an internal combustion engine-combustible fuel, a valuable fuel or valuable fuel component, a cellulosic fuel, a cellulosic-renewable index number-compliant fuel, or a D-code 1-7-compliant fuel, in accordance with U.S. renewable fuel standard program (RFS) regulations (such as a D-code 1-compliant fuel, a D-code 2-compliant fuel, a D-code 3-compliant fuel, a D-code 4-compliant fuel, a D-code 5-compliant fuel, a D-code 6-compliant fuel, or a D-code 7-compliant fuel). In certain embodiments, the prepared fuel product may have a product file of 50-55 vol. % gasoline, 15-20 vol. % LCO, 15-20 vol. % LPG, and 6-12 vol. % HCO. For example, the prepared fuel product may have a product file of 45-55 vol. % gasoline, 15-20 vol. % LCO, 15-20 vol. % LPG, and 6-12 vol. % HCO. For example, in certain embodiments, the prepared fuel product may be exclusive of a heavy cycle oil (LCO), dry gas, or coke. In certain embodiments, the prepared fuel product may be a diesel fuel, a gasoline, a jet fuel, a cellulosic fuel, a cellulosic-renewable index number-compliant fuel, or a heating oil. For example, the prepared fuel product may be a cellulosic fuel, such as a diesel fuel, a cellulosic-renewable index number qualifying-diesel fuel, a gasoline, a cellulosic-renewable identification number qualifying-gasoline, a heating oil, cellulosic-renewable index number qualifying-heating oil, a cellulosic fuel qualifying for cellulosic renewable identification numbers, or a D-code 7-compliant fuel.

In certain embodiments, the prepared fuel product may be produced via a fuel pathway specified in U.S. renewable fuel standard program (RFS) regulations for generating cellulosic renewable identification numbers. For example, the pathway may include a transportation fuel pathway, a diesel fuel pathway, a gasoline pathway, a heating oil pathway, a cellulosic fuel pathway, a cellulosic renewable identification number-compliant pathway, a pathway compliant in generating, producing, preparing, or making, a cellulosic renewable identification number-compliant fuel, or a pathway that complies with a fuel pathway specified in U.S. renewable fuel standard program (RFS) regulations for generating the cellulosic renewable identification number. For example, the prepared fuel product may be a fuel compliant with U.S. renewable fuel standard program (RFS) regulations for generating a cellulosic-renewable index number, such as a cellulosic fuel compliant with U.S. renewable fuel standard program (RFS) regulations for generating a cellulosic-renewable index number, or a co-processed refinery product suitable for substantially generating a cellulosic renewable identification number. In certain embodiments, the prepared fuel product may be prepared according to a method that may be compliant with generating one or more, such as a plurality, of cellulosic-renewable index numbers. For example, the processed fuel product may be capable of producing, generating a cellulosic renewable identification number. In certain embodiments, the prepared fuel product may be exchangeable, tradable, or sellable, for a obtaining one or more cellulosic renewable identification numbers. The prepared fuel product, and the method of preparing the same, may be capable of satisfying renewable volume obligations established by U.S. renewable fuel standard program (RFS) regulations. For example, the prepared fuel product may be compliant with meeting U.S. renewable volume obligations. In certain embodiments, the prepared fuel product may be produced via a method comprising obtaining one or more cellulosic-renewable identification numbers based on the amount of fuel produced complying with, or meeting, the definition of a cellulosic fuel. For example, the cellulosic fuel may be a gasoline, a diesel, an LCO, an LPG, a jet fuel, or a heating oil. In certain embodiments, the method may comprise trading, selling, or exchanging one or more cellulosic-renewable identification numbers obtained from the prepared fuel product, such as a cellulosic-renewable identification number-compliant fuel having a D-code of 7, in accordance with US regulations.

In certain embodiments, a pathway for preparing a cellulosic renewable identification number-compliant fuel may comprise processing a petroleum fraction feedstock with a renewable fuel oil feedstock in the presence of a catalyst. In certain embodiments, a method for meeting renewable volume obligations (RVO) according to US RFS regulations may comprise processing a petroleum fraction feedstock with a renewable fuel oil (RFO) feedstock in the presence of a catalyst.

FIG. 4 illustrates a coking unit for use with the present system, according to one embodiment. A coker or coker unit may be a type of conversion unit that may be used in an oil refinery processing unit that converts the conditioned renewable oil feedstock 101. The process thermally cracks the long chain hydrocarbon molecules in the residual oil feed into shorter chain molecules.

A coke may either be fuel grade (high in sulphur and metals) or anode grade (low in sulphur and metals). The raw coke directly out of a coker may be often referred to as green coke. In this context, "green" means unprocessed. The further processing of green coke by calcining in a rotary kiln removes residual volatile hydrocarbons from the coke. A calcined petroleum coke may be further processed in an anode baking oven in order to produce anode coke of the desired shape and physical properties. The anodes are mainly used in the aluminum and steel industry.

Crude oil extracted from field operations, such as the Western Canadian oil sands, may be pre-processed before it may be fit for pipeline transport and utilization in conventional refineries. This pre-processing may be called 'upgrading' (performed by a field upgrader unit), the key components of which are as follows:

Removal of water, sand, physical waste, and lighter products;
Hydrotreating; and
Hydrogenation through carbon rejection or catalytic hydrocracking (HCR).

As carbon rejection may be very inefficient and wasteful in most cases, catalytic hydrocracking may be preferred in some cases.

Hydrotreating and hydrocracking together may be known as hydroprocessing. The big challenge in hydroprocessing may be to deal with the impurities found in heavy crude, as they poison the catalysts over time. Many efforts have been made to deal with this to ensure high activity and long life of a catalyst. Catalyst materials and pore size distributions are key parameters that need to be optimized to handle these challenges and this varies from place to place, depending on the kind of feedstock present.

Hydrocracking may be a catalytic cracking process assisted by the presence of an elevated partial pressure of hydrogen gas. Similar to the hydrotreater, the function of hydrogen may be the purification of the hydrocarbon stream from sulfur and nitrogen hetero-atoms.

In certain embodiments, a renewable fuel oil may be introduced into the field upgrading operations. Methods as previously described may be employed to feed the renewable fuel into any of the unit operations associated with field upgrader systems.

In certain embodiments, a renewable fuel oil may be introduced into a lube oil refinery facility. Specifically renewable fuel may be introduced into the hydrotreater section of the refinery where gasoline and other transportation fuels are produced. Some renewable fuels such as vegetable oil may have properties that enable the blending, substitution or improvement to the lube oil products.

In certain embodiments, a renewable fuel oil may be introduced into a refinery system, such as an FCC, a hydrotreating unit, or a hydrocracker unit, in a range of between 0.05 wt. % and 20 wt. %, relative to the amount of a petroleum fraction feedstock introduced, such as between 0.05 wt. % and 15 wt. %, between 0.05 wt. % and 14 wt. %, between 0.05 wt. % and 13 wt. %, between 0.05 wt. % and 12 wt. %, between 0.05 wt. % and 11 wt. %, between 0.05 wt. % and 10 wt. %, between 0.05 wt. % and 9 wt. %, between 0.05 wt. % and 8 wt. %, between 0.05 wt. % and 7 wt. %, between 0.5 wt. % and 20 wt. %, between 0.5 wt. % and 15 wt. %, between 0.5 wt. % and 10 wt. %, between 1 wt. % and 15 wt. %, between 2 wt. % and 12 wt. %, between 3 wt. % and 10 wt. %, between 4 wt. % and 9 wt. %, or between 7 wt. % and 15 wt. %, relative to the amount of a petroleum fraction feedstock introduced.

In certain embodiments, a renewable fuel oil may be introduced into a refinery system, such as an FCC, a hydrotreating unit, or a hydrocracker unit, in a range of between 0.05 wt. % and 20 wt. %, relative to the total amount of a petroleum fraction feedstock and the renewable fuel oil introduced, such as between 0.05 wt. % and 15 wt. %, between 0.05 wt. % and 14 wt. %, between 0.05 wt. % and 13 wt. %, between 0.05 wt. % and 12 wt. %, between 0.05 wt. % and 11 wt. %, between 0.05 wt. % and 10 wt. %, between 0.05 wt. % and 9 wt. %, between 0.05 wt. % and 8 wt. %, between 0.05 wt. % and 7 wt. %, between 0.5 wt. % and 20 wt. %, between 0.5 wt. % and 15 wt. %, between 0.5 wt. % and 10 wt. %, between 1 wt. % and 15 wt. %, between 2 wt. % and 12 wt. %, between 3 wt. % and 10 wt. %, between 4 wt. % and 9 wt. %, or between 7 wt. % and 15 wt. %, relative to the total amount of a petroleum fraction feedstock and the renewable fuel oil introduced.

In certain embodiments, a method of preparing a fuel product may include processing 80-99.95 wt. % of a petroleum fraction feedstock with 20-0.05 wt. % of a renewable fuel oil in the presence of a catalyst. For example, the method may include processing 80 wt. % of the petroleum fraction feedstock and 20 wt. % of the renewable fuel oil, such as 85 wt. % petroleum fraction feedstock and 15 wt. % renewable fuel oil, 90 wt. % petroleum fraction feedstock and 10 wt. % renewable fuel oil, 95 wt. % petroleum fraction feedstock and 5 wt. % renewable fuel oil, 98 wt. % petroleum fraction feedstock and 2 wt. % renewable fuel oil, or 99.5 wt. % petroleum fraction feedstock and 0.5 wt. % renewable fuel oil. In certain embodiments, a method of preparing a fuel product may include processing a petroleum fraction feedstock and a renewable fuel oil in a weight ratio in the range of between 80:20 to 99.95:0.05. For example, the method may include processing the petroleum fraction feedstock and the renewable fuel oil in a 98:2 weight ratio, such as a 95:5, 90:10, 85:15, or 80:20 weight ratio. In certain embodiments, a method of preparing a fuel product may include processing 20-0.05 wt. % of a renewable fuel oil, relative to the amount of the petroleum fraction feedstock processed. In certain embodiments, a method of preparing a fuel product may include processing 20-0.05 wt. % of a renewable fuel oil, relative to the total amount of the petroleum fraction feedstock and the renewable fuel oil. In certain embodiments, a method of preparing a fuel product may include processing 20-0.05 vol. % of the renewable fuel oil, relative to the volume of the petroleum fraction feedstock processed. In certain embodiments, a method of preparing a fuel product may include processing 20-0.05 vol. % of the renewable fuel oil, relative to the total volume of the petroleum fraction feedstock and the renewable fuel oil.

In certain embodiments, the weight ratio of the total amount of petroleum fraction feedstock and renewable fuel oil introduced into a refinery system to the amount of catalyst utilized, or the total amount of the combined petroleum fraction feedstock and renewable fuel oil introduced into a refinery system that contacts the catalyst utilized in the refinery system (sometimes referred to as a "catalyst-to-oil ratio" or "catalyst:oil ratio") may be in the range of between 4:1 to 15:1. For example, the catalyst-to-oil ratio may be in the range of between 4:1 to 13:1, such as between 5:1 to 10:1, between 5:1 to 9:1, between 6:1 to 8:1, between 4:1 to 7:1, or between 6:1 to 7:1. For example, the catalyst-to-oil ratio may be 4:1, such as 5:1, 6:1, 7:1, 8:1, 9:1, 10:1, 11:1, 12:1, 13:1, 14:1, or 15:1.

In certain embodiments, prior to the introduction of the renewable fuel oil (RFO) feedstock into a refinery for co-processing with a petroleum fraction feedstock, the renewable fuel oil (RFO) feedstock may be blended with vegetable-based oils, alcohols, or other cellulosic-derived materials, as a means to condition the renewable fuel oil (RFO) feedstock prior to processing. In certain embodiments, the renewable fuel oil (RFO) feedstock may be blended with vegetable-based oils, alcohols, or other cellulosic-derived materials if the water content of the renewable fuel oil (RFO) feedstock may be less than 20 wt. %, such as less than 15 wt. %, 10 wt. %, or less than 5 wt. %. For example, a renewable fuel oil (RFO) feedstock having a water content less than 20 wt. % or less than 15 wt. %, may be blended with one or more alcohols, such as methanol, ethanol, propanol, isopropyl alcohol, glycerol, or butanol, prior to introduction into the refinery.

According to one embodiment the blends of renewable oils with alcohols, or vegetable based oils can also be mixed or blended with petroleum materials with or without a surfactant prior to injection into the refinery systems including the FCC.

According to one embodiment recycle products from the downstream, or other unit operation in the refinery can be a source of blend material with the renewable oil prior to injection into the refinery system or FCC.

According to one embodiment the renewable oil or renewable fuel may be emulsified with a petroleum fraction based fuel then introduced into the refinery process. The emulsification may be mechanically achieved or achieved through the use of an appropriate chemical emulsification media.

According to one embodiment, the present system includes processing of biomass or renewable feedstock into any pyrolysis system. Exemplary reactor systems for injecting the conditioned renewable feedstock into include, but are not limited to, entrained down-flow, ablative reactors, transport bed, fluid bed, screw or auger systems, and rotating cone. Characteristics of a fast pyrolysis reactor for maximal oil production are the very rapid heating of the conditioned renewable feedstock, and rapid quenching of the produced vapors. A more detailed discussion of fast pyrolysis may be found in the Background section of this document.

FIG. 5 illustrates an exemplary upgraded feed injection system for use with the present system, according to one embodiment. Feed nozzles that are modified for the properties of conditioned renewable fuel feedstock 101, and nozzles can be converted to stainless steel, or other appropriate metallurgy, if they are not already and adjusted to inject renewable oil to provide an upgrade to existing systems.

According to one embodiment, conditioned renewable fuel oil may be utilized in FCC units that presently utilize a catalyst known as ZSM-5. ZSM-5 may be shown to be a favorable catalyst for the conversion of biomass to hydrocarbons.

FIG. 6 illustrates an exemplary FCC unit with dual risers, according to one embodiment. A dual riser system may comprise a least one input element for introducing a petroleum fraction and at least one element for introducing a renewable fuel oil such that they can contact the catalyst and be co-processed. Another embodiment may include a dual riser system that may be retro-fitted to provide at least one element for introducing a renewable fuel oil such that they can contact the catalyst and be co-processed. Feedstock 101 including renewable fuel oil may be fed into a second riser of a two riser FCC (as shown in FIG. 6).

Contact time of the catalyst with the feedstock may comprise the residence time in the riser and the residence time in the riser termination system. For example, in some embodiments the riser residence times may be about 2 to 3 seconds with the residence time in termination system may be an additional 1 to 2 seconds. This may lead to an overall catalyst contact time of about 3 to 5 seconds. For example, the feedstock may interact with the catalyst for greater than 2 second, for example greater than 3 seconds, greater than 4 seconds such as 3 to 7 seconds or 2 to 4 seconds or 3 to 5 seconds.

In another embodiment, a method and system for introducing renewable fuel or renewable fuel oil into a refinery FCC unit that may be simultaneously processing a petroleum fraction, with the contact time of the FCC catalyst being for a period of greater than 3 seconds, for example 3 to 7 seconds or 3 to 5 seconds.

According to one embodiment, the addition rate RFO in a refinery FCC that may be processing a petroleum fraction may be in an amount of less than 10% by weight, relative to the total weight of the petroleum fraction and RFO, (e.g., in a range between 0.05% by weight and 10% by weight) of a thermally produced renewable oil with the contact time of the FCC catalyst and renewable oil for a period of greater than 3 seconds.

In certain embodiments FCC units may use steam to lift the catalyst as well provide dilution media for residence time control. The lift steam can enter the FCC reactor riser from the bottom of the unit and/or through nozzles on the side of the reactor. These nozzles may be located below, above or co-located with the feedstock (either the RFO feed, GO feed or both RFO and GO feed) injection point.

In certain embodiments, it may be useful, because of the properties of renewable fuel oil, to employ a delivery system separate from the petroleum feedstock feed port (or assembly) for introducing the RFO material into an FCC unit. The separate delivery system may include transfer from storage, preheat and deliver the renewable oil to an appropriate injection point on the FCC. To ensure contact between the renewable oil and the hydrocarbon feedstock the point of introduction may be near to the petroleum feedstock injection nozzles which are typically located in the lower third of the FCC riser.

According to one embodiment, renewable oil may be introduced into the lift steam line at proximate the bottom of the FCC reactor riser, for example below the mid-point of the riser. In an alternative embodiment, the renewable oil may be introduced into the velocity steam line that could be located either upstream or downstream of the hydrocarbon injection point. According to a further embodiment, renewable oil may be introduced through an atomizing nozzle that may be inserted into the one or multiple steam lines or may be introduced into the recycle lift vapor line or lines.

According to one embodiment, the addition rate of renewable oil may be controlled by a separate delivery system (i.e., separate from the hydrocarbon delivery system) into the lower third of the FCC reactor riser. According to an alternative embodiment, the addition rate of renewable oil may be controlled by a separate delivery system into one or multiple lift steam lines. In a further embodiment, the addition rate of renewable oil may be controlled by a separate delivery system into an available port in the lower third of the FCC reactor riser. In another alternative embodiment, the addition rate of renewable oil may be controlled by a separate delivery system and introduced into one of the hydrocarbon nozzles or injectors either separately or with hydrocarbon.

In certain embodiments, the method may comprise: producing a renewable oil based feedstock; introducing the renewable oil based feedstock into a refinery system, wherein the refinery system conversion unit may be selected from a group consisting of a fluid catalytic cracker, a coker, a field upgrader system, a lube oil refinery facility, a hydrocracker, and a hydrotreating unit; and co-processing the renewable oil based feedstock with a petroleum fraction feedstock. For example, the method may comprise (i) producing the renewable oil based feedstock, which comprises rapid thermal conversion of biomass, and (ii) conditioning the renewable oil based feedstock to enable introduction into the refinery system. In such instances, the conditioning of the renewable oil based feedstock may comprise controlling an ash content to be in a range of between 0.005 wt. % and 0.5 wt. %; controlling a pH to be in a range of between 2.0 and 8.0, such as 2.0 and 6.0; and controlling a water content to be in a range between 0.05 wt. % and 30 wt. %. In certain embodiments, the petroleum fraction feedstock employed in the method may be a VGO. In certain embodiments, the method may include injecting the renewable oil feedstock into a catalytic riser of a fluid catalytic cracking unit. For example, the renewable oil feedstock may be injected upstream of a VGO inlet port of a fluid catalytic cracking unit, the renewable oil feedstock may be injected downstream of a VGO inlet port of a fluid catalytic cracking unit, the renewable oil feedstock may be injected into a riser quench line of a fluid catalytic cracking unit, or the renewable oil feedstock may be injected into a second riser of a two riser fluid catalytic cracking unit. In certain embodiments, the system may comprise: a production facility for producing a renewable oil based feedstock; and a refinery system, wherein the refinery system may be selected from a conversion unit consisting of a fluid catalytic cracker, a coker, a field upgrader system, a lube oil refinery facility, a hydrocracker, and a hydrotreating unit, wherein the renewable oil based feedstock may be introduced into the refinery system, and the renewable oil based feedstock may be co-processed with a petroleum fraction feedstock in the refinery system.

EXAMPLES

Testing has been conducted using different equipment, various petroleum based feedstocks, and an FCC catalyst with various quantities of a renewable fuel liquid. The majority of the experiments involved the processing of a renewable fuel oil with a typical commercially-produced gas oil in an Advanced Cracking Evaluation (ACE) FCC unit. In addition, testing has been conducted in a fluid-bed Microactivity Test reactor (MAT) unit with a commercial equilibrium catalyst.

Example 1

Testing Equipment

The co-processing of petroleum fraction feedstock with varying amounts of renewable fuel oil (RFO) (or the processing of the petroleum fraction feedstock alone as a comparator), were conducted in a Model R+ Kayser Technology Advanced Cracking Evaluation (ACE) FCC unit (herein referred to as "ACE testing unit" or "FCC unit"), using an FCC catalyst.

The ACE testing unit had hardware and software that enabled multiple runs to be accurately performed without operator intervention. The reactor consisted of a 1.6 cm ID stainless steel tube with a tapered conical bottom. A diluent (nitrogen), flowing from the bottom, fluidized the catalyst and also served as the stripping gas at the end of a catalytic run. The feedstock that was introduced in to the ACE testing unit to be cracked was fed from the top via an injector tube with its outlet tip near the bottom of the fluid bed. An injector position of approximately 2.86 cm, measured from the bottom of the reactor, was used.

The ACE testing unit used a cyclic operation of a single reactor (containing a batch of fluidized catalyst particles) to simulate each of the sections of a commercial FCC unit: (a) riser reactor—injection of feed over the catalyst; (b) catalyst stripper—catalyst stripping for a specified duration; (c) regeneration—catalyst regeneration with air at elevated temperatures.

The reactor remained in the furnace during catalyst addition and withdrawal. Each test run was performed under atmospheric pressure conditions, and a reactor temperature of 510° C. (950° F.). A constant load of 9 g of equilibrium catalyst and the Variable Time on Stream method of varying feed injection time at a constant injection rate of 1.2 g/min were used to obtain the desired catalyst-to-oil ratios. The fluidized bed regeneration temperature was maintained at 712° C. (1313° F.).

Feedstock or Feedstock Combinations:

The renewable fuel oil (RFO) feedstock utilized in the Examples below was produced from rapid thermal processing of a wood residue feedstock in a commercial fast pyrolysis process, according to any one of U.S. Pat. No. 7,905,990, U.S. Pat. No. 5,961,786, and U.S. Pat. No. 5,792,340, each of which is herein incorporated by reference in their entirety. The properties of the renewable fuel oil (RFO) feedstock are summarized in Table 1.

TABLE 1

| Parameter | Test Method | RFO |
|---|---|---|
| Water Content, wt. % | ASTM E203 | 26.98% |
| Viscosity @ 40° C., cSt | ASTM D445 | 58.9 |
| Viscosity @ 60° C., cSt | | |
| Ash Content, wt. % | EN 055 | 0.02% |
| Solids Content, wt. % | ASTM D7579 | 0.04% |
| Density @ 20° C., kg/dm$^3$ | EN 064 | 1.1987 |
| pH | ASTM E70-07 | 2.44 |
| Carbon Content, wt. % as is | ASTM D5291 | 41.80% |
| Hydrogen Content, wt. % as is | ASTM D5291 | 7.75% |
| Nitrogen Content, wt. % as is | ASTM D5291 | 0.28% |
| Sulfur Content, wt. % as is | ASTM D5453 | 0.01% |
| Oxygen Content, wt. % as is | By Difference | 50.14% |
| HHV (as is), cal/g | ASTM D240 | 4093.8 |
| HHV (as is), MJ/kg | ASTM D240 | 17.1 |
| HHV (as is), BTU/lb | ASTM D240 | 7369 |

Separate, independent testings were conducted in an ACE testing unit that processed, or co-processed, the following feedstock or feedstock combinations (by feeding or co-feeding):

(1) 100 wt. % non-hydrotreated vacuum gas oil (VGO) feedstock, as a petroleum fraction feedstock (herein referred to as "VGO feedstock");
(2) 98 wt. % VGO feedstock and 2 wt. % renewable fuel oil (RFO) feedstock;
(3) 95 wt. % VGO feedstock and 5 wt. % renewable fuel oil (RFO) feedstock; and
(4) 90 wt. % VGO feedstock and 10 wt. % renewable fuel oil (RFO) feedstock.

Each of these feedstock or feedstock combinations were processed or co-processed in the ACE testing unit at a constant cracking temperature of 510° C. (950° F.).

Catalyst-to-Oil Ratios:

For each feedstock or feedstock combination, several runs were conducted, independently employing different catalyst-to-oil ratios ("cat./oil ratios"): ranging from 4:1 to 11.25:1, specifically 4:1, 6:1, 8:1, 10:1, and 11.25:1.

Analysis:

Each of the liquid samples that were formed from the processing or co-processing of the feedstock or feedstock combinations in the ACE testing unit were collected and sent for analysis. Gas chromatographic analysis was conducted on the dry gas product. Coke content was determined by analyzing for the quantity of carbon dioxide produced from the regeneration step of the testing procedure. The ACE testing results for each run included conversion and yields of dry gas, liquefied petroleum gas (LPG, the $C_3$-$C_4$), gasoline ($C_5$-221° C.), light cycle oil (LCO, 221-343° C.), heavy cycle oil (HCO, 343° C.+), and coke. The conversion of the feedstock or feedstock combination was determined by calculating the difference between the amount of feedstock or feedstock combination and the amount of unconverted material defined as liquid product boiling above 221° C.

It may be known that the quality of the feedstock charged into an FCC unit can be the single greatest factor affecting product yields and quality. In the ACE tests, the same VGO feedstock material was used throughout the study. Therefore, the results disclosed herein can be used in relative terms, but may not necessarily represent absolute yields that would be achieved using other alternative FCC feedstocks. The results disclosed herein are, however, very indicative, particularly in showing yield and conversion trends relative to the VGO control test data.

Normalization or Equivalence of Feedstock and Feedstock Combinations:

The conversion and yield curves, expressed on an equivalent energy input or equivalent carbon input basis, demonstrate an unexpected effect resulting from the combination varying amounts of the renewable fuel oil (RFO) feedstock with the VGO feedstock in a FCC-type unit (the ACE testing unit). The renewable fuel oil (RFO) feedstock has about one half of the carbon and energy content of the VGO feedstock (for an equivalent mass). For example, when comparing the results from the feedstock combination of 98 wt. % VGO feedstock and 2 wt. % renewable fuel oil (RFO) feedstock against those of the 100 wt. % VGO feedstock, 2 wt. % of the renewable fuel oil (RFO) feedstock may be substituted in place of 2 wt. % of VGO feedstock, which means approximately 1% less carbon and 1% less energy are available in the FCC unit for subsequent conversion to the desired products. If the renewable fuel oil (RFO) feedstock carbon and energy were converted to gasoline in the same proportions as the VGO feedstock carbon and energy, then one would expect the gasoline yield to drop by 1%, in the case of the 2 wt. % renewable fuel oil (RFO) feedstock combination and when equal amounts of total mass or volume are fed into the FCC unit. However, the gasoline yield dropped by less than 1% in this case, a phenomenon that was observed for all substitution levels (i.e., the 2 wt. %, 5 wt. %, and the 10 wt. % renewable fuel oil (RFO) feedstock combinations). Therefore, if the input may be expressed on an equivalent amount of carbon or energy into the FCC unit (i.e., keeping the carbon input or energy input constant regardless of whether neat VGO feedstock or combinations of VGO feedstock with renewable fuel oil (RFO) feedstock (blends) are fed, there may be a measurable increase in gasoline yield when renewable fuel oil (RFO) feedstock may be combined or blended in with the VGO feedstock. It may be important to note that when yields are expressed on a constant carbon or energy input into the FCC unit, implicit in this assumption may be that the total mass or volume input into the FCC would increase with the substitution of the renewable fuel oil (RFO) feedstock. In the case of the 2 wt. % renewable fuel oil (RFO) feedstock combination (blend), about 1% additional mass input to the FCC unit would be required to achieve the same carbon or energy input as 100% VGO feed. In terms of volume addition, when accounting for the density differences between VGO and RFO, less than 1% additional volume of a 2 wt. % renewable fuel oil (RFO) feedstock combination (blend) to the FCC unit would result to achieve the same carbon or energy input into the FCC unit as neat VGO feedstock.

The conversion and yield curves disclosed herein were generated using the mass yield experimental data that was generated from the ACE testing unit, coupled with the energy and carbon contents of the input feedstocks. In the case of energy-equivalent input basis, the mass yields were divided by the feedstock energy input, which may be a function of the proportion of the renewable fuel oil (RFO) feedstock addition, using barrel of oil equivalent (BOE) as the energy units (i.e., 5.8 million BTU). The gasoline yield may be presented both on the basis of energy input equivalence and carbon input equivalence. Carbon equivalence may be effectively the same as an energy-input basis, and may be calculated from the generated mass data in a similar manner, but may be generally a more clear and understandable expression than equivalent energy basis.

The Figures discussed in this section highlight the conversion of neat VGO feedstock and renewable fuel oil (RFO) feedstock combinations or blends (2 wt. %, 5 wt. %, and 10 wt. %), as well as the respective yields of gasoline, LPG, dry gas, light cycle oil (LCO), heavy cycle oil (HCO) and coke, as a function of the Catalyst-to-Oil ratio (cat./oil ratio) in the ACE testing unit. The effects of combining or blending the varying amounts of the renewable fuel oil (RFO) feedstock with the VGO feedstock on the gasoline octane numbers (both research-grade octane and motor-grade octane numbers) are also disclosed herein.

Effect of RFO Blends on Conversion.

For the purposes of this example, the feedstock conversion, shown in FIGS. 7 and 8, is the input mass of VGO or RFO/VGO blend minus the mass yields of both Light Cycle Oil (LCO) and Heavy Cycle Oil (HCO). ACE conversion data was generated with the FCC reaction temperature, the catalyst weight, and the catalyst contact time all fixed for a given VGO or RFO blend feedstock, and the only variable was the catalyst:oil ratio.

FIG. 7 illustrates the general increase in conversion of all of the feeds at greater catalyst:oil ratios, on a mass basis. For the purposes of this example, in all cases, with the addition of RFO to the VGO feedstock, there was a shift in the curves resulting in an increase mass conversion. In other words, less LCO and HCO are produced as the amount of RFO in the VGO blend may be increased. At a catalyst:oil ratio of 8:1 there may be an increase of conversion relative to the VGO conversion from approximately 0.7 to 1.4% as the RFO blend in VGO goes from 2 to 10 wt. %. As indicated previously, since the energy content of the RFO may be about half that of the VGO another way to represent the conversion may be on energy input equivalency basis. In FIG. 8 the conversion of the VGO/RFO feedstock was found to dramatically increase as the substitution rate of RFO was increased.

Effect of RFO Blends on Gasoline Yields.

The primary purpose of FCC operations may be to produce optimal gasoline yields, and for the purposes of this study, the gasoline fraction may be defined as the $C_5$-221° C. boiling point. FIG. 9 depicts the gasoline yield as a function of catalyst:oil ratio for the various feeds. The yields of gasoline were found to initially increase as the catalyst:oil ratio increased, up to a maximum at a catalyst:oil ratio of about 7:1 to 8:1. Further increases in the catalyst:oil ratio resulted in a decrease in gasoline yield which may be attributed to overcracking under the set reactor conditions.

With respect to the gasoline yield for the various blends of RFO in this study, there was a significant increase in net gasoline production when an equivalent amount of VGO and RFO/VGO, in terms of input energy, may be processed in the FCC. In general, as the blend of RFO in the VGO feed may be increased, from 2 wt. % to 10 wt. %, there may be a measurable and consistent increase in gasoline yield. In addition, for this example, it appears that the maximum gasoline yield occurs at a slightly lower catalyst:oil ratio (at approximately 7:1) as compared to the reference VGO feed (approximately 8:1).

The gasoline yield can also be represented in terms of the amount of carbon in the feedstock that may be converted to gasoline. Similar to the energy content basis, RFO has a lower carbon content than VGO. Therefore, in this example, less carbon may be delivered to the FCC unit (and less carbon may be made available for conversion to gasoline) as the RFO proportion may be increased. The synergistic effect of RFO co-processing can be readily illustrated if the gasoline yields are based on the amount of input carbon that may be converted to gasoline.

More specifically, as was the case with energy content, in this experiment the RFO has approximately one half of the carbon content of VGO. The reference VGO has a carbon content of approximately 87 wt. %, while the carbon contents of the 2 wt. %, 5 wt. % and 10 wt. % RFO blends are 86.1%, 84.7% and 82.5%, respectively. The gasoline yields, expressed on an equivalent carbon input basis, are presented in FIG. 10 as a function of catalyst:oil ratio in the ACE testing unit. In this example, there may be a significant and consistent increase in the gasoline yield as the substitution of RFO may be increased from 2 wt. % to 10 wt. %. These yields suggest that more carbon in the VGO may be going to gasoline production then would otherwise be the case, without the addition of the RFO in the blend. RFO may be synergistically affecting either the cracking chemistry or catalyst activity in favor of the gasoline product.

Effect of RFO Blends on Liquid Petroleum Gas (LPG) Yield.

In FCC operation, LPG (defined as $C_3+C_4$ hydrocarbons) may be considered a valuable product since it consists of components that can be used as alkylation and petrochemical feedstocks. In this example, an increase in the RFO blends in VGO results in an increase in LPG yields (on a constant input energy basis), and this effect shown in FIG. 11. This trend also holds on the basis of constant carbon input to the FCC, suggesting that RFO addition preferentially causes higher carbon conversion to LPG.

Effect of RFO Blends on Dry Gas Yield.

In this example, the dry gas may be defined as the total of $H_2$, $H_2S$, carbon oxides, and $C_1$-$C_2$ hydrocarbons. Good operation of the FCC may keep these products to a minimum as excessive dry gas production may cause downstream plant operation limitations with respect to gas compression. The effects on dry gas yields are shown in FIG. 12 and, as expected, the dry gas yield increases as the catalyst:oil ratio increases. On an equivalent energy input basis (i.e., the RFO/VGO blend test having a similar energy input as the reference VGO energy input), there was an increase in dry gas make as the addition rate of RFO increased. In this example, the predominant dry gas components for all cases were ethylene, methane and ethane.

Effect of RFO Blends on Light Cycle Oil (LCO) Yield.

In this example, the Light Cycle Oil (LCO) may be defined as those liquids that boil between 221-343° C., and the value of this product may be dependent on the location and purpose of the refinery. Typically, in North America LCO may be not considered to be as desirable. However, where and when gasoline may be not in high demand, the FCC unit may be used as a source of middle distillate LCO that can be upgraded to diesel and No. 2 fuel oil. In this example, the effect of RFO blends on the production of LCO on an equivalent input energy basis (FIG. 13) was found to be relatively neutral at a level of 2 wt. % RFO addition, while at 5 wt. % and 10 wt. % RFO addition, there was a measurable increase in the production of LCO, expressed on an equivalent energy input (or carbon input) basis.

Effect of RFO Blends on Heavy Cycle Oil (HCO) Yields.

In this example, the Heavy Cycle Oil (HCO) may be defined as those liquids that distil between 343° C. and 525° C. This material may be generally considered by refineries to be relatively undesirable; an unconverted product with comparatively high aromatics and potentially high sulfur content. If possible, HCO production from VGO in an FCC unit should be minimized. In this example, as FIG. 14 shows, the HCO production rate may be not significantly affected by the addition of 2 wt. % or 5 wt. % RFO (by mass) in the VGO feedstock, while at 10 wt. % RFO substitution, an increase in the production of HCO may be clearly apparent, on an equivalent energy input basis.

Effect of RFO Blends on Coke Yields.

In FCC operation, coke may be generally utilized to supply the necessary process heat to drive the reactions. However, an increasing amount of coke production may eventually upset the heat balance of the FCC unit, resulting in higher temperatures in the catalyst regenerator. The effect of RFO blends on coke production in this example may be shown in FIG. 15.

FIG. 15 illustrates that coke yield in this example may be not dramatically effected at the lower blends of RFO (i.e., 2 wt. % and 5 wt. % by mass), while the blend of 10 wt. % RFO results in a measurable increase in the coke production.

Effect of RFO Blends on Gasoline Yields on a 10,000 bbl/day Input Basis.

The primary purpose of FCC operations may be to typically produce optimal gasoline yields, and for the purposes of this study, the gasoline fraction may be defined as the $C_5$-221° C. boiling point. FIG. 16 depicts the gasoline yield as a function of catalyst:oil ratio for the various feeds using a consistent 10,000 bbl/day input of the various feedstock blends on an RFO water free basis. Despite the fact that the amount of energy and carbon in the 10,000 bbl/day feed input of the RFO/VGO blends was less than the reference VGO, the yields of gasoline in this example were found to be unexpectedly higher than the reference VGO feedstock case. In particular, in this example there was a dramatic improvement in gasoline yield at the higher levels of RFO substitution.

Estimate of the Gallons of Gasoline Produced Per Ton of RFO.

Using the gallons of gasoline produced per ton of the reference VGO and comparing to the gallons of gasoline produced per ton of RFO/VGO blend an estimate of the contribution of gallons of gasoline produced per ton of RFO was made. FIG. 17 illustrates the gallons of gasoline per ton of RFO as a function of the level of RFO substitution. In this example, as the level of substitution went from 2 wt. % to 10 wt. % the gallons of gasoline produced per ton of RFO increased. Translating back to the original biomass the yield of gasoline per ton of biomass was in excess of 90 gals/ton of biomass at the higher RFO levels of substitution.

Volume of Feed Input for an Energy Equivalent RFO/VGO Blend.

Refineries typically operate on a volume basis when handling, transferring, feeding and processing petroleum liquids. Accordingly, to make a fair and equitable comparison when studying the effect of RFO addition to VGO on gasoline yields, it may be important to measure the yields on either an energy-equivalent or carbon-equivalent input basis (i.e., what are the respective gasoline yields from VGO and RFO blends from the identical amounts of input carbon or input energy). In addition, since the RFO in this example contains roughly half the carbon and energy content of VGO, in this example a small amount of additional total feedstock volume had to be delivered to the FCC, as RFO may be blended into the VGO, in order to maintain an equivalent amount of input carbon or energy.

In regards to how much additional volume of RFO/VGO blends, in this example, had to be added to maintain constant carbon or energy input to the FCC unit, is illustrated in FIG. 18. In this example, a surprisingly small amount of additional volume of RFO/VGO blend was only needed to be added to compensate. This volume may be minimal, in this example, as the RFO may be much denser than VGO, so additional mass of VGO may be added with a proportionately less impact on total volume increase.

FIG. 18 indicates that, in this example, a 2 wt. % blend of RFO in VGO only required a 0.8% increase in volume to deliver the same energy or carbon to the FCC as neat (100%) VGO. In other words, for every 100 barrels of neat VGO, 100.8 barrels of 2 wt. % RFO blend would be required to deliver equivalent amounts of energy or carbon to the FCC unit. What is unexpected in this example, is that the gasoline yield increases much more than 0.8% over the typical range of FCC operating conditions that were tested in the ACE testing unit.

In this example, the 5 wt. % RFO blend in VGO, an addition of only 2% volume would preserve the same energy or carbon input as neat VGO. For every 100 barrels of neat VGO, 102 barrels of 5 wt. % RFO blend would be delivered to the FCC in order to maintain equivalent energy or carbon input. Once again, the gasoline yield is much greater than 2% over the range of ACE tests.

Example 2

Testing Equipment: The co-processing of renewable fuel oil (RFO) with petroleum fraction feedstock (or the processing of the petroleum fraction feedstock alone as a comparator), was conducted in a fluid-bed Microactivity Test reactor (MAT) unit (herein referred to as "MAT testing unit"), using a commercially available equilibrium catalyst.

A biomass-derived liquid having properties similar to that shown in Table 1 was obtained from a commercial rapid thermal conversion plant where residual wood was thermally cracked at mild temperature in a short duration (typically less than 5 seconds) with about 70 to 80 wt. % liquid yield. A heavy gas oil (HGO) and a 5 wt. % RFO blend were cracked in a MAT testing unit at 510° C. (950° F.) with a constant oil injection time of 30 s using similar equilibrium catalyst as the case of Example 1.

In this example, dry gas is composed of $H_2$, $H_2S$, CO, $CO_2$, and $C_1$-$C_2$ hydrocarbons. The dry gas yield increased exponentially with conversion. At a given conversion in this example, the two feeds gave almost identical dry gas yields. Only $CO_2$ but not CO was detected during cracking of the two feeds with 0.02-0.08 wt. % $CO_2$ yield higher for the blend at 65-75 wt. % conversion indicating the decomposition or combustion of the oxygenates in the blend. However, the blend produced less $H_2$ by 0.06 wt. % throughout the entire conversion in this study possibly due to water formation.

Generally, gasoline ($C_5$-221° C. boiling point) is the major and the most desirable product in FCC operation. In this example, it was found that at a given conversion, the blend lowered the gasoline yield by less than 1 wt. % until the conversion was higher than 70 wt. %. Note that the blend itself contained 1.33 (calculated from RFO analysis) to 1.90 wt. % (Table 1) $H_2O$ which could partially explain the drop in gasoline. Overcracking was observed for this particular blend at 75-80 wt. % conversion.

The gasoline yield may also be expressed in terms of volumetric flow per hour (FIG. 19). In this example, unexpectedly, the yield of gasoline was shown to be greater for the RFO/HFO blend as compared to the yield of gasoline from the processing of the reference HFO over a catalyst:oil ratio of 4 to 9:1 (i.e., the usual operating range for a FCC unit).

Coke.

In FCC operation, coke is generally necessary to supply heat for feed preheating and cracking. However, too much coke can seriously poison the catalyst and overload the air blower during catalyst regeneration, causing excessively high temperatures in the regenerator. During the testing it was found that, similar to the dry gas, both feeds gave almost identical coke yield at a given conversion although the blend had 0.27 wt. % higher Conradson Carbon Residue.

Oxygen.

For the purposes of this example, the oxygen distribution in the gaseous and liquid products also is of note. For instance, after cracking, most of the oxygen in the blend in this example appeared as $H_2O$ (74.6-94.1 wt. %), with the rest forming $CO_2$ (0.7-5.3 wt. %). The liquid products were analyzed for oxygen content and found to be below the detection limit (0.25 wt. %).

For the purposes of this example, it was generally observed that: (1) catalytic cracking of the blend containing 5 wt. % RFO resulted in the formation of water and carbon dioxide; (2) at a given severity and compared with the base oil, the blend gave 1-3 wt. % higher conversion which increased with catalyst:oil ratio; (3) at a given conversion, the blend gave lower yields of LPG and gasoline than the base oil, while other yields, including those of dry gas, light cycle oil (diesel), heavy cycle oil (heavy fuel oil), and coke, were almost the same for the two feeds, but among the dry gas components, higher $CO_2$ but lower $H_2$ yields were observed for the blend; (4) an examination of the gasoline yield in terms of refinery flows (i.e., volumetric yield based on a set volume of feed—example 10,000 bbl/day) indicated that the yield of gasoline was greater for the RFO blend than the reference HFO over lower catalyst:oil ratios, and that on a water-free RFO basis the yields of gasoline and other valuable components were found to be greater than the reference HFO; (5) after cracking, most of the oxygen in the blend appeared as $H_2O$ with the rest in the form of $CO_2$, and that the liquid products were analyzed for oxygen content and found to be below the detection limit; and (6) when yields of an RFO blend and HGO are compared on the basis of equivalent energy input to the MAT system, gasoline and LPG yields from the RFO blend are higher than corresponding yields from 100% HGO.

Example 3

A series of samples of a vacuum gas oil (VGO) and a 5 wt. % renewable fuel oil (RFO) blend were cracked in the MAT testing unit (reactor bed, Fluid-2) under similar conditions as in Example 2. The VGO employed in Table 2, labeled FHR CAT Feed, had a density of 0.9196 g/mL at 15.6° C. The RFO itself had a density of 1.198 g/mL, and a water content of 26.58 (wt. %). The 5 wt. % RFO in VGO blend employed in Table 3, labeled 5 wt % RFO in FHR CF, had a density of 0.9243 g/mL at 15.6° C. In 100 lbs of the 5 wt. % RFO in VGO blend employed the water content was about 1.329 lbs. The analysis, characterization, and results for the VGO samples are presented in Tables 2, 3 (on an as fed basis), and Table 4 (refinery flows summary), while the analysis, characterization, and results for the 5 wt. % RFO in VGO blend are presented in Tables 5, 6 (on an as fed basis), Table 7 (on a water-free feed basis), Table 8 (refinery flows summary) and Table 9 is a calculation of gallons of gasoline attributed to the input of RFO.

TABLE 2

| Run Number | C-1 | C-2 | C-3 | C-4 | C-5 | C-6 |
|---|---|---|---|---|---|---|
| Feed | | | FHR CAT Feed | | | |
| Catalyst | | | Grace EC-2007 | | | |
| Coke Determination | In situ | In situ | In situ | In situ | In situ | In situ |
| Catalyst contact time (sec) | 30 | 30 | 30 | 30 | 30 | 30 |
| Catalyst Charge (g) | 8.9321 | 8.9321 | 8.9321 | 8.9321 | 8.9321 | 8.9321 |
| Feed Charge (g) | 1.8471 | 1.5069 | 1.0551 | 0.9328 | 0.7410 | 0.7292 |
| Catalyst/Oil ratio (g/g) | 4.836 | 5.927 | 8.466 | 9.576 | 12.054 | 12.249 |
| WHSV (g/h/g) | 24.82 | 20.24 | 14.17 | 12.53 | 9.96 | 9.80 |
| Liquid yield (incl. H2O) (wt. %) | 73.29 | 73.14 | 64.01 | 62.01 | 60.00 | 58.76 |
| IBP/221° C. per Sim Dist (wt. %) | 45.3667 | 49.8000 | 54.5676 | 57.7297 | 58.6757 | 58.4865 |
| IBP/343° C. per Sim Dist (wt. %) | 76.0000 | 79.8889 | 83.6486 | 85.9737 | 86.1923 | 86.2121 |
| Normalized Mass Balance (wt. % of feed) | | | | | | |
| H2 | 0.14 | 0.16 | 0.22 | 0.24 | 0.24 | 0.26 |
| H2S | 0.00 | 0.00 | 0.00 | 0.00 | 0.00 | 0.00 |
| CO | 0.00 | 0.00 | 0.00 | 0.00 | 0.00 | 0.00 |

TABLE 2-continued

| Run Number | C-1 | C-2 | C-3 | C-4 | C-5 | C-6 |
|---|---|---|---|---|---|---|
| CO2 | 0.15 | 0.15 | 0.28 | 0.30 | 0.33 | 0.39 |
| C1 | 0.33 | 0.36 | 0.58 | 0.74 | 0.66 | 0.77 |
| C2 | 0.23 | 0.25 | 0.38 | 0.45 | 0.40 | 0.46 |
| C2= | 0.35 | 0.40 | 0.57 | 0.58 | 0.66 | 0.65 |
| Total Dry Gas | 1.20 | 1.33 | 2.04 | 2.31 | 2.28 | 2.53 |
| C3 | 0.75 | 0.63 | 0.92 | 1.06 | 0.99 | 1.48 |
| C3= | 2.69 | 2.90 | 3.72 | 3.69 | 4.02 | 3.91 |
| i-C4 | 3.11 | 3.34 | 4.16 | 4.26 | 4.76 | 4.62 |
| n-C4 | 0.68 | 0.73 | 0.96 | 1.01 | 1.04 | 1.09 |
| i-C4= | 0.78 | 0.86 | 1.06 | 1.01 | 1.01 | 1.04 |
| n-C4= | 2.65 | 2.87 | 3.53 | 3.37 | 3.48 | 3.34 |
| Total LPG | 10.65 | 11.33 | 14.34 | 14.41 | 15.31 | 15.48 |
| Gasoline (C5-221° C.) | 44.00 | 46.41 | 48.72 | 50.36 | 50.94 | 50.69 |
| LCO (221°-343° C.) | 22.94 | 22.19 | 18.91 | 17.70 | 16.65 | 16.44 |
| HCO (343° C.+) | 18.47 | 15.49 | 11.46 | 9.69 | 9.35 | 9.23 |
| Coke | 2.74 | 3.26 | 4.54 | 5.53 | 5.47 | 5.63 |
| H2O | 0.00 | 0.00 | 0.00 | 0.00 | 0.00 | 0.00 |
| Total | 100.0 | 100.0 | 100.0 | 100.0 | 100.0 | 100.0 |
| Conversion | 58.59 | 62.33 | 69.64 | 72.61 | 73.99 | 74.32 |

TABLE 3

| Run Number | C-1 | C-2 | C-3 | C-4 | C-5 | C-6 |
|---|---|---|---|---|---|---|
| Hydrocarbon Types in 200° C.-Gasoline (by New PIONA), wt. % | | | | | | |
| Total s-Naphthenes | 13.73 | 13.17 | 11.49 | 10.50 | 7.26 | 9.53 |
| Total s-i-Paraffins | 23.06 | 22.20 | 18.28 | 16.59 | 20.61 | 15.06 |
| Total s-n-Paraffins | 5.07 | 4.96 | 3.98 | 3.93 | 3.35 | 3.46 |
| Total us-Naphthenes | 6.69 | 6.69 | 5.84 | 5.60 | 4.60 | 4.72 |
| Total us-i-Paraffins | 8.43 | 8.72 | 8.00 | 7.48 | 7.16 | 6.72 |
| Total us-n-Paraffins | 2.29 | 2.44 | 2.32 | 2.10 | 1.85 | 1.72 |
| Total Aromatics | 40.72 | 41.81 | 50.09 | 53.80 | 55.16 | 58.78 |
| Total compounds | 100.00 | 100.00 | 100.00 | 100.00 | 100.00 | 100.00 |
| Gasoline Specific Gravity | 0.7837 | 0.7837 | 0.7930 | 0.7920 | 0.7956 | 0.8071 |
| Research Octane No. (RON) | 92.14 | 92.64 | 96.09 | 97.12 | 94.43 | 96.12 |
| Motor Octane No. (MON) | 83.57 | 83.59 | 85.14 | 85.14 | 80.03 | 84.19 |
| Benzene (C6-Aromatics) | 1.07 | 1.15 | 1.40 | 1.42 | 1.45 | 1.26 |
| Toluene (C7-Aromatics) | 4.92 | 5.23 | 6.84 | 6.77 | 7.25 | 7.52 |
| Xylenes + Ethylbenzene (C8-Aromatics) | 12.33 | 12.89 | 16.36 | 16.11 | 18.97 | 19.98 |
| C9-Aromatics | 20.42 | 20.85 | 23.95 | 23.58 | 26.31 | 28.57 |
| C10-Aromatics | 1.98 | 1.69 | 1.54 | 1.43 | 1.18 | 1.45 |
| TLP Organic Sulfur (mg/L) | 1236 | 1262 | 1331 | 1369 | 1386 | 1391 |
| Sulfur Distribution by bp (mg/L) | | | | | | |
| Gasoline | 23.1 | 23.80 | 26.10 | 37.80 | 48.50 | 38.60 |
| LCO | 483.7 | 518.20 | 611.60 | 643.80 | 672.20 | 670.90 |
| HCO | 729.3 | 719.40 | 693.60 | 687.10 | 665.30 | 681.70 |
| TLP Nitrogen (wppm) | 507 | 480 | 439 | 357 | | 387 |
| Nitrogen Distribution by bp (wppm) | | | | | | |
| Gasoline | 35.0 | 43.4 | 49.5 | 55.2 | | 40.7 |
| LCO | 163.9 | 168.8 | 175.2 | 142.1 | | 165.1 |
| HCO | 308.5 | 267.8 | 214.0 | 159.9 | | 180.6 |

TABLE 4

| Run Number | C-1 | C-2 | C-3 | C-4 | C-5 | C-6 |
|---|---|---|---|---|---|---|
| Dry Gas (lbs/hr) | 1415.0 | 1579.5 | 2357.9 | 2702.1 | 2623.1 | 2872.5 |
| C3 (bbls/hr) | 5.7 | 4.8 | 6.9 | 8.0 | 7.5 | 11.2 |
| C3 = (bbls/hr) | 19.7 | 21.3 | 27.3 | 27.1 | 29.6 | 28.7 |
| C4 (bbls/hr) | 25.5 | 27.3 | 34.4 | 35.5 | 39.0 | 38.4 |
| C4 = (bbls/hr) | 21.7 | 23.6 | 29.1 | 27.8 | 28.5 | 27.7 |
| C5-429 F Cut (bbls/hr) | 215.2 | 226.9 | 235.5 | 243.7 | 245.4 | 240.7 |
| 429-650 F Cut (bbls/hr) | 91.7 | 88.7 | 75.6 | 70.7 | 66.6 | 65.7 |

TABLE 4-continued

| Run Number | C-1 | C-2 | C-3 | C-4 | C-5 | C-6 |
|---|---|---|---|---|---|---|
| 650 F Cut (bbls/hr) | 64.8 | 54.3 | 40.2 | 34.0 | 32.8 | 32.4 |
| Coke (lbs/hr) | 3679.6 | 4376.5 | 6097.4 | 7429.4 | 7340.2 | 7551.3 |
| CO (lbs/hr) | 0 | 0 | 0 | 0 | 0 | 0 |
| CO2 (lbs/hr) | 198.0 | 206.0 | 375.2 | 401.2 | 436.7 | 528.5 |
| H2O (lbs/hr) | 0 | 0 | 0 | 0 | 0 | 0 |
| Dry Gas + CO + CO2 (lbs/hr) | 1613.0 | 1785.6 | 2733.0 | 3103.3 | 3059.8 | 3401.0 |
| Value/Cost | 1.022 | 1.046 | 1.055 | 1.059 | 1.060 | 1.045 |

TABLE 5

| Run Number | E-1 | E-2 | E-3 | E-4 | E-5 | E-6 | E-7 |
|---|---|---|---|---|---|---|---|
| Feed | 5 wt % RFO in FHR CF | | | | | | |
| Catalyst | Grace EC-2007 | | | | | | |
| Coke Determination | In situ | In situ | In situ | In situ | In situ | In situ | In situ |
| Catalyst contact time (sec) | 30 | 30 | 30 | 30 | 30 | 30 | 30 |
| Catalyst Charge (g) | 8.9321 | 8.9321 | 8.9321 | 8.9321 | 8.9321 | 8.9321 | 8.9321 |
| Feed Charge (g) | 2.0647 | 1.4407 | 1.1440 | 0.9075 | 0.8035 | 0.7163 | 0.6899 |
| Catalyst/Oil ratio (g/g) | 4.326 | 6.200 | 7.808 | 9.843 | 11.116 | 12.470 | 12.947 |
| WHSV (g/h/g) | 27.74 | 19.36 | 15.37 | 12.19 | 10.79 | 9.62 | 9.27 |
| Liquid yield (incl. H2O) (wt %) | 73.49 | 67.17 | 66.36 | 60.77 | 59.56 | 59.33 | 60.43 |
| IBP/221° C. per Sim Dist (wt %) | 46.0370 | 50.7273 | 54.7000 | 57.2333 | 57.0741 | 59.8649 | 59.5294 |
| IBP/343° C. per Sim Dist (wt %) | 77.1481 | 81.2593 | 83.5676 | 86.0769 | 85.7838 | 87.5161 | 86.5676 |
| Normalized Mass Balance (wt. % of feed) | | | | | | | |
| H2 | 0.09 | 0.13 | 0.15 | 0.17 | 0.19 | 0.25 | 0.21 |
| H2S | 0.00 | 0.00 | 0.00 | 0.00 | 0.00 | 0.00 | 0.00 |
| CO | 0.00 | 0.00 | 0.00 | 0.00 | 0.00 | 0.00 | 0.00 |
| CO2 | 0.29 | 0.24 | 0.29 | 0.41 | 0.46 | 0.42 | 0.45 |
| C1 | 0.29 | 0.41 | 0.48 | 0.60 | 0.80 | 0.92 | 0.81 |
| C2 | 0.23 | 0.31 | 0.34 | 0.41 | 0.50 | 0.55 | 0.49 |
| C2= | 0.39 | 0.53 | 0.59 | 0.66 | 0.71 | 0.68 | 0.74 |
| Total Dry Gas | 1.29 | 1.61 | 1.84 | 2.26 | 2.66 | 2.82 | 2.69 |
| C3 | 0.64 | 0.73 | 0.81 | 1.00 | 1.49 | 1.76 | 1,53 |
| C3= | 2.58 | 3.27 | 3.50 | 3.76 | 3.73 | 3.79 | 3.87 |
| i-C4 | 2.87 | 3.72 | 3.89 | 4.35 | 4.23 | 4.64 | 4.68 |
| n-C4 | 0.63 | 0.83 | 0.86 | 1.01 | 1.05 | 1.16 | 1.12 |
| i-C4= | 0.75 | 0.93 | 0.94 | 1.01 | 1.00 | 0.99 | 1.00 |
| n-C4= | 2.54 | 3.21 | 3.17 | 3.32 | 3.31 | 3.33 | 3.26 |
| Total LPG | 10.01 | 12.69 | 13.18 | 14.45 | 14.81 | 15.67 | 15.47 |
| Gasoline (C5-221° C.) | 43.97 | 46.61 | 48.56 | 49.48 | 48.76 | 49.05 | 48.64 |
| LCO (221°-343° C.) | 22.89 | 20.40 | 18.88 | 17.07 | 16.61 | 15.94 | 15.92 |
| HCO (343° C+) | 17.17 | 12.93 | 11.32 | 9.42 | 9.10 | 8.28 | 8.94 |
| Coke | 3.00 | 3.93 | 4.30 | 5.30 | 6.00 | 6.12 | 6.25 |
| H2O | 1.67 | 1.84 | 1.92 | 2.03 | 2.07 | 2.11 | 2.09 |
| Total | 100.0 | 100.0 | 100.0 | 100.0 | 100.0 | 100.0 | 100.0 |
| Conversion | 59.94 | 66.67 | 69.80 | 73.51 | 74.30 | 75.78 | 75.14 |

TABLE 6

| Run Number | E-1 | E-2 | E-3 | E-4 | E-5 | E-6 | E-7 |
|---|---|---|---|---|---|---|---|
| Hydrocarbon Types in 200° C.-Gasoline (by New PIONA), wt. % | | | | | | | |
| Total s-Naphthenes | 13.45 | 12.57 | 11.52 | 11.06 | 7.38 | 6.67 | 9.64 |
| Total s-i-Paraffins | 22.44 | 19.31 | 17.53 | 17.15 | 18.84 | 17.71 | 16.41 |
| Total s-n-Paraffins | 5.11 | 4.54 | 4.14 | 3.74 | 3.45 | 3.28 | 3.37 |
| Total us-Naphthenes | 6.86 | 6.23 | 5.92 | 5.34 | 5.17 | 4.02 | 4.63 |

TABLE 6-continued

| Run Number | E-1 | E-2 | E-3 | E-4 | E-5 | E-6 | E-7 |
|---|---|---|---|---|---|---|---|
| Total us-i-Paraffins | 9.09 | 8.16 | 8.00 | 7.10 | 6.79 | 7.09 | 7.71 |
| Total us-n-Paraffins | 2.40 | 2.24 | 2.47 | 1.95 | 2.00 | 1.57 | 2.14 |
| Total Aromatics | 40.65 | 46.95 | 50.41 | 53.66 | 56.37 | 59.67 | 56.12 |
| Total compounds | 100.00 | 100.00 | 100.00 | 100.00 | 100.00 | 100.00 | 100.00 |
| Gasoline Specific Gravity | 0.7828 | 0.7917 | 0.7834 | 0.7996 | 0.8011 | 0.8069 | 0.7992 |
| Research Octane No. (RON) | 92.09 | 93.31 | 94.84 | 96.50 | 93.54 | 94.71 | 99.93 |
| Motor Octane No. (MON) | 83.33 | 84.34 | 84.51 | 85.18 | 80.64 | 81.03 | 86.37 |
| Benzene (C6-Aromatics) | 1.12 | 1.15 | 1.32 | 1.39 | 1.47 | 1.34 | 1.55 |
| Toluene (C7-Aromatics) | 4.93 | 5.84 | 6.03 | 7.22 | 7.72 | 7.83 | 7.99 |
| Xylenes + Ethylbenzene (C8-Aromatics) | 12.21 | 14.70 | 14.89 | 18.25 | 18.70 | 20.29 | 19.12 |
| C9-Aromatics | 20.48 | 23.44 | 22.56 | 25.52 | 26.60 | 28.41 | 25.97 |
| C10-Aromatics | 1.91 | 1.83 | 1.62 | 1.28 | 1.88 | 1.79 | 1.48 |
| TLP Organic Sulfur (mg/L) | 1204 | 1229 | 1228 | | | 1335 | 1323 |
| Sulfur Distribution by bp (mg/L) | | | | | | | |
| Gasoline | 23.1 | 33.80 | 33.90 | | | 37.10 | 36.50 |
| LCO | 469.2 | 510.20 | 549.40 | | | 657.10 | 651.30 |
| HCO | 711.7 | 685.40 | 644.70 | | | 640.80 | 634.80 |
| TLP Nitrogen (wppm) | 525 | 502 | 451 | 407 | 381 | 378 | 410 |
| Nitrogen Distribution by bp (wppm) | | | | | | | |
| Gasoline | 35.7 | 57.2 | 33.1 | 30.4 | 51.8 | 46.2 | 33.4 |
| LCO | 169.7 | 175.6 | 161.7 | 168.4 | 152.8 | 161.4 | 175.8 |
| HCO | 319.8 | 269.5 | 256.0 | 208.5 | 176.8 | 170.4 | 200.5 |

TABLE 7

| Run Number | E-1 | E-2 | E-3 | E-4 | E-5 | E-6 | E-7 |
|---|---|---|---|---|---|---|---|
| Feed | \multicolumn{7}{l|}{5 wt % RFO in FHR CF} | | | | | | |
| Catalyst | | | Grace EC-2007 | | | | |
| Coke Determination | In situ | In situ | In situ | In situ | In situ | In situ | In situ |
| Catalyst contact time (sec) | 30 | 30 | 30 | 30 | 30 | 30 | 30 |
| Catalyst Charge (g) | 8.9321 | 8.9321 | 8.9321 | 8.9321 | 8.9321 | 8.9321 | 8.9321 |
| Feed Charge (g) | 2.0647 | 1.4407 | 1.1440 | 0.9075 | 0.8035 | 0.7163 | 0.6899 |
| Catalyst/Oil ratio (g/g) | 4.326 | 6.200 | 7.808 | 9.843 | 11.116 | 12.470 | 12.947 |
| WHSV (g/h/g) | 27.74 | 19.36 | 15.37 | 12.19 | 10.79 | 9.62 | 9.27 |
| Liquid yield (incl. H2O) (wt %) | 73.49 | 67.17 | 66.36 | 60.77 | 59.56 | 59.33 | 60.43 |
| IBP/221° C. per Sim Dist (wt %) | 46.0370 | 50.7273 | 54.7000 | 57.2333 | 57.0741 | 59.8649 | 59.5294 |
| IBP/343° C. per Sim Dist (wt %) | 77.1481 | 81.2593 | 83.5676 | 86.0769 | 85.7838 | 87.5161 | 86.5676 |
| Normalized Mass Balance (wt. % of feed) | | | | | | | |
| H2 | 0.09 | 0.13 | 0.)5 | 0.18 | 0.19 | 0.26 | 0.22 |
| H2S | 0.00 | 0.00 | 0.00 | 0.00 | 0.00 | 0.00 | 0.00 |
| CO | 0.00 | 0.00 | 0.00 | 0.00 | 0.00 | 0.00 | 0.00 |
| CO2 | 0.30 | 0.24 | 0.29 | 0.42 | 0.47 | 0.43 | 0.45 |
| C1 | 0.30 | 0.41 | 0.48 | 0.61 | 0.81 | 0.93 | 0.82 |
| C2 | 0.23 | 0.31 | 0.34 | 0.41 | 0.51 | 0.56 | 0.49 |
| C2= | 0.39 | 0.54 | 0.60 | 0.67 | 0.72 | 0.69 | 0.75 |
| Total Dry Gas | 1.31 | 1.64 | 1.87 | 2.29 | 2.69 | 2.86 | 2.73 |
| C3 | 0.65 | 0.74 | 0.82 | 1.01 | 1.51 | 1.79 | 1.55 |
| C3= | 2.62 | 3.32 | 3.55 | 3.81 | 3.78 | 3.85 | 3.92 |
| i-C4 | 2.91 | 3.77 | 3.94 | 4.41 | 4.29 | 4.70 | 4.75 |
| n-C4 | 0.64 | 0.84 | 0.87 | 1.02 | 1.07 | 1.18 | 1.13 |
| i-C4= | 0.76 | 0.94 | 0.96 | 1.03 | 1.01 | 1.00 | 1.02 |
| n-C4= | 2.57 | 3.25 | 3.21 | 3.36 | 3.35 | 3.38 | 3.30 |
| Total LPG | 10.15 | 12.86 | 13.36 | 14.64 | 15.01 | 15.89 | 15.67 |
| Gasoline (C5-221° C.) | 44.56 | 47.24 | 49.21 | 50.14 | 49.42 | 49.71 | 49.30 |
| LCO (221°-343° C.) | 23.20 | 20.67 | 19.13 | 17.30 | 16.83 | 16.15 | 16.14 |
| HCO (343° C.+) | 17.40 | 13.10 | 11.47 | 9.55 | 9.22 | 8.39 | 9.06 |
| Coke | 3.04 | 3.98 | 4.36 | 5.37 | 6.08 | 6.20 | 6.34 |
| Total | 99.7 | 99.5 | 99.4 | 99.3 | 99.3 | 99.2 | 99.2 |

TABLE 8

| Run Number | E-1 | E-2 | E-3 | E-4 | E-5 | E-6 | E-7 |
|---|---|---|---|---|---|---|---|
| Dry Gas (lbs/hr) | 1355.6 | 1867.8 | 2109.3 | 2511.4 | 2980.3 | 3265.7 | 3043.6 |
| C3 (bbls/hr) | 4.9 | 5.6 | 6.2 | 7.6 | 11.4 | 13.5 | 11.7 |
| C3 = (bbls/hr) | 19.2 | 24.3 | 26.0 | 27.9 | 27.7 | 28.2 | 28.8 |
| C4 (bbls/hr) | 23.8 | 30.9 | 32.3 | 36.4 | 36.0 | 39.4 | 39.5 |
| C4 = (bbls/hr) | 21.1 | 26.5 | 26.3 | 27.8 | 27.6 | 27.7 | 27.3 |
| C5-429 F Cut (bbls/hr) | 217.8 | 228.3 | 240.4 | 239.9 | 236.0 | 235.7 | 236.0 |
| 429-650 F Cut (bbls/hr) | 92.6 | 82.5 | 76.3 | 69.0 | 67.1 | 64.4 | 64.4 |
| 650 F Cut (bbls/hr) | 60.9 | 45.9 | 40.2 | 33.4 | 32.3 | 29.4 | 31.7 |
| Coke ((bs/hr) | 4072.9 | 5337.2 | 5841.3 | 7192.0 | 8144.4 | 8315.0 | 8494.0 |
| CO (lbs/hr) | 0 | 0.0 | 0.0 | 0.0 | 0.0 | 0.0 | 0.0 |
| CO2 (lbs/hr) | 399.3 | 325.0 | 392.4 | 560.5 | 630.3 | 571.2 | 608.5 |
| H2O (lbs/hr) | 2273.7 | 2493.5 | 2611.4 | 2756.1 | 2808.5 | 2867.5 | 2841.7 |
| | | | | | | | |
| Dry Gas + CO + CO2 (lbs/hr) | 1754.9 | 2192.8 | 2501.7 | 3071.9 | 3610.6 | 3837.0 | 3652.1 |
| Value/Cost | 1.023 | 1.043 | 1.059 | 1.045 | 1.031 | 1.028 | 1.029 |
| Water in Feed | 1798.8 | 1798.8 | 1798.8 | 1798.8 | 1798.8 | 1798.8 | 1798.8 |
| Oxygen in Feed Water | 1599.0 | 1599.0 | 1599.0 | 1599.0 | 1599.0 | 1599.0 | 1599.0 |
| Oxygen in Feed | 2705 | 2705 | 2705 | 2705 | 2705 | 2705 | 2705 |
| Oxygen in Total Prod. Water | 2021.1 | 2216.5 | 2321.2 | 2449.8 | 2496.5 | 2548.9 | 2525.9 |
| Oxygen % in water | 74.7% | 81.9% | 85.8% | 90.6% | 92.3% | 94.2% | 93.4% |
| FCC Produced Water | 474.9 | 694.7 | 812.5 | 957.2 | 1009.7 | 1068.7 | 1042.8 |
| Delta CO2 produced from RFO | 201.3 | 118.9 | 17.2 | 159.3 | 193.6 | 42.7 | 80.0 |
| Oxygen in Produced Water | 422.1 | 617.5 | 722.3 | 850.9 | 897.5 | 950.0 | 927.0 |
| Oxygen in Delta CO2 | 146.4 | 86.5 | 12.5 | 115.8 | 140.8 | 31.1 | 58.2 |
| Oxygen in TLP (.26 DL) | 312.5 | 312.5 | 312.5 | 312.5 | 312.5 | 312.5 | 312.5 |
| | | | | | | | |
| TOTAL Oxygen | 881.0 | 1016.5 | 1047.3 | 1279.2 | 1350.8 | 1293.5 | 1297.7 |
| Delta Oxygen | −225.1 | −89.6 | −58.8 | 173.1 | 244.7 | 187.4 | 191.6 |
| Oxygen Balance (%) | 91.68 | 96.69 | 97.83 | 106.40 | 109.05 | 106.93 | 107.08 |
| Amount of CO to Balance O2 | 393.9 | 156.8 | 102.9 | −303.0 | −428.2 | −328.0 | |
| Amount of H2O to Balance O2 | 253.2 | 100.8 | 66.1 | −194.8 | −275.3 | −210.9 | −215.5 |
| | | | | | | | |
| Total H2O | 2526.9 | 2594.3 | 2677.5 | 2561.3 | 2533.2 | 2656.7 | 2626.2 |

TABLE 9

Calculation of Gallons of Gasoline Attributed to the input of RFO
(on a 10,000 bbl/day input basis)

Canmet MAT test

| | | | | | | | | |
|---|---|---|---|---|---|---|---|---|
| Catalyst/Oil Ratio (approximated from curve-fitted line) | | 4 | 5 | 6 | 7 | 8 | 9 | 10 |
| Gasoline Make (Ref. GO) 10,000 bbls/day basis 134245 lbs/hr | bbls/hr | 208.53 | 217.58 | 225.27 | 231.63 | 236.63 | 240.29 | 242.60 |
| Gasoline Make (Ref. GO) | bbls/ton | 3.11 | 3.24 | 3.36 | 3.45 | 3.53 | 3.58 | 3.61 |
| Gasoline Make (5 wt % RFO) 10,000 bbls/day 9,612 bbls/day Ref. GO and 388 bbls/day RFO | bbls/hr | 215.22 | 222.79 | 228.98 | 233.80 | 237.26 | 239.35 | 240.07 |
| Gasoline Make attributed to Ref. GO (bbls/hr) vol. basis | bbls/hr | 200.44 | 209.14 | 216.53 | 222.64 | 227.45 | 230.96 | 233.19 |
| Gasoline Make attributed to RFO by difference | bbls/hr | 14.78 | 13.65 | 12.45 | 11.17 | 9.81 | 8.39 | 6.88 |
| Gasoline Make 5 wt % RFO | bbls/ton RFO | 4.35 | 4.02 | 3.67 | 3.29 | 2.89 | 2.47 | 2.03 |
| Gasoline Make 5 wt % RFO (gals/ton of RFO) | gals/ton of RFO | 182.9 | 168.9 | 154.0 | 138.2 | 121.4 | 103.8 | 85.2 |
| Gasoline Make 5 wt % RFO assume 70 wt % yield | gals/ton of biomass | 128.0 | 118.2 | 107.8 | 96.7 | 85.0 | 72.6 | 59.6 |

In the description above, for purposes of explanation only, specific embodiments have been presented and/or exemplified. It should be understood that variations of various aspects of an embodiment may be combined with other stated components, embodiments, ranges, types, etc. For example, there are embodiments that discuss the processing of an RFO and it should be understood that any and all of the types of RFO's discussed and/or presented herein may be substituted and/or combined into such embodiments even though an embodiment may not be specifically presented with the particular type of RFO in the description.

While numerous embodiments of the present invention have been shown and described herein, it will be obvious to those skilled in the art that such embodiments are provided by way of example only. It is intended that the following claims or future claims that may be added and/or amended in this or future continuing applications, in this or other countries and territories, define the scope of the invention and that methods and structures and products and uses within the scope of these claims and their equivalents be covered thereby.

What is claimed is:

1. A method to reduce the generation of waste streams when preparing a fuel, comprising:
   converting a cellulosic biomass into an unenriched renewable fuel oil by mechanical and thermal processing, comprising:
   i) grinding the cellulosic biomass to form a ground cellulosic biomass, and
   ii) non-catalytic rapid thermal processing of the ground cellulosic biomass to convert at least 60 wt. % of the ground cellulosic biomass to the unenriched renewable fuel oil;
   devolatilizing the unenriched renewable fuel oil to produce an unenriched reduced-volatility renewable fuel oil, the unenriched reduced-volatility renewable fuel oil having a flash point in the range of 55-62 degrees C. as measured by the Pensky-Martens closed cup flash point tester; and
   processing a feedstock in a fluidized catalytic cracker, the feedstock comprising:
   i) 93-99.95 wt. % of a petroleum fraction, and
   ii) 0.05-7 wt. % of the unenriched reduced-volatility renewable fuel oil.

2. The method of claim 1, wherein the devolatizing comprises processing the unenriched renewable fuel oil in a wiped-film evaporator.

3. The method of claim 1, wherein the devolatizing comprises processing the unenriched renewable fuel oil in a falling film evaporator.

4. The method of claim 1, wherein the devolatizing comprises processing the unenriched renewable fuel oil in a flash column.

5. The method of claim 1, wherein the devolatizing comprises processing the unenriched renewable fuel oil in a packed column.

6. The method of claim 1, wherein the devolatizing comprises processing the unenriched renewable fuel oil in a devolatilization vessel.

7. The method of claim 1, wherein the unenriched reduced-volatility renewable fuel oil has a reduced weight percentage of phenols relative to the unenriched renewable fuel oil.

8. The method of claim 7, wherein the unenriched renewable fuel oil has a solids content of less than 0.5 wt. % and an ash content of less than 0.1 wt. %.

9. The method of claim 8, wherein the cellulosic biomass comprises wood, wood residues, or sawdust.

10. The method of claim 9, wherein the cellulosic biomass comprises wood residues.

11. The method of claim 8, wherein the cellulosic biomass comprises bagasse, palm fronds, or empty fruit bunches.

12. The method of claim 1, wherein the unenriched renewable fuel oil has a solids content of less than 0.1 wt. %.

13. The method of claim 1, wherein the cellulosic biomass comprises wood, wood residues, or sawdust.

14. The method of claim 13, wherein the cellulosic biomass comprises wood residues.

15. The method of claim 14, wherein the unenriched renewable fuel oil has a solids content of less than 0.5 wt. % and an ash content of less than 0.1 wt. %.

16. The method of claim 1, wherein the cellulosic biomass comprises bagasse, palm fronds, or empty fruit bunches.

17. The method of claim 1, wherein the unenriched renewable fuel oil has an ash content of less than 0.05 wt. %.

* * * * *